(12) United States Patent
Do

(10) Patent No.: US 8,149,525 B2
(45) Date of Patent: *Apr. 3, 2012

(54) IMAGING LENS

(75) Inventor: Satoshi Do, Saitama (JP)

(73) Assignees: Satoshi Do, Saitama (JP); Milestone Co., Ltd., Chiba (JP)

( * ) Notice: Subject to any disclaimer, the term of this patent is extended or adjusted under 35 U.S.C. 154(b) by 217 days.

This patent is subject to a terminal disclaimer.

(21) Appl. No.: 11/921,150

(22) PCT Filed: Mar. 28, 2007

(86) PCT No.: PCT/JP2007/056657
§ 371 (c)(1),
(2), (4) Date: Nov. 28, 2007

(87) PCT Pub. No.: WO2008/068909
PCT Pub. Date: Jun. 12, 2008

(65) Prior Publication Data
US 2009/0279188 A1    Nov. 12, 2009

(30) Foreign Application Priority Data

Dec. 7, 2006 (JP) .................. 2006-330654

(51) Int. Cl.
*G02B 9/12* (2006.01)
*G02B 9/00* (2006.01)
*G02B 13/18* (2006.01)
(52) U.S. Cl. ......... 359/797; 359/785; 359/784; 359/716
(58) Field of Classification Search .................. 359/642, 359/796–797, 716, 741, 785, 784
See application file for complete search history.

(56) References Cited

U.S. PATENT DOCUMENTS 404,506 A    6/1889    Schroder
(Continued)

FOREIGN PATENT DOCUMENTS

CN    1675696 A    9/2005
(Continued)

OTHER PUBLICATIONS

European Search Report dated Oct. 24, 2008.
(Continued)

*Primary Examiner* — Ricky Mack
*Assistant Examiner* — Zachary Wilkes
(74) *Attorney, Agent, or Firm* — Venable LLP; Jeffri A. Kaminski; Todd R. Farnsworth

(57) ABSTRACT

An imaging lens of which optical performance does not deteriorate even in a high temperature environment, various aberrations are well corrected, optical length is short, and back focus is sufficiently secured, comprising an aperture stop S and a junction type compound lens 14 having a positive refractive power, wherein the aperture stop and the junction type compound lens are arranged in this sequence from an object side to an image side. The junction type compound lens comprises a first lens $L_1$, a second lens $L_2$ and a third lens $L_3$ arranged in this sequence from the object side to the image side. The first lens and the third lens are formed of a curable resin material, and the second lens is formed of an optical glass. The first lens and the second lens are directly bonded, and the second lens and the third lens are directly bonded. The object side face of the first lens and the image side face of the third lens are aspherical.

3 Claims, 25 Drawing Sheets

U.S. PATENT DOCUMENTS

| | | | | |
|---|---|---|---|---|
| 488,506 | A * | 12/1892 | McIlwain | 359/797 |
| 1,637,917 | A | 8/1927 | Richter | |
| 3,524,699 | A | 8/1970 | Mori | |
| 3,799,656 | A | 3/1974 | Fleischman | |
| 5,243,468 | A | 9/1993 | Ohtake | |
| 5,625,495 | A * | 4/1997 | Moskovich | 359/663 |
| 5,959,788 | A | 9/1999 | Yamakawa et al. | |
| 6,271,975 | B1 * | 8/2001 | Grupp | 359/796 |
| 6,498,689 | B2 | 12/2002 | Katsuma | |
| 6,551,530 | B2 | 4/2003 | Koizumi et al. | |
| 6,560,037 | B2 | 5/2003 | Dou | |
| 6,646,817 | B2 * | 11/2003 | Katsuma | 359/796 |
| 6,747,812 | B2 * | 6/2004 | Ota et al. | 359/719 |
| 6,862,804 | B2 | 3/2005 | Nishio et al. | |
| 7,227,703 | B2 * | 6/2007 | Chen | 359/718 |
| 7,319,563 | B2 | 1/2008 | Yoshitsugu | |
| 7,342,731 | B2 * | 3/2008 | Lee et al. | 359/772 |
| 7,380,619 | B2 | 6/2008 | Shiokawa et al. | |
| 7,558,006 | B2 | 7/2009 | Choi et al. | |
| 7,656,593 | B2 * | 2/2010 | Do | 359/784 |
| 7,768,720 | B2 | 8/2010 | Do | |
| 7,830,619 | B2 * | 11/2010 | Do | 359/741 |
| 7,880,981 | B2 * | 2/2011 | Do | 359/784 |
| 8,014,083 | B2 * | 9/2011 | Do | 359/784 |
| 2002/0041450 | A1 | 4/2002 | Katsuma | |
| 2002/0041451 | A1 | 4/2002 | Harada | |
| 2003/0002174 | A1 | 1/2003 | Dou | |
| 2005/0157399 | A1 * | 7/2005 | Hanamura | 359/642 |
| 2006/0050399 | A1 | 3/2006 | Nakagawa | |
| 2007/0014033 | A1 | 1/2007 | Shinohara | |

FOREIGN PATENT DOCUMENTS

| | | |
|---|---|---|
| JP | 2001-242308 | 9/2001 |
| JP | 2001-305309 | 10/2001 |
| JP | 2002-154169 | 5/2002 |
| JP | 2002-154170 | 5/2002 |
| JP | 2002365533 | 12/2002 |
| JP | 2003-311757 | 11/2003 |
| JP | 2004-053834 | 2/2004 |
| JP | 2004-328474 A | 11/2004 |
| JP | 2005-010197 A | 1/2005 |
| JP | 2005-067999 A | 3/2005 |
| JP | 2005-084273 | 3/2005 |
| JP | 2005-116144 | 4/2005 |
| JP | 2005-25829 | 9/2005 |
| JP | 2005-258329 | 9/2005 |
| JP | 2005-305938 | 11/2005 |
| JP | 2005-352266 | 12/2005 |
| JP | 3755149 | 3/2006 |
| JP | 2006-121079 A | 5/2006 |
| JP | 2006-195053 | 7/2006 |
| JP | 2006-308669 | 11/2006 |
| JP | 2006-323365 | 11/2006 |

OTHER PUBLICATIONS

Chinese Office Action dated Jun. 19, 2009.

Japanese International Search Report (PCT/ISA/210), issued Jul. 3, 2007 for PCT/JP2007/056657.

Japanese International Search Report dated Jul. 10, 2007, (PCT/JP2007/061875).

Japanese International Search Report (PCT/ISA/210), issued Jul. 17, 2007 for PCT/JP2007/058042.

European Search Report dated Jul. 22, 2009, issued in related European Patent Application No. 07741478.7.

* cited by examiner

Back Focus bf=0.789 mm
Optical Length L=1.529mm

IMAGING LENS

TECHNICAL FIELD

The present invention relates to an imaging lens, and more particularly to an imaging lens that can be suitably mounted on a portable telephone or the like.

BACKGROUND ART

In a portable telephone with a build-in digital camera, an imaging lens is mounted on a printed circuit board. As a method for mounting an imaging lens on a printed circuit board, a reflow soldering processing is used. Hereafter the reflow soldering processing may simply be called "reflow". Reflow processing is a method for soldering an electronic component by placing a solder ball in advance at a location where an electronic component is connected, placing the electronic component there, heating to melt the solder ball, then cooling the solder down.

Generally in mass production steps, a reflow step for performing reflow processing is used as a method for mounting electronic elements or such components as an imaging lens on a printed circuit board. If the reflow step is used, the mounting cost of components on a printed circuit board can be decreased, and the manufacturing quality can be maintained at a predetermined level.

In the reflow step of the manufacturing steps of a portable telephone comprising an imaging lens, not only electronic components are arranged at predetermined positions on a printed circuit board, but also the imaging lens itself and a socket for installing the imaging lens are arranged on the printed circuit board.

The imaging lenses installed in portable telephones are largely made of plastic in order to decrease manufacturing cost and to insure lens performance. Therefore a heat resistant socket component is used for installing the imaging lens, in order to prevent thermal deformation of the imaging lens in a high temperature environment, which makes it impossible to maintain optical performance thereof.

In other words, in the reflow step, a heat resistant socket component for installing an imaging lens is mounted on the printed circuit board of the portable telephone, and the imaging lens is installed in this socket after the reflow step, so that the imaging lens is not exposed to the high temperature in the reflow step (e.g. see Patent Documents 1 to 3). However using a heat resistant socket component for installing the imaging lens makes the manufacturing steps complicated, and increases the manufacturing cost including the cost of this heat resistant socket.

Recently it has been demanded that the optical performance of an imaging lens installed in a portable telephone does not deteriorate even if the portable telephone itself is placed in 150° C. or higher temperature environment, considering the case of a portable telephone that is left in an automobile which temporarily becomes a high temperature environment. A conventional imaging lens made of plastic material cannot meet this demand.

In order to implement an imaging lens of which optical performance is maintained even in a high temperature environment, forming an imaging lens using a high melting point mold glass material is possible (e.g. see Patent Document 4). According to this, the deterioration of optical performance of an imaging lens in a high temperature environment can be avoided, but at this moment, an imaging lens made of mold glass material is not popular since the manufacturing cost is very high.

In addition to the above thermal characteristics, an imaging lens installed on a portable telephone must satisfy the following conditions related to optical characteristics. One condition is that the optical length, which is defined as a length from an entrance plane at an object side to an image formation plane (also called the "image sensing plane") of the imaging lens, must be short. In other words, when a lens is designed, the ratio of the optical length to the composite focal distance of the imaging lens must be minimized.

In the case of a portable telephone, for example, this optical length must at least be shorter than the thickness of the portable telephone main unit. On the other hand, a back focus, which is defined as a distance from the outgoing plane at the image side to the image sensing plane of the imaging lens, should be as long as possible. In other words, when the lens is designed, the ratio of the back focus to the focal distance must be maximized. This is because such components as a filter and cover glass must be inserted between the imaging lens and the image sensing plane.

In addition to this, it is naturally demanded for the imaging lens that various aberrations are corrected to be small enough that the distortion of an image is not visually recognized, and the integration density of the image sensing elements (also called "pixels") is sufficiently satisfied. In other words, various aberrations must be well corrected, and an image when various aberrations are well corrected may hereafter be called a "good image".

Patent Document 1: Japanese Patent Application Laid-Open No. 2006-121079
Patent Document 2: Japanese Patent Application Laid-Open No. 2004-328474
Patent Document 3: Japanese Patent No. 3755149
Patent Document 4: Japanese Patent Application Laid-Open No. 2005-067999

DISCLOSURE OF THE INVENTION

Problems to be Solved by the Invention

With the foregoing in view, it is an object of the present invention to provide an imaging lens suitable for being installed in a portable telephone, and of which heat resistance is guaranteed and optical performance does not deteriorate, even in a high temperature environment in a reflow step or even if the imaging lens is installed in a portable telephone and is temporarily placed in a high temperature environment, such as inside a car.

It is another object of the present invention to provide an imaging lens of which optical length is short, and the back focus is as long as possible, and with which a good image is acquired.

Means for Solving the Problems

To achieve the above objects, an imaging lens of this invention comprises an aperture stop and a junction type compound lens having a positive refractive power, wherein the aperture stop and the junction type compound lens are arranged in this sequence from the object side to the image side.

The junction type compound lens comprises a first lens, a second lens and a third lens arranged in this sequence from the object side to the image side, and the first lens and the third lens are formed of a curable resin material, the second lens is formed of a glass material, the first lens and the second lens are directly bonded, and the second lens and the third lens are directly bonded. The curable resin material refers to both a thermo-setting resin and a UV curable resin.

In the above mentioned imaging lens, it is preferable to perform settings that satisfy the following conditions (1) to (4).

$$0 \leq |N_3 - N_2| \leq 0.1 \quad (1)$$

$$0 \leq |N_3 - N_4| \leq 0.1 \quad (2)$$

$$0 \leq |v_3 - v_2| \leq 30.0 \quad (3)$$

$$0 \leq |v_3 - v_4| \leq 30.0 \quad (4)$$

where
- $N_2$: refractive index of the first lens
- $N_3$: refractive index of the second lens
- $N_4$: refractive index of the third lens
- $v_2$: Abbe number of the first lens
- $v_3$: Abbe number of the second lens
- $v_4$: Abbe number of the third lens The second lens can be a plane parallel glass plate. A plane parallel glass plate can also be called an "optical-parallel glass plate". A plane parallel glass plate normally is not called a lens, but in the description of the present invention, the plane parallel glass plate may be included in a lens definition, regarding this as a special case where the radius of curvature of the lens surface is infinite.

When the second lens is a plane parallel glass plate, the first lens can be a plano-convex lens, where the object side face of the first lens is a convex surface facing the object side, and the third lens can be a plano-convex lens where the image side face of the third lens is a convex surface facing the image side.

If the second lens is a plane parallel glass plate, the first lens can be a plano-concave lens where the object side face of the first lens is a concave surface facing the object side, and the third lens can be a plano-convex lens where the image side face of the third lens is a convex surface facing the image side.

The second lens can be a bi-convex glass lens, the first lens can be a lens where the object side face of the first lens is a convex surface facing the object side, and the third lens can be a lens where the image side face of the third lens is a convex surface facing the image side.

If the second lens is a bi-convex glass lens, the first lens can be a lens where the object side face of the first lens is a concave surface facing the object side, and the third lens can be a lens where the image side face of the third lens is a convex surface facing the image side.

The second lens can be a bi-concave glass lens, the first lens can be a lens where the object side face of the first lens is a convex surface facing the object side, and the third lens can be a lens where the image side face of the third lens is a convex surface facing the image side.

If the second lens is a bi-concave glass lens, the first lens can be a lens where the object side face of the first lens is a concave surface facing the object side, and the third lens can be a lens where the image side face of the third lens is a convex surface facing the image side.

To form the imaging lens of the present invention, it is preferable that the object side face of the first lens and the image side face of the third lens are aspheric.

Also to form the imaging lens of the present invention, it is preferable that the resin material of the first lens and the third lens is a transparent high hardness silicone resin containing transparent adhesive. The high hardness silicone resin refers to a curable silicone resin which is sufficiently harder compared with the hardness of a plastic resin, and has a sufficient hardness with which geometric shape does not change during the manufacturing step of installing the imaging lens in a portable telephone, and during normal use after the imaging lens is installed in a portable telephone. "Transparent" indicates that the light absorption of visible light is small (transparent) enough to have no influence on practical use. In a product catalog of a silicone resin providing company, the phrase "transparent high hardness silicone resin" may be used for this high hardness silicone resin, which is transparent to visible light.

EFFECTS OF THE INVENTION

According to the imaging lens of the present invention, in the junction type compound lens constituting this imaging lens, the first and third lens, which are formed of curable resin material, sandwich and are directly bonded to the second lens, which is formed of a high melting point glass material, from both sides. Therefore the optical performance thereof is guaranteed in a high temperature environment in the reflow step, or in a high temperature environment when using the imaging lens. In other words, the second lens is formed of a glass material of which melting point is higher than the maximum ambient temperature in the design specifications of the junction type compound lens, so the optical performance thereof does not deteriorate even under a high temperature environment.

Also the first lens and the third lens are directly bonded to the second lens, and curing processing has been performed, so the optical performance thereof does not deteriorate even under a high temperature environment. In other words, once the curable resin material constituting the first and third lens is cured and solidified, the heat resistance characteristic thereof is stable, and the optical performance thereof is maintained even at the highest ambient temperature under conditions of using the junction type compound lens.

If a single lens is created using only curable resin, such a problem as a change in the curved surface shape of the lens occurs during the curing process, but the first lens and the third lens sandwich and are directly bonded to the second lens, which is formed of high melting point glass material, from both sides, therefore such a problem as the curved surface shapes of the first and third lenses deforming during the curing step does not occur.

The inventor of the present invention confirmed that good images can be acquired by satisfying the above conditions (1) to (4) for the respective refractive index and the Abbe number of the first lens, second lens and third lens by simulation based on the ray tracing method, and creating a prototype, and evaluating the characteristics thereof.

The structural principle of the imaging lens of the present invention is implementing two roles, that is aberration correction and image formation, by a single junction type compound lens of which optical characteristics such as the refractive index is as uniform as possible. In other words, it is preferable that the respective refractive index and Abbe number of the first to third lenses constituting the junction type compound lens of the imaging lens of the present invention do not differ from each other. In other words, it is an ideal that the respective refractive index and Abbe number of the first to third lenses are the same as each other. In practical terms, however, it is extremely difficult to find an optical glass material constituting the second lens and a curable resin material constituting the first and third lenses of which the refractive indexes and Abbe number are precisely the same.

Therefore the inventor of the present invention checked, through various simulations and prototyping, the difference of the refractive indexes and the Abbe numbers between the material of the second lens and the material of the first and third lenses, which could generate good images. As a result, it was confirmed that good images can be acquired by constituting an imaging lens which satisfies the above conditions (1) to (4).

In other words, if the difference between the refractive index $N_2$ of the first lens and the refractive index $N_3$ of the second lens, and the difference between the refractive index $N_3$ of the second lens and the refractive index $N_4$ of the third lens are within 0.1, then the distortion aberration, astigmatism aberration and chromatic/spherical aberration become sufficiently small enough to generate good images. If the difference between the Abbe number $v_2$ of the first lens and the Abbe number $v_3$ of the second lens, and the difference between the Abbe number $v_3$ of the second lens and the Abbe number $v_4$ of the third lens are within 30.0, the value of the chromatic aberration can be small enough to generate good images, and images can have sufficient contrast.

| EXPLANATION OF REFERENCE SYMBOLS | |
|---|---|
| 10 | Image sensing element |
| 12 | Cover glass |
| 14 | Junction type compound lens |
| 20, 30 | Die |
| 24, 34 | Transparent high hardness silicone resin |
| 26 | Optical glass |
| 36 | Object side face of first lens |
| 38 | Object side face of third lens |
| S | Aperture stop |
| $L_1$ | First lens |
| $L_2$ | Second lens |
| $L_3$ | Third lens |

BEST MODE FOR CARRYING OUT THE INVENTION

Embodiments of the present invention will now be described with reference to the drawings. Each drawings, however, simply illustrates one configuration example of the present invention, and roughly shows a cross-section of each composing element and positional relationship in order to assist in the understanding of the present invention, and does not limit the present invention to the illustrated example. In the following description, specific materials and conditions may be used, but these materials and conditions are merely examples of preferred embodiments, and therefore the present invention is not limited in any way by these materials and conditions.

Figure 1:
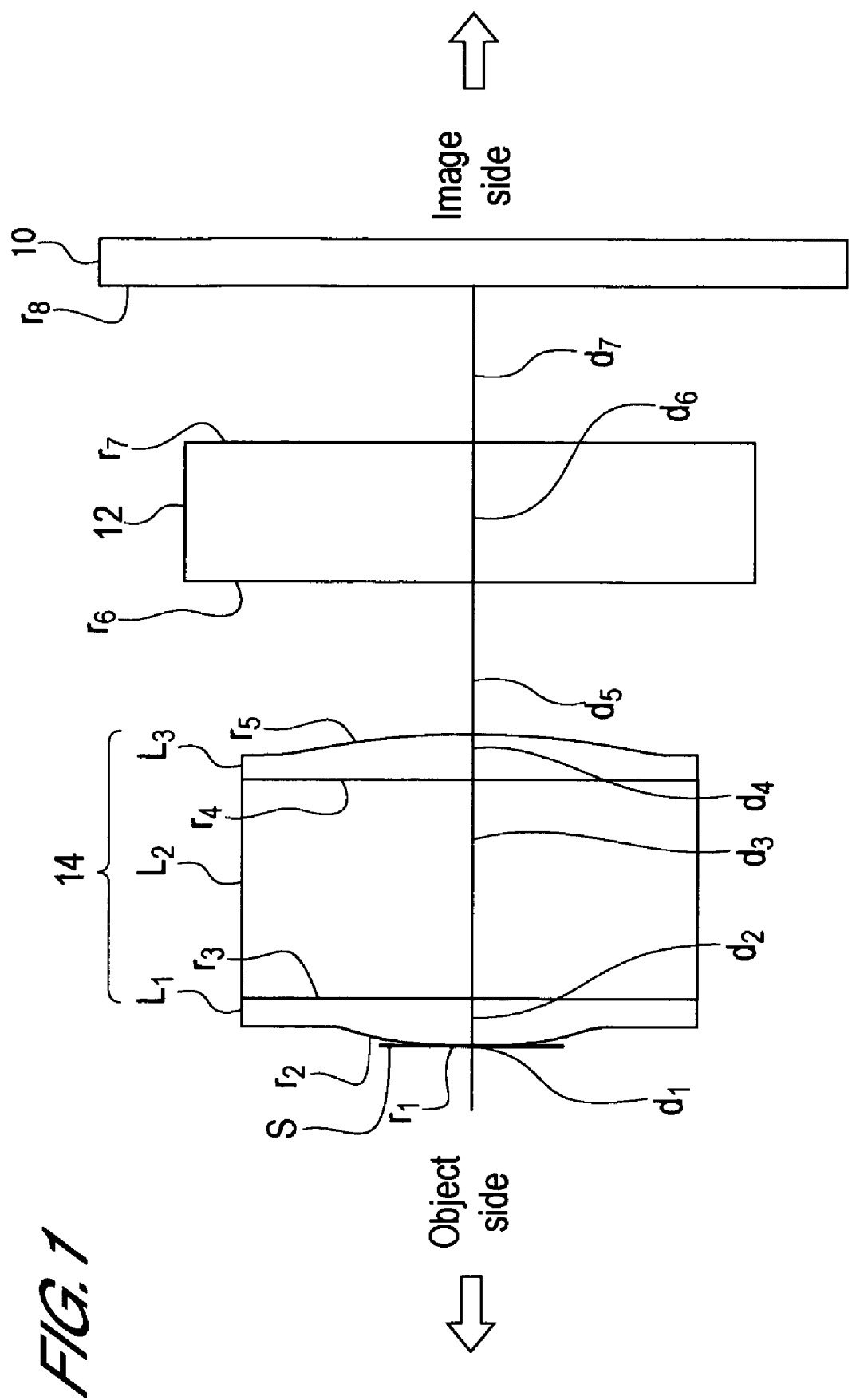
FIG. 1 is a cross-sectional view depicting an imaging lens according to the present invention.

FIG. 1 is a diagram depicting a configuration of an imaging lens of the present invention. The symbols of the surface number ($r_i$ (i=1, 2, 3, . . . , 8)) and the surface spacing ($d_i$ (i=1, 2, 3, . . . , 7)) defined in FIG. 1 are omitted in FIG. 2, FIG. 6, FIG. 10, FIG. 14, FIG. 18, FIG. 22, FIG. 26, FIG. 30, FIG. 34, FIG. 38 and FIG. 42, so that the drawing does not become complicated.

As FIG. 1 shows, a first, second and third lens constituting a junction type compound lens 14 are denoted with $L_1$, $L_2$ and $L_3$ respectively, and an aperture stop disposed on a front face (front face $r_2$ of the first lens) of the junction type compound lens 14 is denoted with S. Within a range where no misunderstanding occurs, $r_i$ (i=1, 2, 3, . . . 8) may be used as a variable that indicates a value of a radius of curvature on an optical axis, or a symbol that identifies a lens, cover glass face or image sensing plane (e.g. $r_2$ is used to indicate the object side face of the first lens $L_1$ constituting the junction type composite lens 14).

Table 1 to Table 11 show the specific values of the parameters, such as $r_i$ (i=1, 2, 3, . . . , 8) and $d_i$ (i=1, 2, 3, . . . , 7) shown in the drawings. The suffix i is added corresponding to an aperture stop surface, surface number of each lens, and thickness of the lens, or the surface spacing of the lens sequentially from the object side to the image side.

$r_i$ is a radius of curvature on the optical axis on the i-th surface.
$d_i$ is a distance from the i-th surface to the (i+1)th surface.
$N_1$ is a refractive index of the material of the lens having the i-th surface and (i+1)th surface.
$v_1$ is an Abbe number of the material of the lens having the i-th surface and (i+1)th surface.

In FIG. 1, the aperture of the diaphragm is shown by a segment. This is because the intersection of the diaphragm surface and the optical axis must be clearly shown to define the distance from the lens surface to the diaphragm surface. In FIG. 2, FIG. 6, FIG. 10, FIG. 14, FIG. 18, FIG. 22, FIG. 26, FIG. 30, FIG. 34, FIG. 38 and FIG. 42, which are cross-sectional views of the imaging lenses of the first embodiment to the eleventh embodiment respectively, a main body of the diaphragm for shielding light is shown by the two lines of which the start point is the edge of the aperture, by opening the aperture of the diaphragm, which is unlike FIG. 1. This is because the status of the diaphragm must be shown by opening the aperture of the diaphragm in order to enter such a beam as a main beam.

The optical length L is a distance from the diaphragm S to the image sensing plane. The back focus bf is a distance from the image side surface of the third lens $L_3$ constituting the junction type compound lens 14 to the image sensing plane. Here the length from the image side face of the third lens $L_3$ to the image sensing plane, which is measured without a cover glass, is regarded as the back focus bf.

The spherical data is shown in Table 1 to Table 11 respectively with surface numbers. The value $r_i$ (i=1, 2, 3, . . . 8) of the radius of curvature on the optical axis is a positive value if it is a convex surface to the object side, and is a negative value if it is convex to the image side.

Both surfaces ($r_3$ and $r_4$) when the second lens is a plane parallel glass plate, diaphragm S ($r_1$), and surfaces of the cover glass (or filter) ($r_6$ and $r_7$) are planes, so the radius of curvature is indicated as ∞. The image sensing plane ($r_8$) is a plane, so $r_8 = \infty$, but this is omitted in Table 1 to Table 11.

The aspherical surface used for this invention is given by the following expression.

$$Z = ch^2/[1+[1-(1+k)c^2h^2]^{+1/2}] + A_0 h^4 + B_0 h^6 + C_0 h^8 + D_0 h^{10}$$

where
Z: depth from the vertex of the surface to the contact surface
c: curvature of the surface on the optical axis
h: height from the optical axis
k: cone constant
$A_0$: aspherical-surface coefficient of degree 4
$B_0$: aspherical surface coefficient of degree 6
$C_0$: aspherical surface coefficient of degree 8
$D_0$: aspherical surface coefficient of degree 10

In Table 1 to Table 11 of this description, the numeric value to indicate an aspherical surface coefficient is denoted by an exponent, and "e−1", for example, means "the −1th power of 10". The value indicated as the focal distance f is a focal distance of the junction type compound lens (composite focal distance of the lens system comprised of the first lens to the third lens). For each embodiment, the open F number (also called open F value), which is an index of the brightness of the lens, is indicated by Fno. The open F number refers to the F number when the diameter of the aperture stop is the maximum by design. The diagonal length 2Y of the square image surface is indicated as the image height. Y is a value half of the diagonal length of the square image surface.

Now the imaging lens according to the first embodiment to the eleventh embodiment will be described with reference to FIG. 1 to FIG. 45.

The distortion aberration curves shown in FIG. 3, FIG. 7, FIG. 11, FIG. 15, FIG. 19, FIG. 23, FIG. 27, FIG. 31, FIG. 35, FIG. 39 and FIG. 43 show the aberration (unsatisfactory quantity of the tangent condition is shown in the abscissa by percentage) with respect to the distance from the optical axis (shown in the ordinate by percentage with the maximum distance from the optical axis within the image surface as 100). The astigmatism aberration curves shown in FIG. 4, FIG. 8, FIG. 12, FIG. 16, FIG. 20 FIG. 24, FIG. 28, FIG. 32, FIG. 36, FIG. 40 and FIG. 44 show the aberration quantity (mm units) in the abscissa with respect to the distance from the optical axis shown in the ordinate, just like the distortion aberration curves, and show the aberration quantities (mm units) on the meridional surface and the sagittal surface respectively.

The chromatic/spherical aberration curves in FIG. 5, FIG. 9, FIG. 13, FIG. 17, FIG. 21, FIG. 25, FIG. 29, FIG. 33, FIG. 37, FIG. 41 and FIG. 45 show the aberration quantity (mm units) in the abscissa with respect to the incidence height h in the ordinate. The incidence height h in the ordinate is shown as a value converted into an F number. For example, in the case of a lens of which Fno is 2.8, the incidence height h=100% of the ordinate corresponds to F=2.8.

For the chromatic/spherical aberration curves, the aberration values with respect to the C-line (light of which wavelength is 656.3 nm), d-line (light of which wavelength is 587.6 nm), e-line (light of which wavelength is 546.1 nm), F-line (light of which wavelength is 486.1 nm) and g-line (light of which wavelength is 435.8 nm) are shown.

Table 1 to Table 11 show the list of the radius of curvature (mm units), lens surface spacing (mm units), refractive index of lens material, Abbe number of lens material, focal distance, F number and aspherical surface coefficient of composing lens of the first embodiment to the eleventh embodiment respectively. The radius of curvature in the optical axis and the lens surface spacing of the composing lens are shown as values when the value of the composite focal distance f of the imaging lens is normalized to 1.00 mm.

In the first embodiment to the eleventh embodiment, a transparent high hardness silicone resin, which is a curable resin material, is used for the material of the first lens $L_1$ and the third lens $L_3$ constituting the junction type compound lens 14. An optical glass BK 7, which is a glass material, is used for the material of the second lens $L_2$. Here BK 7 is a name assigned by Schott Glass Co. to a group of borosilicate glass. The optical glass BK 7 is now manufactured by a plurality of manufacturers. The refractive index and the Abbe number of the commercially available optical glass BK 7 are somewhat different depending on the manufacturer and the manufacturing lot. The refractive index of the optical glass BK 7 (made by Ohara Inc.) constituting the second lens $L_2$ with respect to the d-line (light with a 587.6 mm wavelength) is 1.5168, and the Abbe number is 64.0.

Both respective surfaces of the first lens $L_1$ and the third lens $L_3$ constituting the junction type compound lens 14 are aspherical.

As FIG. 1 shows, the imaging lens of the present invention comprises an aperture stop S and a junction type compound lens 14 having a positive refractive power, where the aperture stops S and the junction type compound lens 14 are arranged in this sequence from an object side to an image side. The junction type compound lens 14 further comprises a first lens $L_1$, a second lens $L_2$ and a third lens $L_3$ arranged in this sequence, the first lens $L_1$ and the third lens $L_3$ are formed of a curable resin material (transparent high hardness silicone resin), and the second lens $L_2$ is formed of a glass material (optical glass BK 7). The first lens $L_1$ and the second lens $L_2$ are directly bonded, and the second lens $L_2$ and the third lens $L_3$ are directly bonded.

A cover glass 12 is inserted between the junction type compound lens 14 and the image sensing element 10. A material of the cover glass is optical glass BK 7 (made by Hoya Corporation) of which refractive index is 1.5613 and the Abbe number is 61.0.

For the curable resin material, which is a material of the first lens $L_1$ and the third lens $L_3$, thermo-setting silicone resins SMX-7852 made by Fuji Polymer Industries Co., Ltd, IVSM-4500 made by Toshiba Corporation and SR-7010 made by Dow Corning Toray Co., Ltd. were used. The refractive indexes and the Abbe numbers of these thermo-setting silicone resins differ depending on the manufacturer, and the refractive indexes and the Abbe numbers differ somewhat even if the product name is the same. In the following embodiment, a refractive index of a lens material is a value with respect to the d-line (light with 587.6 nm wavelength).

The focal distance of the junction type compound lens 14 is normalized to 1.00 mm. Table 1 to Table 11 shows the value $r_i$ (i=1, 2, 3, . . . , 8) of the radius of curvature on the optical axis, surface spacing $d_i$ (i=1, 2, 3, . . . , 7) and refractive index, Abbe number and aspherical surface coefficient of the lens composing material of the imaging lens according to the first embodiment to the eleventh embodiment respectively.

TABLE 1

First Embodiment

| Radius of Curvature($r_i$) | Interval($d_i$) | Refractive Index($N_i$) | Abbe Number($v_i$) | Aspherical Surface Coefficients ||||| 
|---|---|---|---|---|---|---|---|---|
| | | | | K | $A_0$ | $B_0$ | $C_0$ | $D_0$ |
| $r_1 = \infty$ | | | | | | | | |
| | $d_1 = 0.0000$ | | | | | | | |
| $r_2 = 1.029$ | | | | 4.460 | 4.243 | −1.609e+2 | 3.119e+3 | −2.393e+4 |
| | $d_2 = 0.0929$ | $N_2 = 1.51000$ | $v_2 = 56.0$ | | | | | |
| $r_3 = \infty$ | | | | | | | | |
| | $d_3 = 0.4343$ | $N_3 = 1.51680$ | $v_3 = 64.0$ | | | | | |
| $r_4 = \infty$ | | | | | | | | |
| | $d_4 = 0.0929$ | $N_4 = 1.51000$ | $v_4 = 56.0$ | | | | | |
| $r_5 = -0.807$ | | | | −8.000e+1 | −2.495 | 2.275e+1 | −7.433e+1 | 1.147e+2 |
| | $d_5 = 0.3000$ | | | | | | | |
| $r_6 = \infty$ | | | | | | | | |
| | $d_6 = 0.2788$ | $N_6 = 1.51633$ | $v_6 = 64.0$ | | | | | |
| $r_7 = \infty$ | | | | | | | | |
| | $d_7 = 0.3136$ | | | | | | | |

Focal Distance f = 1.00 mm
F-Number $F_{no}$ = 2.8
Image Height 2Y = 1.350 mm

TABLE 2

Second Embodiment

| Radius of Curvature($r_i$) | Interval($d_i$) | Refractive Index($N_i$) | Abbe Number($v_i$) | Aspherical Surface Coefficients ||||| 
|---|---|---|---|---|---|---|---|---|
| | | | | K | $A_0$ | $B_0$ | $C_0$ | $D_0$ |
| $r_1 = \infty$ | | | | | | | | |
| | $d_1 = 0.0196$ | | | | | | | |
| $r_2 = -5.734$ | | | | 3.331e+2 | −1.324 | 9.289e+1 | −2.729e+3 | 1.937e+4 |
| | $d_2 = 0.0096$ | $N_2 = 1.51000$ | $v_2 = 56.0$ | | | | | |
| $r_3 = \infty$ | | | | | | | | |
| | $d_3 = 0.3120$ | $N_3 = 1.51680$ | $v_3 = 64.0$ | | | | | |

TABLE 2-continued

Second Embodiment

| Radius of Curvature($r_i$) | Interval($d_i$) | Refractive Index($N_i$) | Abbe Number($v_i$) | Aspherical Surface Coefficients | | | | |
|---|---|---|---|---|---|---|---|---|
| | | | | K | $A_0$ | $B_0$ | $C_0$ | $D_0$ |
| $r_4 = \infty$ | | | | | | | | |
| | $d_4 = 0.1680$ | $N_4 = 1.51000$ | $v_4 = 56.0$ | | | | | |
| $r_5 = -0.482$ | | | | $3.832e-1$ | $3.212$ | $-5.795e+1$ | $6.149e+2$ | $-1.863e+3$ |
| | $d_5 = 0.5000$ | | | | | | | |
| $r_6 = \infty$ | | | | | | | | |
| | $d_6 = 0.3360$ | $N_6 = 1.51633$ | $v_6 = 64.0$ | | | | | |
| $r_7 = \infty$ | | | | | | | | |
| | $d_7 = 0.3068$ | | | | | | | |

Focal Distance f = 1.00 mm
F-Number $F_{no}$ = 2.8
Image Height 2Y = 1.260 mm

TABLE 3

Third Embodiment

| Radius of Curvature($r_i$) | Interval($d_i$) | Refractive Index($N_i$) | Abbe Number($v_i$) | Aspherical Surface Coefficients | | | | |
|---|---|---|---|---|---|---|---|---|
| | | | | K | $A_0$ | $B_0$ | $C_0$ | $D_0$ |
| $r_1 = \infty$ | | | | | | | | |
| | $d_1 = 0.0000$ | | | | | | | |
| $r_2 = 0.853$ | | | | $4.460$ | $6.831$ | $-3.557e+2$ | $9.474e+3$ | $-9.983e+4$ |
| | $d_2 = 0.0793$ | $N_2 = 1.42000$ | $v_2 = 52.0$ | | | | | |
| $r_3 = \infty$ | | | | | | | | |
| | $d_3 = 0.3706$ | $N_3 = 1.51680$ | $v_3 = 64.0$ | | | | | |
| $r_4 = \infty$ | | | | | | | | |
| | $d_4 = 0.0793$ | $N_4 = 1.42000$ | $v_4 = 52.0$ | | | | | |
| $r_5 = -0.683$ | | | | $-8.000e+1$ | $-4.017$ | $5.031e+1$ | $-2.258e+2$ | $4.785e+2$ |
| | $d_5 = 0.3000$ | | | | | | | |
| $r_6 = \infty$ | | | | | | | | |
| | $d_6 = 0.2379$ | $N_6 = 1.51633$ | $v_6 = 64.0$ | | | | | |
| $r_7 = \infty$ | | | | | | | | |
| | $d_7 = 0.3681$ | | | | | | | |

Focal Distance f = 1.00 mm
F-Number $F_{no}$ = 3.0
Image Height 2Y = 1.352 mm

TABLE 4

Fourth Embodiment

| Radius of Curvature($r_i$) | Interval($d_i$) | Refractive Index($N_i$) | Abbe Number($v_i$) | Aspherical Surface Coefficients | | | | |
|---|---|---|---|---|---|---|---|---|
| | | | | K | $A_0$ | $B_0$ | $C_0$ | $D_0$ |
| $r_1 = \infty$ | | | | | | | | |
| | $d_1 = 0.0000$ | | | | | | | |
| $r_2 = 1.029$ | | | | $4.460$ | $4.243$ | $-1.609e+2$ | $3.119e+3$ | $-2.393e+4$ |
| | $d_2 = 0.0929$ | $N_2 = 1.51000$ | $v_2 = 40.0$ | | | | | |
| $r_3 = \infty$ | | | | | | | | |
| | $d_3 = 0.4343$ | $N_3 = 1.51680$ | $v_3 = 64.0$ | | | | | |
| $r_4 = \infty$ | | | | | | | | |
| | $d_4 = 0.0929$ | $N_4 = 1.51000$ | $v_4 = 40.0$ | | | | | |
| $r_5 = -0.807$ | | | | $-8.000e+1$ | $-2.495$ | $2.275e+1$ | $-7.433e+1$ | $1.147e+2$ |
| | $d_5 = 0.3000$ | | | | | | | |
| $r_6 = \infty$ | | | | | | | | |
| | $d_6 = 0.2788$ | $N_6 = 1.51633$ | $v_6 = 64.0$ | | | | | |
| $r_7 = \infty$ | | | | | | | | |
| | $d_7 = 0.3136$ | | | | | | | |

Focal Distance f = 1.00 mm
F-Number $F_{no}$ = 2.8
Image Height 2Y = 1.350 mm

TABLE 5

Fifth Embodiment

| Radius of Curvature($r_i$) | Interval($d_i$) | Refractive Index($N_i$) | Abbe Number($v_i$) | Aspherical Surface Coefficients | | | | |
|---|---|---|---|---|---|---|---|---|
| | | | | K | $A_0$ | $B_0$ | $C_0$ | $D_0$ |
| $r_1 = \infty$ | | | | | | | | |
| | $d_1 = 0.0000$ | | | | | | | |
| $r_2 = 1.031$ | | | | 4.460 | 4.218 | −1.593e+2 | 3.076e+3 | −2.350e+4 |
| | $d_2 = 0.0931$ | $N_2 = 1.51000$ | $v_2 = 56.0$ | | | | | |
| $r_3 = 4.008$ | | | | | | | | |
| | $d_3 = 0.4352$ | $N_3 = 1.51680$ | $v_3 = 64.0$ | | | | | |
| $r_4 = -4.008$ | | | | | | | | |
| | $d_4 = 0.0931$ | $N_4 = 1.51000$ | $v_4 = 56.0$ | | | | | |
| $r_5 = -0.808$ | | | | −8.000e+1 | −2.480 | 2.252e+1 | −7.330e+1 | 1.126e+2 |
| | $d_5 = 0.3000$ | | | | | | | |
| $r_6 = \infty$ | | | | | | | | |
| | $d_6 = 0.2794$ | $N_6 = 1.51633$ | $v_6 = 64.0$ | | | | | |
| $r_7 = \infty$ | | | | | | | | |
| | $d_7 = 0.3120$ | | | | | | | |

Focal Distance f = 1.00 mm
F-Number $F_{no} = 2.8$
Image Height 2Y = 1.352 mm

TABLE 6

Sixth Embodiment

| Radius of Curvature($r_i$) | Interval($d_i$) | Refractive Index($N_i$) | Abbe Number($v_i$) | Aspherical Surface Coefficients | | | | |
|---|---|---|---|---|---|---|---|---|
| | | | | K | $A_0$ | $B_0$ | $C_0$ | $D_0$ |
| $r_1 = \infty$ | | | | | | | | |
| | $d_1 = 0.0197$ | | | | | | | |
| $r_2 = -5.769$ | | | | 3.331e+2 | −1.300 | 9.017e+1 | −2.618e+3 | 1.836e+4 |
| | $d_2 = 0.0097$ | $N_2 = 1.51000$ | $v_2 = 56.0$ | | | | | |
| $r_3 = 1.931$ | | | | | | | | |
| | $d_3 = 0.3139$ | $N_3 = 1.51680$ | $v_3 = 64.0$ | | | | | |
| $r_4 = -1.931$ | | | | | | | | |
| | $d_4 = 0.1690$ | $N_4 = 1.51000$ | $v_4 = 56.0$ | | | | | |
| $r_5 = -0.485$ | | | | 3.832e−1 | 3.155 | −5.626e+1 | 5.899e+2 | −1.766e+3 |
| | $d_5 = 0.5000$ | | | | | | | |
| $r_6 = \infty$ | | | | | | | | |
| | $d_6 = 0.3380$ | $N_6 = 1.51633$ | $v_6 = 64.0$ | | | | | |
| $r_7 = \infty$ | | | | | | | | |
| | $d_7 = 0.3044$ | | | | | | | |

Focal Distance f = 1.00 mm
F-Number $F_{no} = 2.8$
Image Height 2Y = 1.268 mm

TABLE 7

Seventh Embodiment

| Radius of Curvature($r_i$) | Interval($d_i$) | Refractive Index($N_i$) | Abbe Number($v_i$) | Aspherical Surface Coefficients | | | | |
|---|---|---|---|---|---|---|---|---|
| | | | | K | $A_0$ | $B_0$ | $C_0$ | $D_0$ |
| $r_1 = \infty$ | | | | | | | | |
| | $d_1 = 0.0000$ | | | | | | | |
| $r_2 = 1.026$ | | | | 4.460 | 4.282 | −1.633e+2 | 3.185e+3 | −2.458e+4 |
| | $d_2 = 0.0926$ | $N_2 = 1.51000$ | $v_2 = 56.0$ | | | | | |
| $r_3 = -3.988$ | | | | | | | | |
| | $d_3 = 0.4330$ | $N_3 = 1.51680$ | $v_3 = 64.0$ | | | | | |
| $r_4 = 3.988$ | | | | | | | | |
| | $d_4 = 0.0926$ | $N_4 = 1.51000$ | $v_4 = 56.0$ | | | | | |
| $r_5 = -0.804$ | | | | −8.000e+1 | −2.518 | 2.309e+1 | −7.591e+1 | 1.178e+2 |
| | $d_5 = 0.3000$ | | | | | | | |
| $r_6 = \infty$ | | | | | | | | |
| | $d_6 = 0.2780$ | $N_6 = 1.51633$ | $v_6 = 64.0$ | | | | | |
| $r_7 = \infty$ | | | | | | | | |
| | $d_7 = 0.3145$ | | | | | | | |

Focal Distance f = 1.00 mm
F-Number $F_{no} = 2.8$
Image Height 2Y = 1.352 mm

TABLE 8

Eighth Embodiment

| Radius of Curvature($r_i$) | Interval($d_i$) | Refractive Index($N_i$) | Abbe Number($v_i$) | Aspherical Surface Coefficients | | | | |
|---|---|---|---|---|---|---|---|---|
| | | | | K | $A_0$ | $B_0$ | $C_0$ | $D_0$ |
| $r_1 = \infty$ | | | | | | | | |
| | $d_1 = 0.0195$ | | | | | | | |
| $r_2 = -5.705$ | | | | 3.331e+2 | −1.344 | 9.529e+1 | −2.828e+3 | 2.028e+4 |
| | $d_2 = 0.0478$ | $N_2 = 1.51000$ | $v_2 = 56.0$ | | | | | |
| $r_3 = -1.910$ | | | | | | | | |
| | $d_3 = 0.2245$ | $N_3 = 1.51680$ | $v_3 = 64.0$ | | | | | |
| $r_4 = 1.910$ | | | | | | | | |
| | $d_4 = 0.2149$ | $N_4 = 1.51000$ | $v_4 = 56.0$ | | | | | |
| $r_5 = -0.479$ | | | | 3.832e−1 | 3.261 | −5.945e+1 | 6.373e+2 | −1.951e+3 |
| | $d_5 = 0.5000$ | | | | | | | |
| $r_6 = \infty$ | | | | | | | | |
| | $d_6 = 0.3343$ | $N_6 = 1.51633$ | $v_6 = 64.0$ | | | | | |
| $r_7 = \infty$ | | | | | | | | |
| | $d_7 = 0.3099$ | | | | | | | |

Focal Distance f = 1.00 mm
F-Number $F_{no}$ = 2.8
Image Height 2Y = 1.254 mm

TABLE 9

Ninth Embodiment

| Radius of Curvature($r_i$) | Interval($d_i$) | Refractive Index($N_i$) | Abbe Number($v_i$) | Aspherical Surface Coefficients | | | | |
|---|---|---|---|---|---|---|---|---|
| | | | | K | $A_0$ | $B_0$ | $C_0$ | $D_0$ |
| $r_1 = \infty$ | | | | | | | | |
| | $d_1 = 0.0000$ | | | | | | | |
| $r_2 = 1.064$ | | | | 4.460 | 3.837 | −1.360e+2 | 2.466e+3 | −1.769e+4 |
| | $d_2 = 0.0961$ | $N_2 = 1.53000$ | $v_2 = 35.0$ | | | | | |
| $r_3 = \infty$ | | | | | | | | |
| | $d_3 = 0.4491$ | $N_3 = 1.51680$ | $v_3 = 64.0$ | | | | | |
| $r_4 = \infty$ | | | | | | | | |
| | $d_4 = 0.0961$ | $N_4 = 1.53000$ | $v_4 = 35.0$ | | | | | |
| $r_5 = -0.834$ | | | | −8.000e+1 | −2.256 | 1.924e+1 | −5.877e+1 | 8.479e+1 |
| | $d_5 = 0.3102$ | | | | | | | |
| $r_6 = \infty$ | | | | | | | | |
| | $d_6 = 0.2788$ | $N_6 = 1.51633$ | $v_6 = 64.0$ | | | | | |
| $r_7 = \infty$ | | | | | | | | |
| | $d_7 = 0.2959$ | | | | | | | |

Focal Distance f = 1.00 mm
F-Number $F_{no}$ = 2.8
Image Height 2Y = 1.352 mm

TABLE 10

Tenth Embodiment

| Radius of Curvature($r_i$) | Interval($d_i$) | Refractive Index($N_i$) | Abbe Number($v_i$) | Aspherical Surface Coefficients | | | | |
|---|---|---|---|---|---|---|---|---|
| | | | | K | $A_0$ | $B_0$ | $C_0$ | $D_0$ |
| $r_1 = \infty$ | | | | | | | | |
| | $d_1 = 0.0000$ | | | | | | | |
| $r_2 = 1.059$ | | | | 4.460 | 3.898 | −1.396e+2 | 2.558e+3 | −1.854e+4 |
| | $d_2 = 0.0956$ | $N_2 = 1.53000$ | $v_2 = 35.0$ | | | | | |
| $r_3 = 4.115$ | | | | | | | | |
| | $d_3 = 0.4468$ | $N_3 = 1.51680$ | $v_3 = 64.0$ | | | | | |
| $r_4 = -4.115$ | | | | | | | | |
| | $d_4 = 0.0956$ | $N_4 = 1.53000$ | $v_4 = 35.0$ | | | | | |
| $r_5 = -0.830$ | | | | −8.000e+1 | −2.292 | 1.974e+1 | −6.096e+1 | 8.886e+1 |
| | $d_5 = 0.3080$ | | | | | | | |
| $r_6 = \infty$ | | | | | | | | |
| | $d_6 = 0.2794$ | $N_6 = 1.51633$ | $v_6 = 64.0$ | | | | | |
| $r_7 = \infty$ | | | | | | | | |
| | $d_7 = 0.2988$ | | | | | | | |

Focal Distance f = 1.00 mm
F-Number $F_{no}$ = 2.8
Image Height 2Y = 1.352 mm

TABLE 11

Eleventh Embodiment

| Radius of Curvature($r_i$) | Interval($d_i$) | Refractive Index($N_i$) | Abbe Number($v_i$) | K | $A_0$ | $B_0$ | $C_0$ | $D_0$ |
|---|---|---|---|---|---|---|---|---|
| $r_1 = \infty$ | | | | | | | | |
| | $d_1 = 0.0000$ | | | | | | | |
| $r_2 = 1.070$ | | | | 4.460 | 3.776 | -1.325e+2 | 2.376e+3 | -1.687e+4 |
| | $d_2 = 0.0966$ | $N_2 = 1.53000$ | $v_2 = 35.0$ | | | | | |
| $r_3 = -4.158$ | | | | | | | | |
| | $d_3 = 0.4515$ | $N_3 = 1.51680$ | $v_3 = 64.0$ | | | | | |
| $r_4 = 4.158$ | | | | | | | | |
| | $d_4 = 0.0966$ | $N_4 = 1.53000$ | $v_4 = 35.0$ | | | | | |
| $r_5 = -0.839$ | | | | -8.000e+1 | -2.220 | 1.873e+1 | -5.663e+1 | 8.084e+1 |
| | $d_5 = 0.3128$ | | | | | | | |
| $r_6 = \infty$ | | | | | | | | |
| | $d_6 = 0.2780$ | $N_6 = 1.51633$ | $v_6 = 64.0$ | | | | | |
| $r_7 = \infty$ | | | | | | | | |
| | $d_7 = 0.2929$ | | | | | | | |

Focal Distance f = 1.00 mm
F-Number $F_{no}$ = 2.8
Image Height 2Y = 1.352 mm

First Embodiment

In the lens system of the first embodiment, the first lens $L_1$ and the third lens $L_3$ are formed of transparent high hardness silicone resin SMX-7852 (made by Fuji Polymer Industries Co., Ltd.) containing transparent adhesive, and the second lens $L_2$ is formed by optical glass BK 7 (made by Ohara Inc.).
(A) The refractive index $N_2$ of the first lens $L_1$ is $N_2$=1.51000.
(B) The refractive index $N_3$ of the second lens $L_2$ is $N_3$=1.51680.
(C) The refractive index $N_4$ of the third lens $L_3$ is $N_4$=1.51000.
(D) The Abbe number $v_2$ of the first lens $L_1$ is $v_2$=56.0.
(E) The Abbe number $v_3$ of the second lens $L_2$ is $v_3$=64.0.
(F) The Abbe number $v_4$ of the third lens $L_3$ is $v_4$=56.0.

Therefore $|N_3-N_2|=|N_3-N_4|=0.00680$, which satisfies the following Conditions (1) and (2). Also $|v_3-v_2|=|v_3-v_4|=8.0$, which satisfies the following Conditions (3) and (4).

Conditions (1) and (2) refer to the conditions given by the following Expression (1) and (2). The conditions (3) and (4) refer to the conditions given by the following Expressions (3) and (4).

$$0 \leq |N_3-N_2| \leq 0.1 \quad (1)$$

$$0 \leq |N_3-N_4| \leq 0.1 \quad (2)$$

$$0 \leq |v_3-v_2| \leq 30.0 \quad (3)$$

$$0 \leq |v_3-v_4| \leq 30.0 \quad (4)$$

Conditions (1) to (4) refer to conditions given by Expression (1) to (4) respectively, which is the same for the description herein below (description on the second embodiment to the eleventh embodiment).

Figure 2:
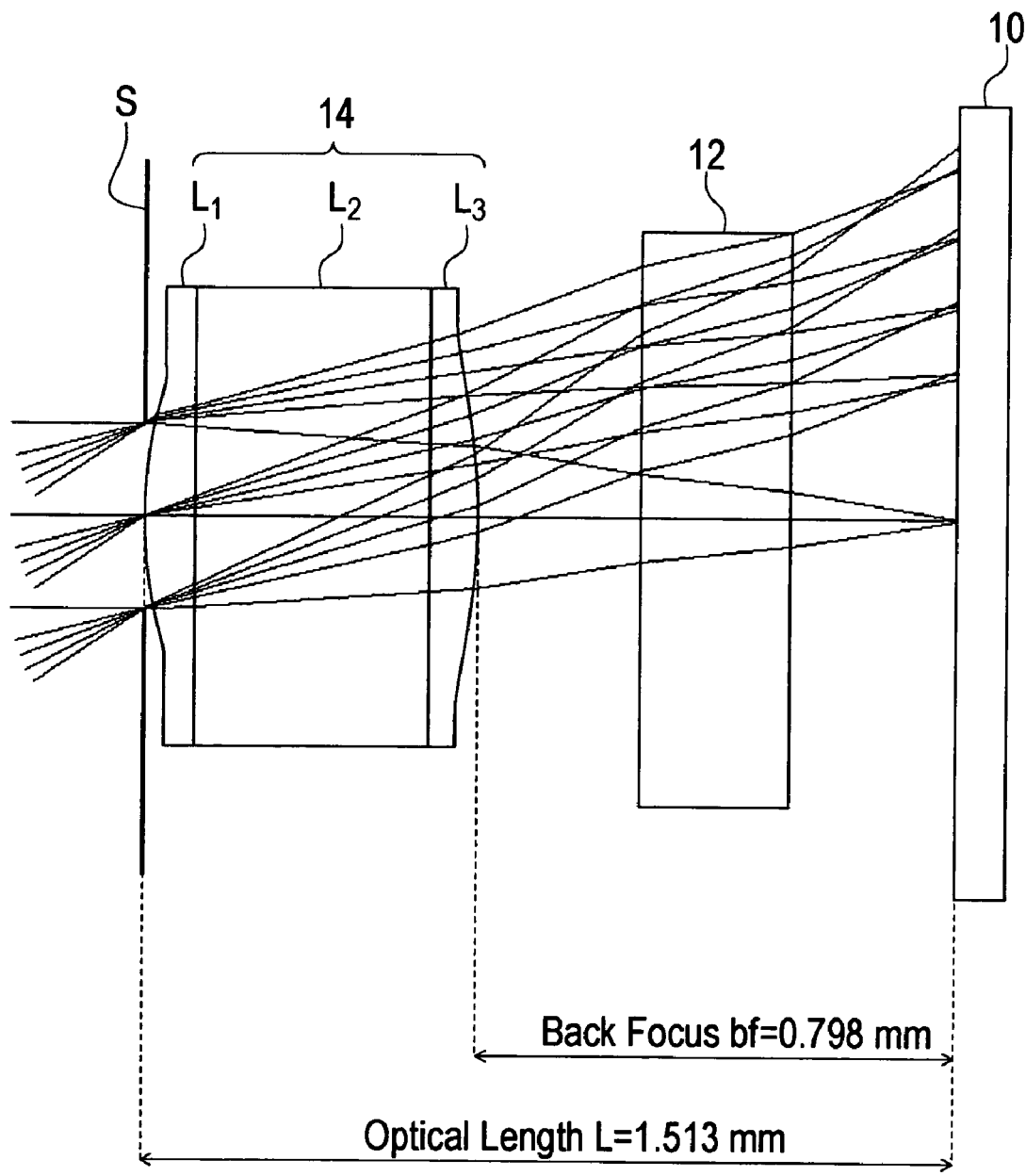
FIG. 2 is a cross-sectional view depicting an imaging lens according to a first embodiment.

FIG. 2 is a cross-sectional view of the imaging lens of the first embodiment. As FIG. 2 shows, the aperture stop S is formed at a position of an intersection of the first surface (surface at the object side) of the first lens $L_1$ constituting the junction type compound lens 14 and the optical axis. The diaphragm surface is a plane, so $r_1=\infty$ is indicated in Table 1. The F number Fno is 2.8.

As Table 1 shows, $r_3=\infty$ and $r_4=\infty$ so the second lens $L_2$ is a plane parallel glass plate. Since $r_2$ is a positive value and $r_5$ is a negative value, the first lens $L_1$ is a plano-convex lens where the object side face of this first lens $L_1$ is a convex surface facing the object side, and the third lens $L_3$ is a plano-convex lens where the image side face of this third lens $L_3$ is a convex surface facing the image side. The junction type compound lens 14 has a positive refractive power.

As FIG. 2 shows, the optical length L with respect to the focal distance f=1.00 mm is sufficiently short, 1.513 mm, and the back focus bf is sufficiently long, 0.798 nm.

Figure 3:
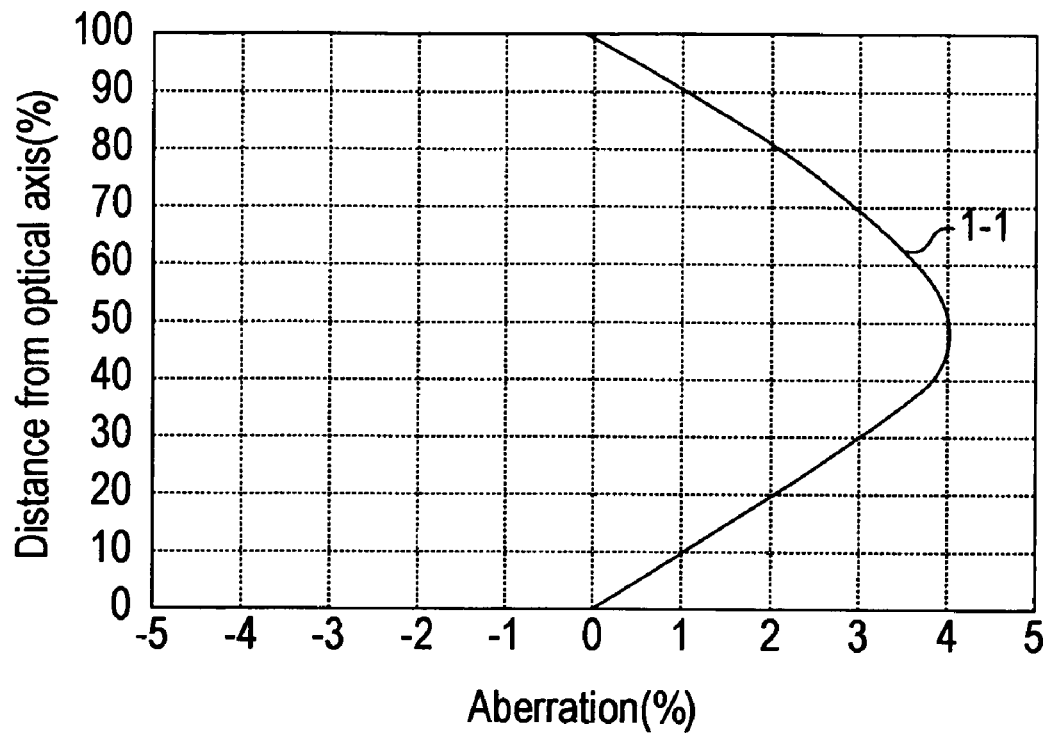
FIG. 3 is a diagram depicting the distortion aberration of the imaging lens of the first embodiment.
Figure 4:
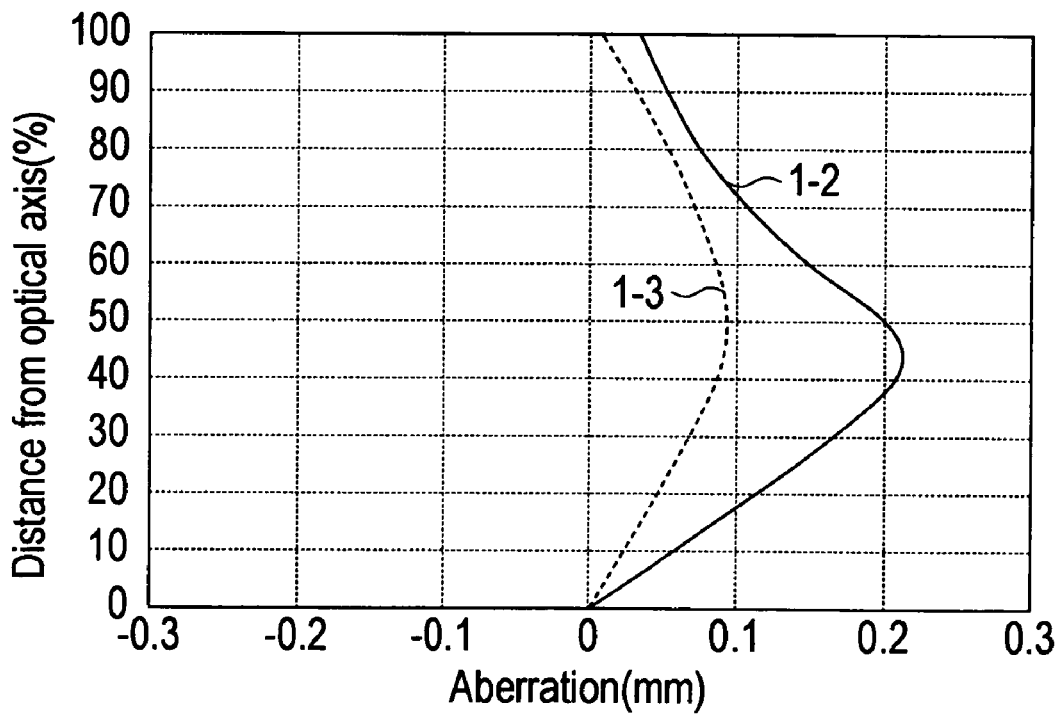
FIG. 4 is a diagram depicting the astigmatism aberration of the imaging lens of the first embodiment.
Figure 5:
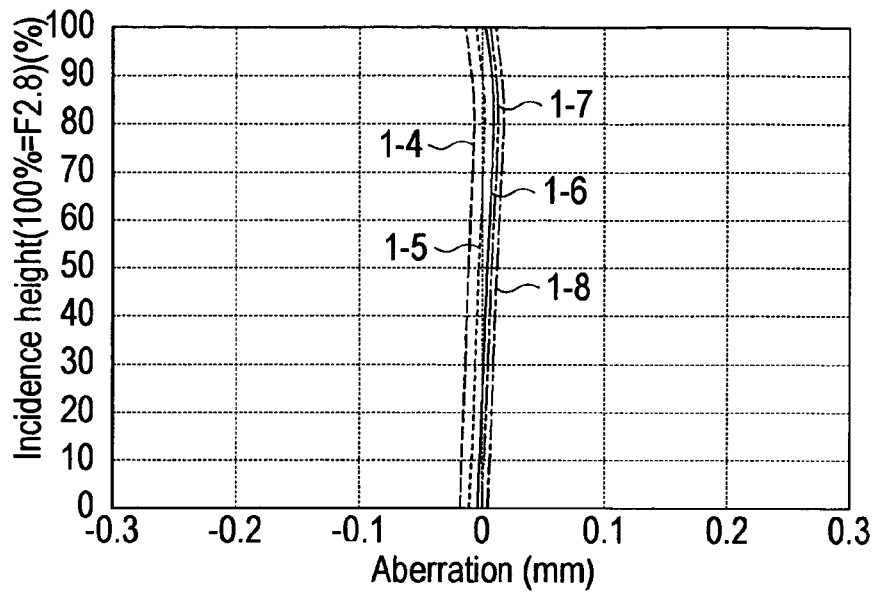
FIG. 5 is a diagram depicting the chromatic/spherical aberration of the imaging lens of the first embodiment.

FIG. 3 shows a graph of the distortion aberration curve 1-1, FIG. 4 shows a graph of the astigmatism aberration curve (aberration curve 1-2 on the meridional surface and aberration curve 1-3 on the sagittal surface), FIG. 5 shows a graph of a chromatic/spherical aberration curve (aberration curve 1-4 on g-line, aberration curve 1-5 on F-line, aberration curve 1-6 on e-line, aberration curve 1-7 on d-line and aberration curve 1-8 on C-line).

The ordinates of the aberration curves in FIG. 3 and FIG. 4 show the image height by a % of the distance from the optical axis. In FIG. 3 and FIG. 4, 100% corresponds to 0.675 mm. The ordinate of the aberration curve in FIG. 5 shows the incidence height h (F number), and the maximum thereof corresponds to 2.8. The abscissa of FIG. 3 shows the aberration (%), and the abscissas of FIG. 4 and FIG. 5 show the value of the aberration.

For the distortion aberration, the absolute value of the aberration is 4.0%, which is the maximum, at the position of image height 50% (image height 0.338 mm), and the absolute value of the aberration is within 4.0% in a range where the image height is 0.675 mm or less.

For the astigmatism aberration, the absolute value of the aberration is 0.21 mm, which is the maximum, at the position of the image height 45% (image height 0.304 mm), and the absolute value of the aberration is within 0.21 mm in a range where the image height is 0.675 mm or less.

For the chromatic/spherical aberration, the absolute value of the aberration curve 1-8 on the C-line is 0.0177 mm, which is the maximum, at 85% of the incidence height h, and the absolute value of the aberration is within 0.0177 mm.

Therefore according to the imaging lens of the first embodiment, good images are acquired.

Second Embodiment

In the lens system of the second embodiment, the first lens $L_1$ and the third lens $L_3$ are formed of transparent high hardness silicone resin SMX-7852 (made by Fuji Polymer Industries Co., Ltd.) containing transparent adhesive, and the second lens $L_2$ is formed by optical glass BK 7 (made by Ohara Inc.).

(A) The refractive index $N_2$ of the first lens $L_1$ is $N_2$=1.51000.
(B) The refractive index $N_3$ of the second lens $L_2$ is $N_3$=1.51680.
(C) The refractive index $N_4$ of the third lens $L_3$ is $N_4$=1.51000.
(D) The Abbe number $v_2$ of the first lens $L_1$ is $v_2$=56.0.
(E) The Abbe number $v_3$ of the second lens $L_2$ is $v_3$=64.0.
(F) The Abbe number $v_4$ of the third lens $L_3$ is $v_4$=56.0.

Therefore $|N_3-N_2|=|N_3-N_4|=0.00680$, which satisfies the following Conditions (1) and (2). Also $|v_3-v_2|=|v_3-v_4|=8.0$, which satisfies the following Conditions (3) and (4).

Figure 6:
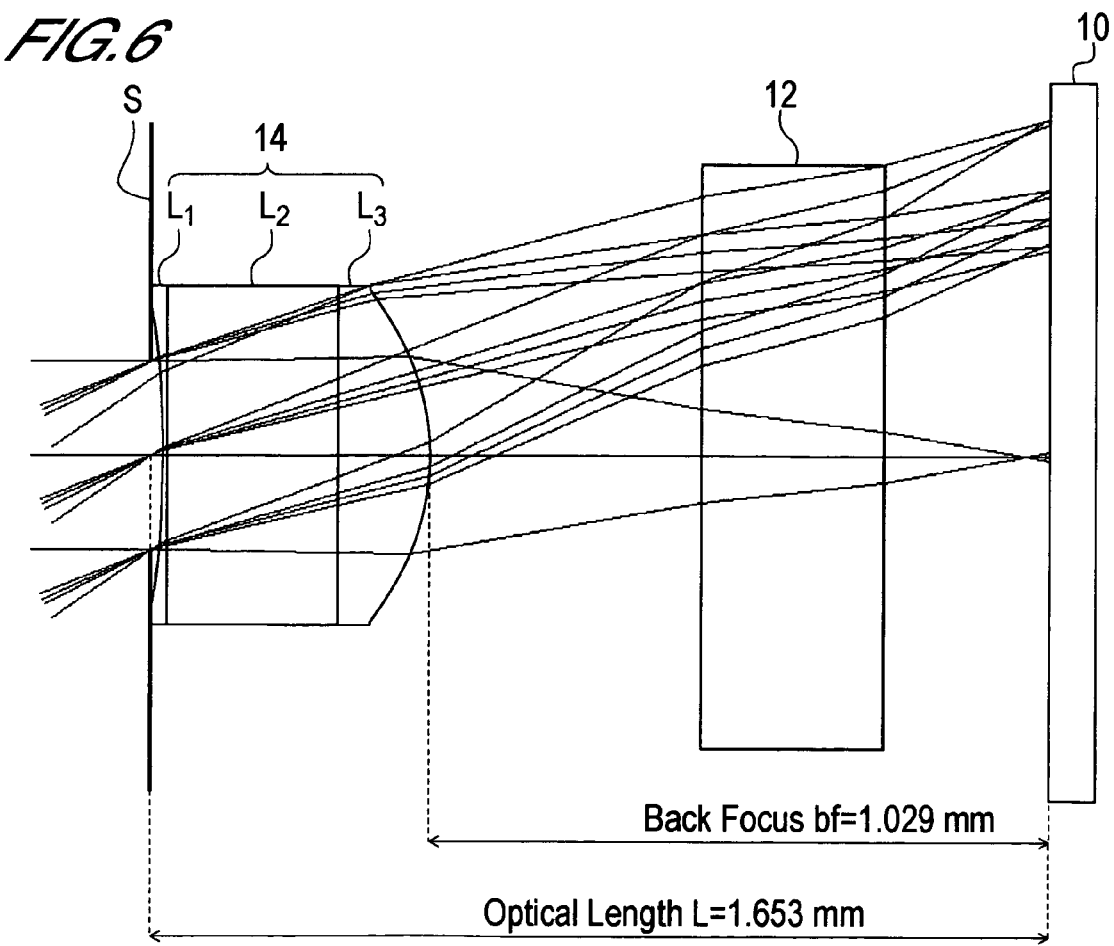
FIG. 6 is a cross-sectional view depicting an imaging lens according to a second embodiment.

FIG. 6 shows a cross-sectional view of the imaging lens of the second embodiment. As FIG. 6 shows, the aperture stop S is formed at a position of an intersection of the first surface (surface at the object side) of the first lens $L_1$ constituting the junction type compound lens 14 and the optical axis. The diaphragm surface is a plane, so $r_1=\infty$ is indicated in Table 2. The F number Fno is 2.8.

As Table 2 shows, $r_3=\infty$ and $r_4=\infty$, so the second lens $L_2$ is a plane parallel glass plate. Since $r_2$ is a negative value and $r_5$ is a negative value, the first lens $L_1$ is a plano-concave lens where the object side face of this first lens $L_1$ is a concave surface facing the object side, and the third lens $L_3$ is a plano-convex lens where the image side face of this third lens $L_3$ is a convex surface facing the image side. The junction type compound lens 14 has a positive refractive power.

As FIG. 6 shows, the optical length L with respect to the focal distance f=1.00 mm is sufficiently short, 1.653 mm, and the back focus bf is sufficiently long, 1.029 mm.

Figure 7:
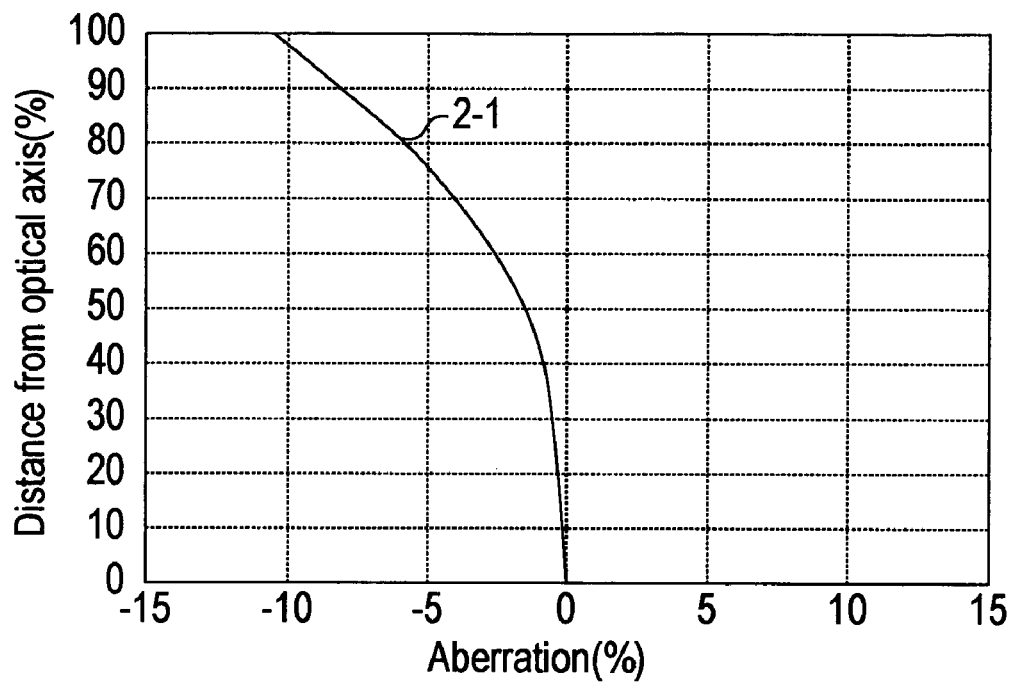
FIG. 7 is a diagram depicting the distortion aberration of the imaging lens of the second embodiment.
Figure 8:
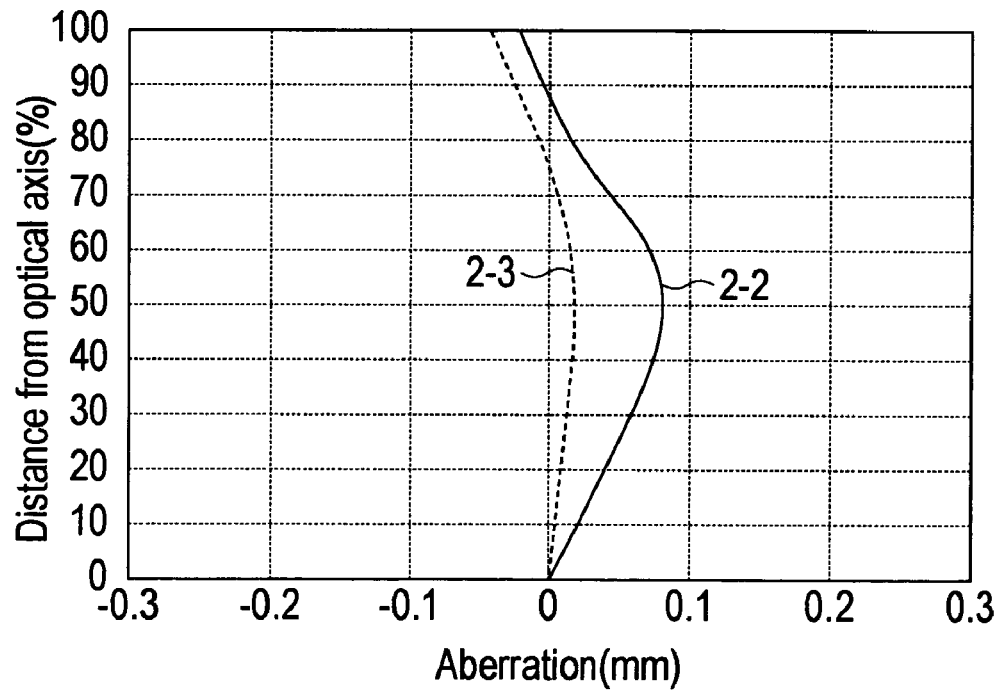
FIG. 8 is a diagram depicting the astigmatism aberration of the imaging lens of the second embodiment.
Figure 9:
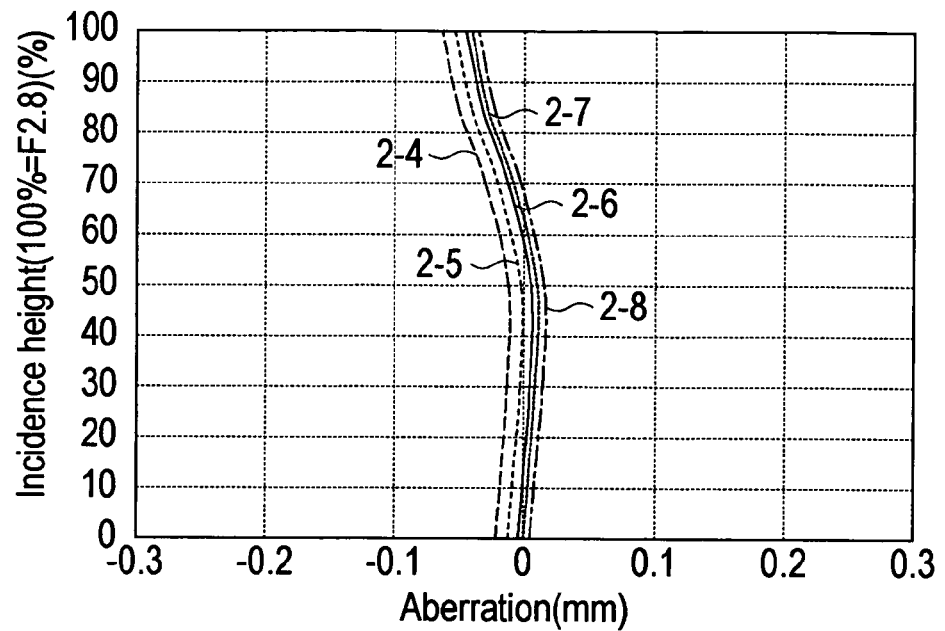
FIG. 9 is a diagram depicting the chromatic/spherical aberration of the imaging lens of the second embodiment.

FIG. 7 shows a graph of the distortion aberration curve 2-1, FIG. 8 shows a graph of the astigmatism aberration curve (aberration curve 2-2 on the meridional surface and aberration curve 2-3 on the sagittal surface), FIG. 9 shows a graph of a chromatic/spherical aberration curve (aberration curve 2-4 on g-line, aberration curve 2-5 on F-line, aberration curve 2-6 on e-line, aberration curve 2-7 on d-line and aberration curve 2-8 on C-line).

Figure 11:
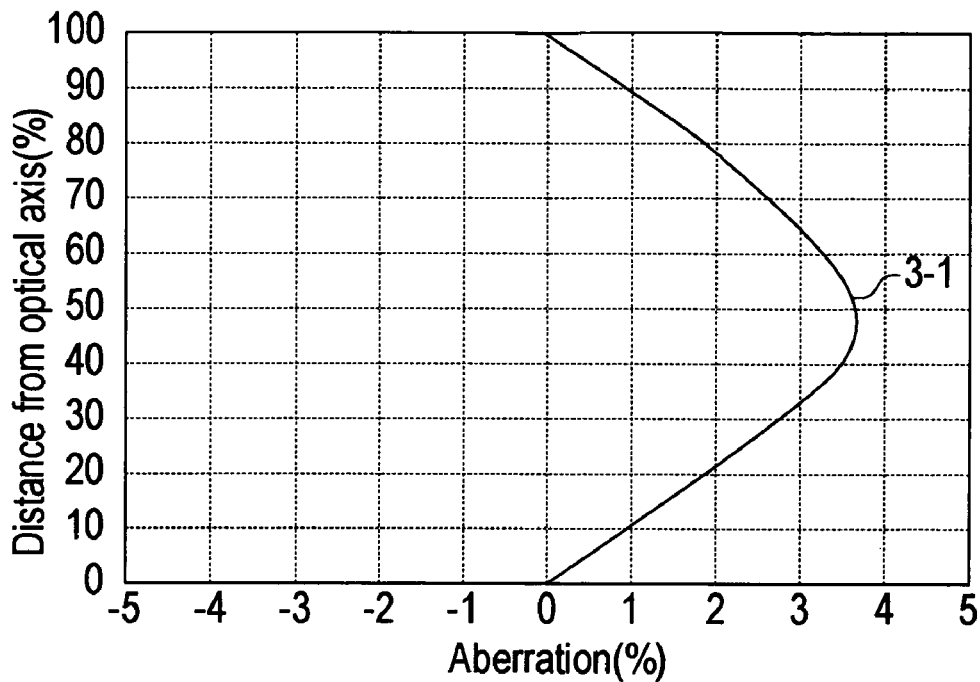
FIG. 11 is a diagram depicting the distortion aberration of the imaging lens of the third embodiment.

The ordinates of the aberration curves in FIG. 7 and FIG. 8 show the image height by a % of the distance from the optical axis. In FIG. 7 and FIG. 8, 100% corresponds to 0.630 mm. The ordinate of the aberration curve in FIG. 9 shows the incidence height h (F number), and the maximum thereof corresponds to 2.8. The abscissa of FIG. 11 shows the aberration (%), and the abscissas of FIG. 8 and FIG. 9 show the value of the aberration.

For the distortion aberration, the absolute value of the aberration is 10.5%, which is the maximum, at the position of image height 100% (image height 0.630 mm), and the absolute value of the aberration is within 10.5% in a range where the image height is 0.630 mm or less.

For the astigmatism aberration, the absolute value of the aberration on the meridional surface is within 0.08 mm, which is the maximum, at the position of the image height 50% (image height 0.315 mm), and the absolute value of the aberration is within 0.08 mm in a range where the image height is 0.630 mm or less.

For the chromatic/spherical aberration, the absolute value of the aberration curve 2-4 on the g-line is 0.0639 mm, which is the maximum, at 100% of the incidence height h, and the absolute value of the aberration is within 0.0639 mm.

Therefore according to the imaging lens of the second embodiment, good images are acquired.

Third Embodiment

In the lens system of the third embodiment, the first lens $L_1$ and the third lens $L_3$ are formed of transparent high hardness silicone resin IVSM-4500 (made by Toshiba Corporation) containing transparent adhesive, and the second lens $L_2$ is formed by optical glass BK 7 (made by Ohara Inc.).

(A) The refractive index $N_2$ of the first lens $L_1$ is $N_2$=1.42000.
(B) The refractive index $N_3$ of the second lens $L_2$ is $N_3$=1.51680.
(C) The refractive index $N_4$ of the third lens $L_3$ is $N_4$=1.42000.
(D) The Abbe number $v_2$ of the first lens $L_1$ is $v_2$=52.0.
(E) The Abbe number $v_3$ of the second lens $L_2$ is $v_3$=64.0.
(F) The Abbe number $v_4$ of the third lens $L_3$ is $v_4$=52.0.

Therefore $|N_3-N_2|=|N_3-N_4|=0.09680$, which satisfies the following Conditions (1) and (2). Also $|v_3-v_2|=|v_3-v_4|=12.0$, which satisfies the following Conditions (3) and (4).

Figure 10:
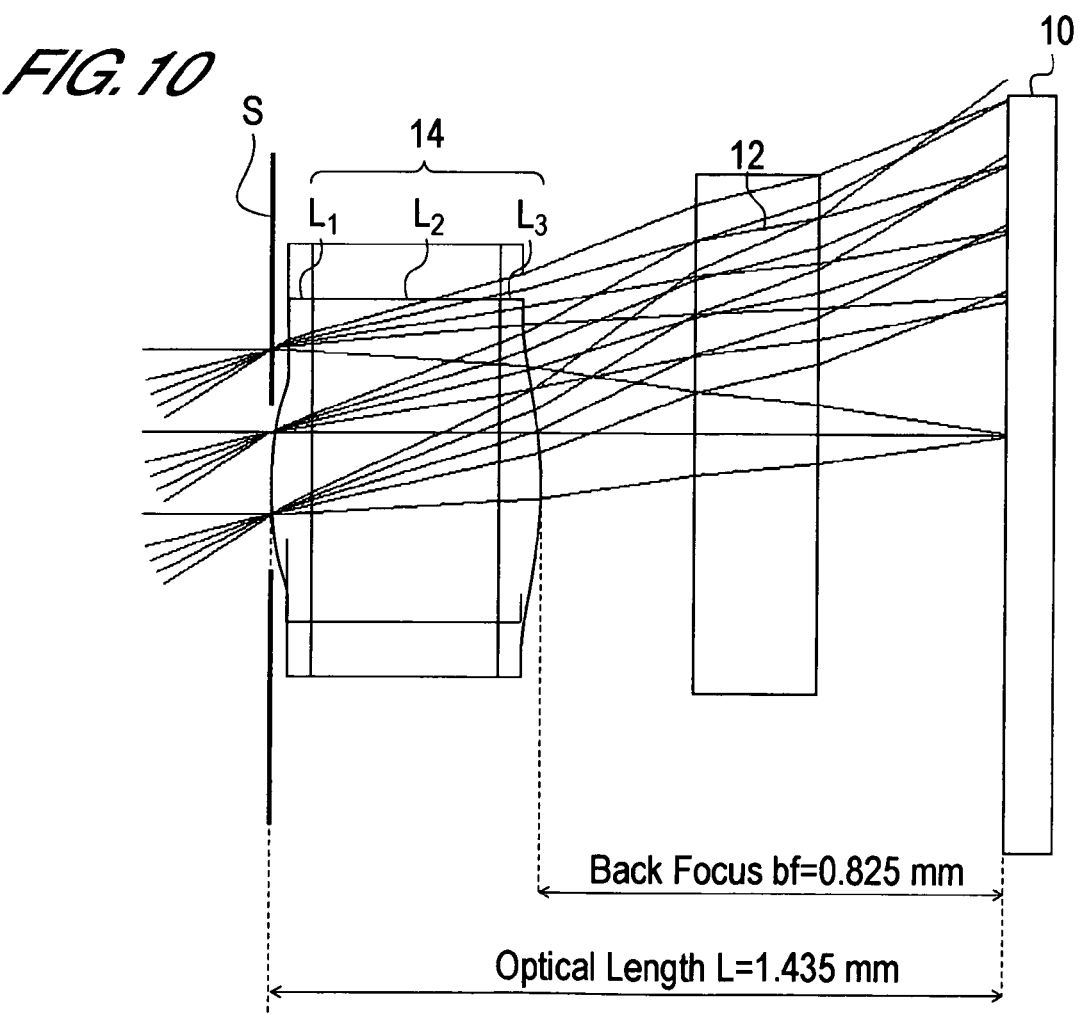
FIG. 10 is a cross-sectional view depicting an imaging lens according to a third embodiment.

FIG. 10 shows a cross-sectional view of the imaging lens of the third embodiment. As FIG. 10 shows, the aperture stop S is formed at a position of an intersection of the first surface (surface at the object side) of the first lens $L_1$ constituting the junction type compound lens 14 and the optical axis. The diaphragm surface is a plane, so $r_1=\infty$ is indicated in Table 3. The F number Fno is 3.0.

As Table 3 shows, $r_3=\infty$ and $r_4=\infty$, so the second lens $L_2$ is a plane parallel glass plate. Since $r_2$ is a positive value and $r_5$ is a negative value, the first lens $L_1$ is a plano-convex lens where the object side face of this first lens $L_1$ is a convex surface facing the object side, and the third lens $L_3$ is a plano-convex lens where the image side face of this third lens $L_3$ is a convex surface facing the image side. The junction type compound lens 14 has a positive refractive power.

As FIG. 10 shows, the optical length L with respect to the focal distance f=1.00 mm is sufficiently short, 1.435 mm, and the back focus bf is sufficiently long, 0.825 mm.

Figure 12:
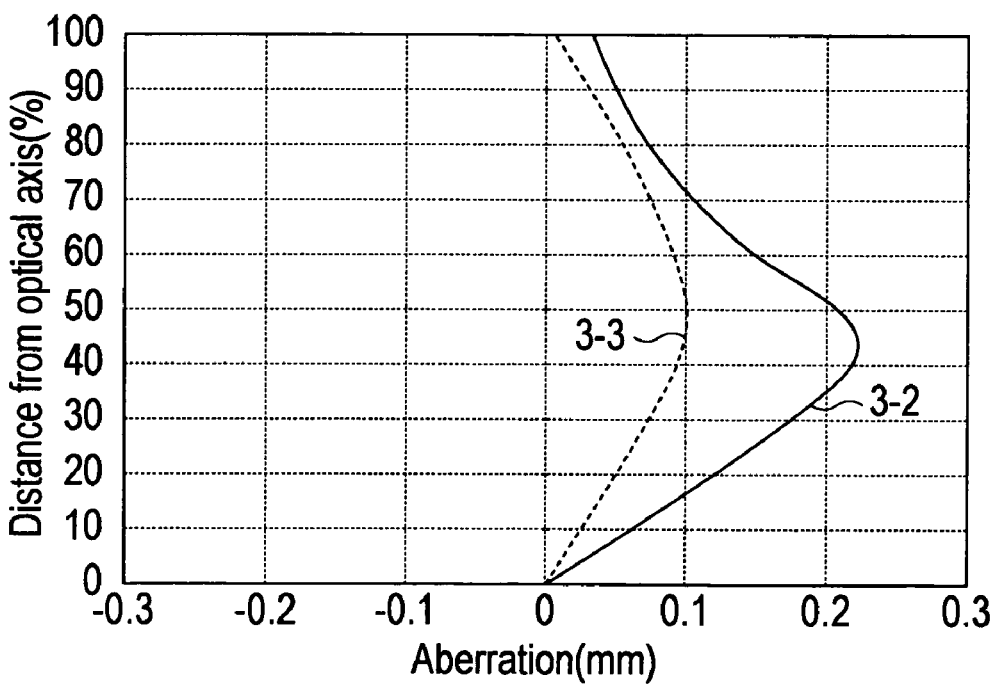
FIG. 12 is a diagram depicting the astigmatism aberration of the imaging lens of the third embodiment.
Figure 13:
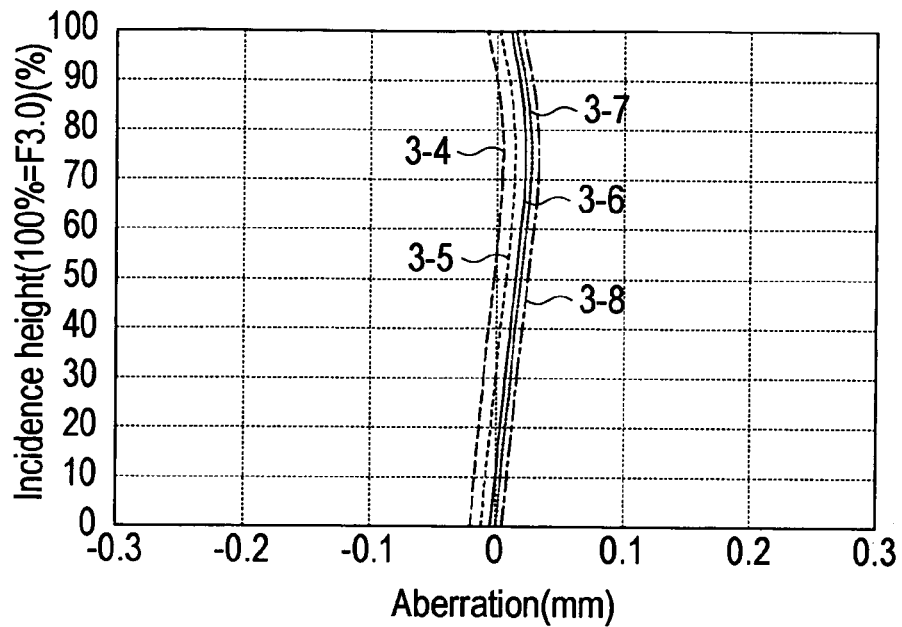
FIG. 13 is a diagram depicting the chromatic/spherical aberration of the imaging lens of the third embodiment.

FIG. 11 shows a graph of the distortion aberration curve 3-1, FIG. 12 shows a graph of the astigmatism aberration curve (aberration curve 3-2 on the meridional surface and aberration curve 3-3 on the sagittal surface), FIG. 13 shows a graph of a chromatic/spherical aberration curve (aberration curve 3-4 on g-line, aberration curve 3-5 on F-line, aberration curve 3-6 on e-line, aberration curve 3-7 on d-line and aberration curve 3-8 on C-line).

The ordinates of the aberration curves in FIG. 11 and FIG. 12 show the image height by a % of the distance from the optical axis. In FIG. 11 and FIG. 12, 100% corresponds to 0.676 mm. The ordinate of the aberration curve in FIG. 13 shows the incidence height h (F number), and the maximum thereof corresponds to 3.0. The abscissa of FIG. 11 shows the aberration (%), and the abscissas of FIG. 12 and FIG. 13 show the value of the aberration.

For the distortion aberration, the absolute value of the aberration is 3.7%, which is the maximum, at the position of image height 50% (image height 0.338 mm), and the absolute value of the aberration is within 3.7% in a range where the image height is 0.676 mm or less.

For the astigmatism aberration, the absolute value of the aberration is 0.22 mm, which is the maximum, at the position of the image height 45% (image height 0.304 mm), and the absolute value of the aberration is within 0.22 mm in a range where the image height is 0.676 mm or less.

For the chromatic/spherical aberration, the absolute value of the aberration curve 3-8 on the C-line is 0.0322 mm, which is the maximum, at 70% of the incidence height h, and the absolute value of the aberration is within 0.0322 mm.

Therefore according to the imaging lens of the third embodiment, good images are acquired.

Fourth Embodiment

In the lens system of the fourth embodiment, the first lens $L_1$ and the third lens $L_3$ are formed of transparent high hardness silicone resin SMX-7852 (made by Fuji Polymer Industries Co., Ltd.) containing transparent adhesive, and the second lens $L_2$ is formed by optical glass BK 7 (made by Ohara Inc.).
(A) The refractive index $N_2$ of the first lens $L_1$ is $N_2$=1.51000.
(B) The refractive index $N_3$ of the second lens $L_2$ is $N_3$=1.51680.
(C) The refractive index $N_4$ of the third lens $L_3$ is $N_4$=1.51000.
(D) The Abbe number $v_2$ of the first lens $L_1$ is $v_2$=40.0.
(E) The Abbe number $v_3$ of the second lens $L_2$ is $v_3$=64.0.
(F) The Abbe number $v_4$ of the third lens $L_3$ is $v_4$=40.0.

Therefore $|N_3-N_2|=|N_3-N_4|=0.00680$, which satisfies the following Conditions (1) and (2). Also $|v_3-v_2|=|v_3-v_4|=24.0$, which satisfies the following Conditions (3) and (4).

Figure 14:
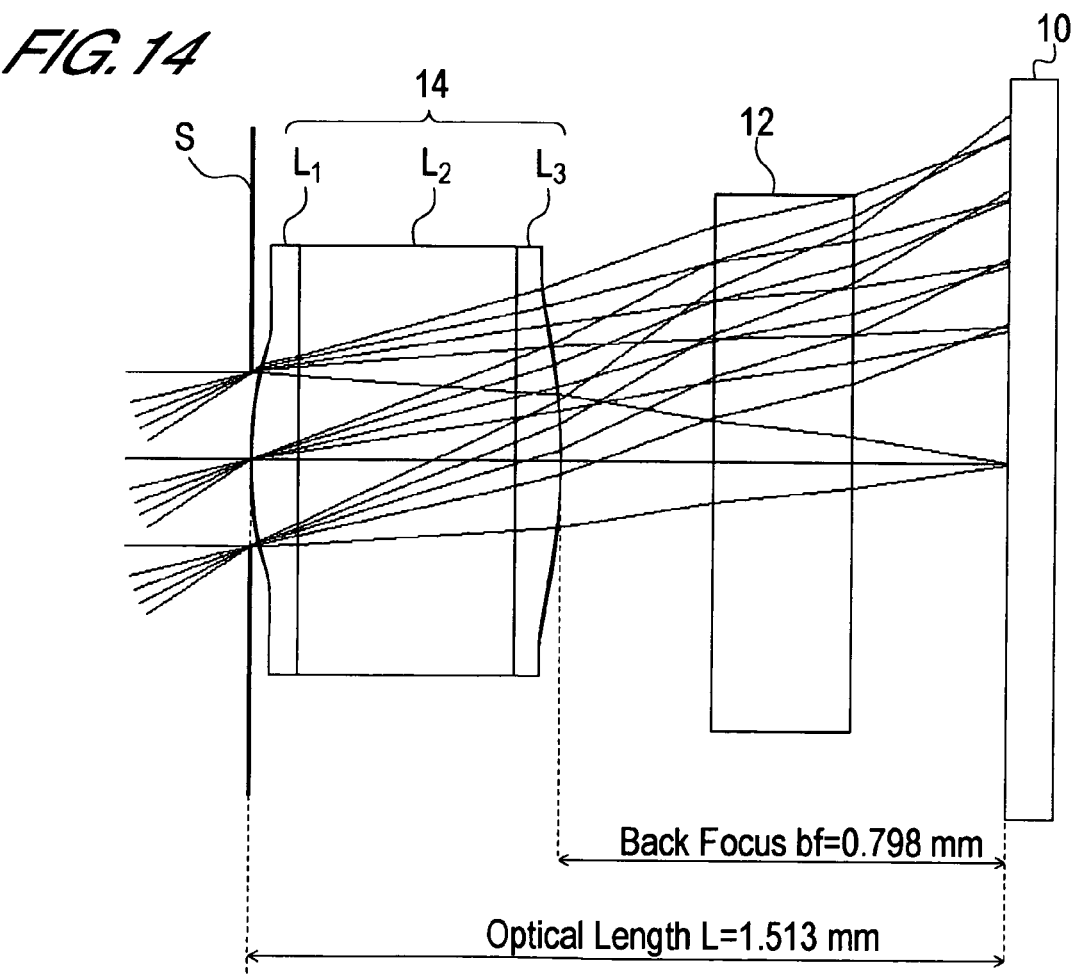
FIG. 14 is a diagram depicting the imaging lens according to a fourth embodiment.

FIG. 14 shows a cross-sectional view of the imaging lens of the fourth embodiment. As FIG. 14 shows, the aperture stop S is formed at a position of an intersection of the first surface (surface at the object side) of the first lens $L_1$ constituting the junction type compound lens 14 and the optical axis. The diaphragm surface is a plane, so $r_1=\infty$ is indicated in Table 4. The F number Fno is 2.8.

As Table 4 shows, $r_3=\infty$ and $r_4=\infty$, so the second lens $L_2$ is a plane parallel glass plate. Since $r_2$ is a positive value and $r_5$ is a negative value, the first lens $L_1$ is a plano-convex lens where the object side face of this first lens $L_1$ is a convex surface facing the object side, and the third lens $L_3$ is a plano-convex lens where the image side face of this third lens $L_3$ is a convex surface facing the image side. The junction type compound lens 14 has a positive refractive power.

As FIG. 14 shows, the optical length L with respect to the focal distance f=1.00 mm is sufficiently short, 1.513 mm, and the back focus bf is sufficiently long, 0.798 mm.

Figure 15:
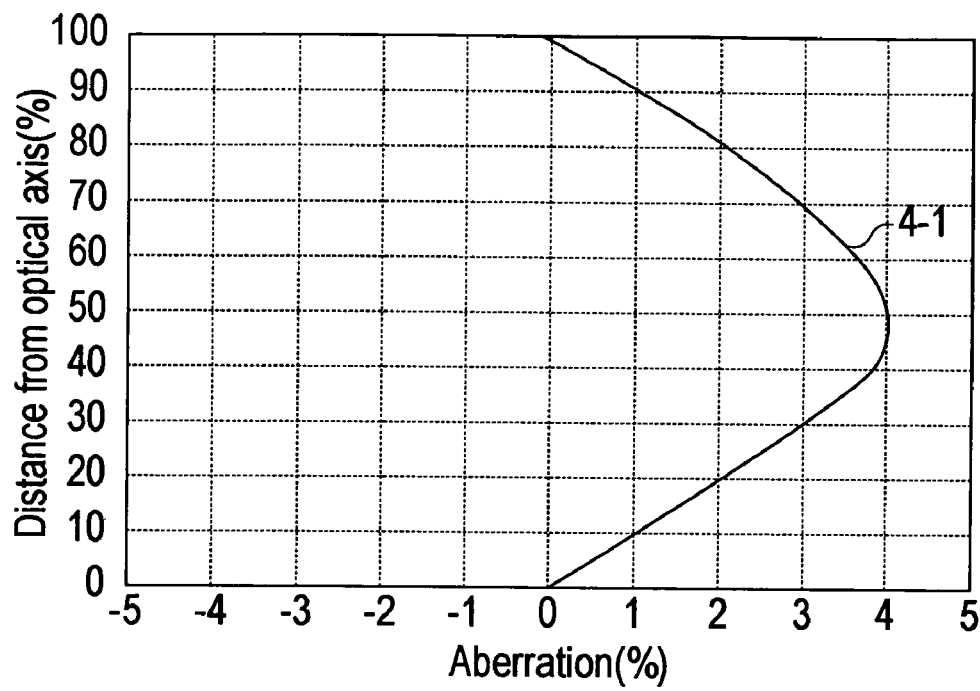
FIG. 15 is a diagram depicting the distortion aberration of the imaging lens of the fourth embodiment.
Figure 16:
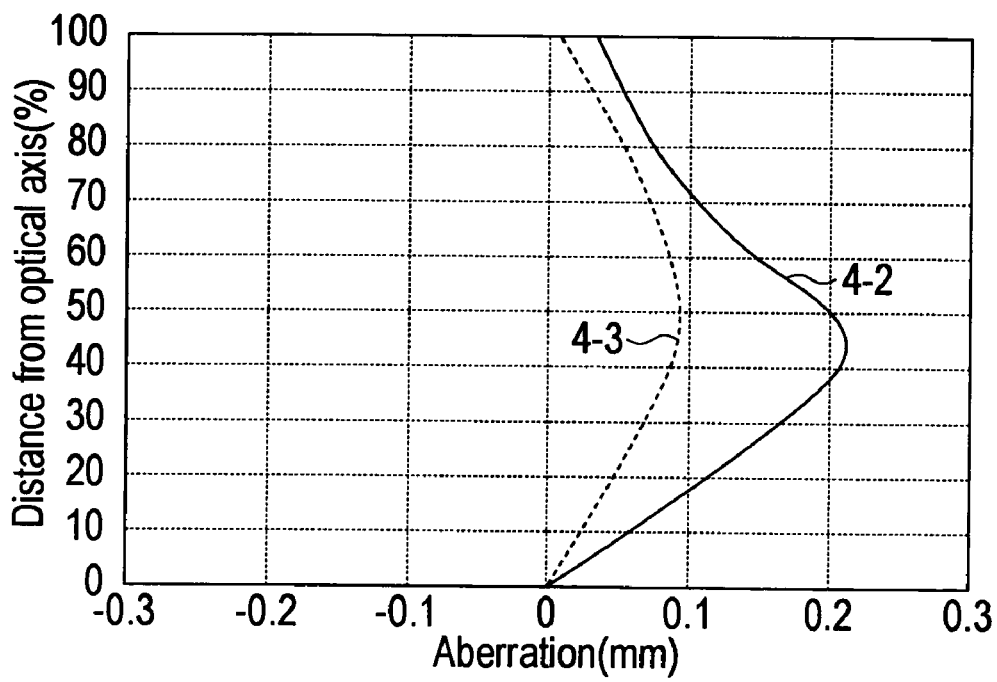
FIG. 16 is a diagram depicting the astigmatism aberration of the imaging lens of the fourth embodiment.
Figure 17:
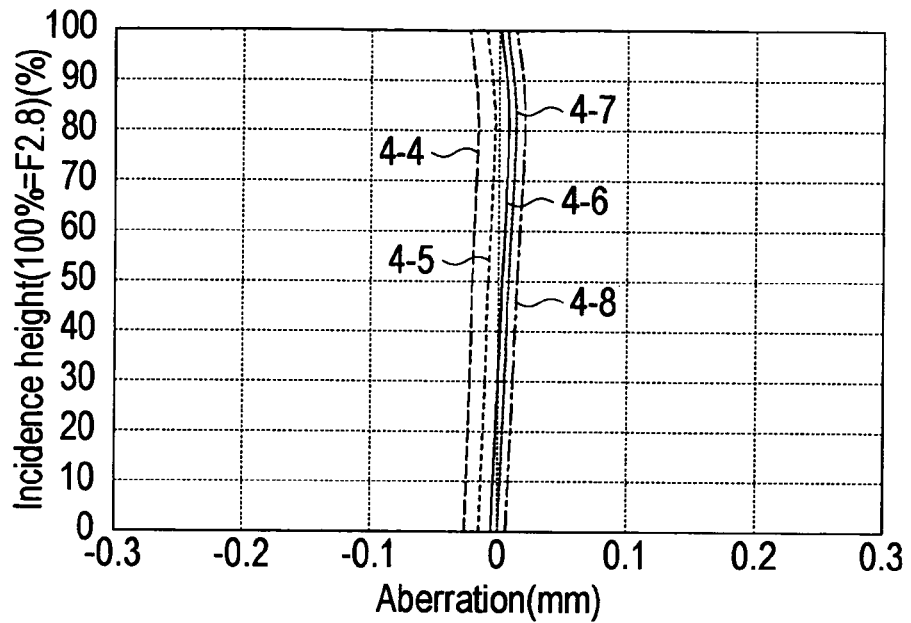
FIG. 17 is a diagram depicting the chromatic/spherical aberration of the imaging lens of the fourth embodiment.

FIG. 15 shows a graph of the distortion aberration curve 4-1, FIG. 16 shows a graph of the astigmatism aberration curve (aberration curve 4-2 on the meridional surface and aberration curve 4-3 on the sagittal surface), FIG. 17 shows a graph of a chromatic/spherical aberration curve (aberration curve 4-4 on g-line, aberration curve 4-5 on F-line, aberration curve 4-6 on e-line, aberration curve 4-7 on d-line and aberration curve 4-8 on C-line).

The ordinates of the aberration curves in FIG. 15 and FIG. 16 show the image height by a % of the distance from the optical axis. In FIG. 15 and FIG. 16, 100% corresponds to 0.675 mm. The ordinate of the aberration curve in FIG. 17 shows the incidence height h (F number), and the maximum thereof corresponds to 2.8. The abscissa of FIG. 15 shows the aberration (%), and the abscissas of FIG. 16 and FIG. 17 show the value of the aberration.

For the distortion aberration, the absolute value of the aberration is within 4.0%, which is the maximum, at the position of image height 50% (image height 0.338 mm), and the absolute value of the aberration is within 4.0% in a range where the image height is 0.675 mm or less.

For the astigmatism aberration, the absolute value of the aberration is 0.21 mm, which is the maximum, at the position of the image height 45% (image height 0.304 mm), and the absolute value of the aberration is within 0.21 mm in a range where the image height is 0.675 mm or less.

For the chromatic/spherical aberration, the absolute value of the aberration curve 4-4 on the g-line is 0.0260 mm, which is the maximum, at 0% of the incidence height h (lens center), and the absolute value of the aberration is within 0.0260 mm.

Therefore according to the imaging lens of the fourth embodiment, good images are acquired.

Fifth Embodiment

In the lens system of the fifth embodiment, the first lens $L_1$ and the third lens $L_3$ are formed of transparent high hardness silicone resin SMX-7852 (made by Fuji Polymer Industries Co., Ltd.) containing transparent adhesive, and the second lens $L_2$ is formed by optical glass BK 7 (made by Ohara Inc.).
(A) The refractive index $N_2$ of the first lens $L_1$ is $N_2$=1.51000.
(B) The refractive index $N_3$ of the second lens $L_2$ is $N_3$=1.51680.
(C) The refractive index $N_4$ of the third lens $L_3$ is $N_4$=1.51000.
(D) The Abbe number $v_2$ of the first lens $L_1$ is $v_2$=56.0.
(E) The Abbe number $v_3$ of the second lens $L_2$ is $v_3$=64.0.
(F) The Abbe number $v_4$ of the third lens $L_3$ is $v_4$=56.0.

Therefore $|N_3-N_2|=|N_3-N_4|=0.00680$, which satisfies the following Conditions (1) and (2). Also $|v_3-v_2|=|v_3-v_4|=8.0$, which satisfies the following Conditions (3) and (4).

Figure 18:
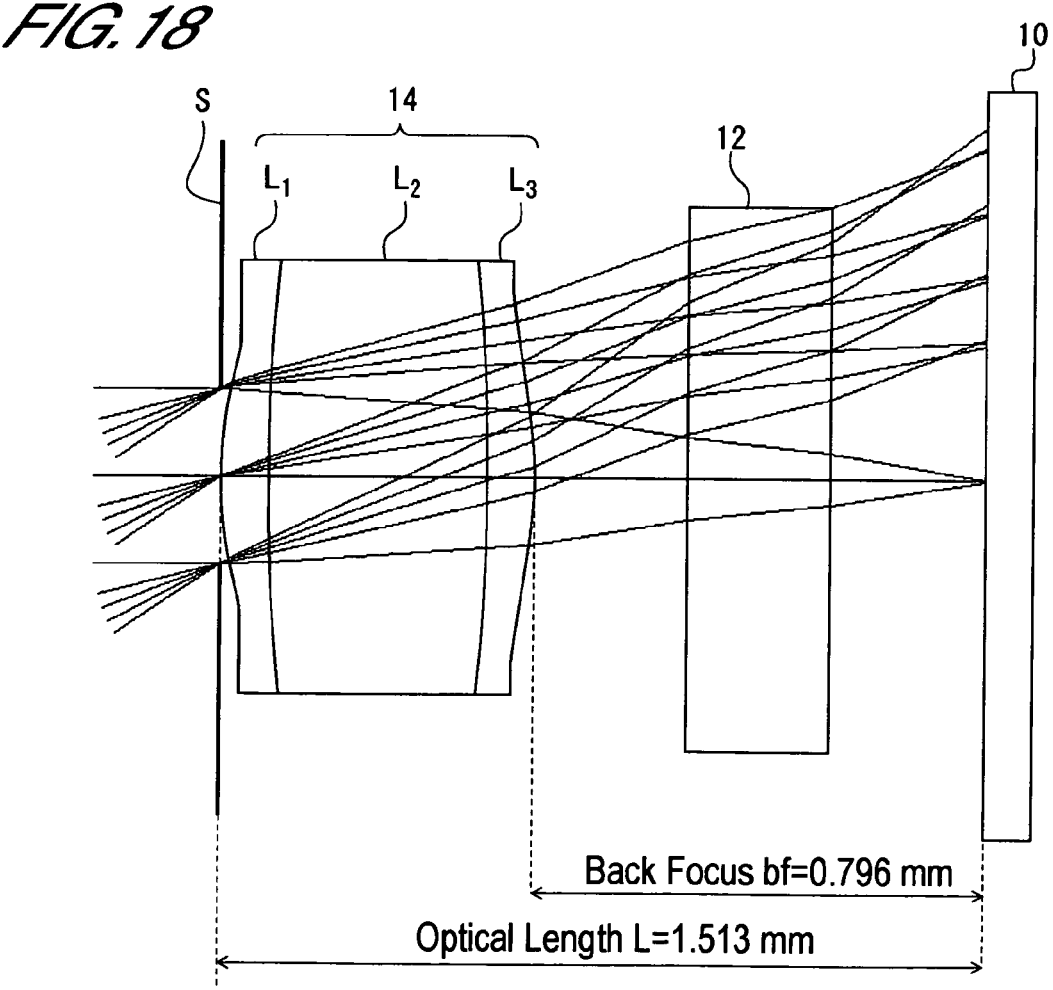
FIG. 18 is a cross-sectional view depicting an imaging lens according to a fifth embodiment.

FIG. 18 shows a cross-sectional view of the imaging lens of the fifth embodiment. As FIG. 18 shows, the aperture stop S is formed at a position of an intersection of the first surface (surface at the object side) of the first lens $L_1$ constituting the junction type compound lens 14 and the optical axis. The diaphragm surface is a plane, so $r_1=\infty$ is indicated in Table 5. The F number Fno is 2.8.

As Table 5 shows, $r_3$ is a positive value and $r_4$ is a negative value, so the second lens $L_2$ is a bi-convex glass lens. Since $r_2$ is a positive value and $r_5$ is a negative value, the first lens $L_1$ is a lens where the object side face of this first lens $L_1$ is a convex surface facing the object side, and the third lens $L_3$ is a lens where the image side face of this third lens $L_3$ is a convex surface facing the image side. The junction type compound lens 14 has a positive refractive power.

As FIG. 18 shows, the optical length L with respect to the focal distance f=1.00 mm is sufficiently short, 1.513 mm, and the back focus bf is sufficiently long, 0.796 mm.

Figure 19:
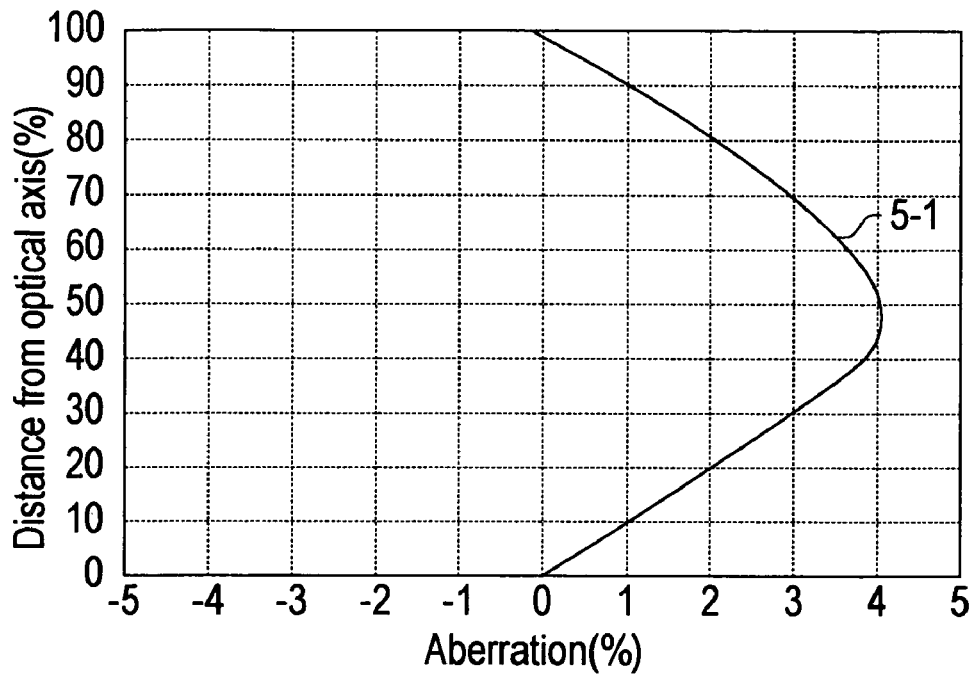
FIG. 19 is a diagram depicting the distortion aberration of the imaging lens of the fifth embodiment.
Figure 20:
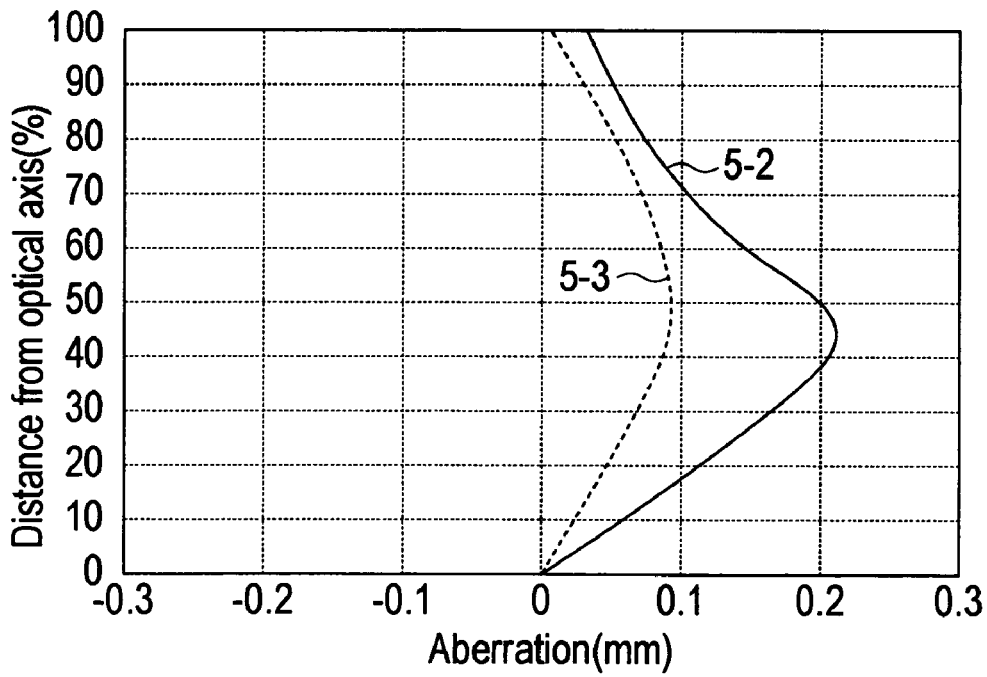
FIG. 20 is a diagram depicting the astigmatism aberration of the imaging lens of the fifth embodiment.
Figure 21:
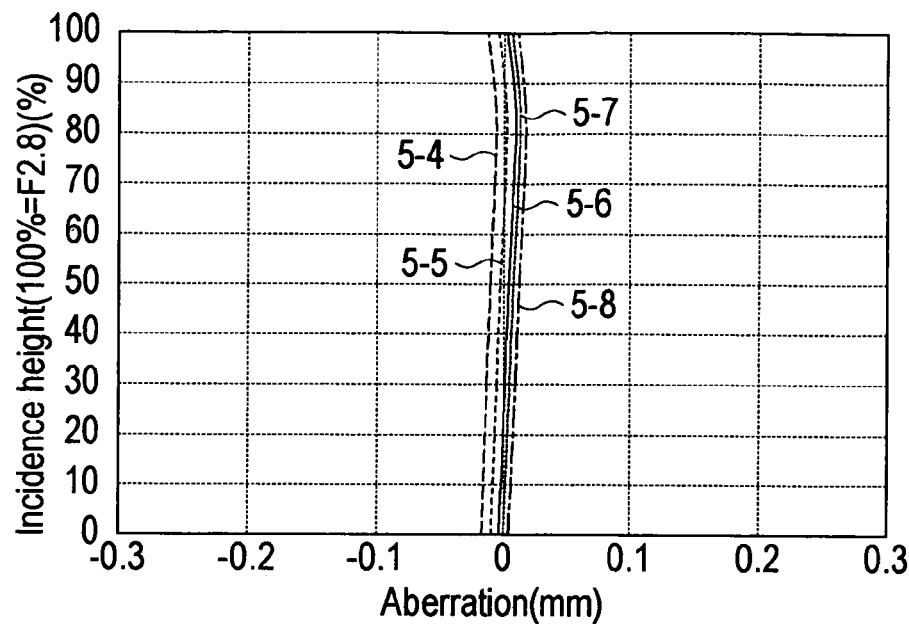
FIG. 21 is a diagram depicting the chromatic/spherical aberration of the imaging lens of the fifth embodiment.

FIG. 19 shows a graph of the distortion aberration curve 5-1, FIG. 20 shows a graph of the astigmatism aberration curve (aberration curve 5-2 on the meridional surface and aberration curve 5-3 on the sagittal surface), FIG. 21 shows a graph of a chromatic/spherical aberration curve (aberration curve 5-4 on g-line, aberration curve 5-5 on F-line, aberration curve 5-6 on e-line, aberration curve 5-7 on d-line and aberration curve 5-8 on C-line).

The ordinates of the aberration curves in FIG. 19 and FIG. 20 show the image height by a % of the distance from the optical axis. In FIG. 19 and FIG. 20, 100% corresponds to 0.676 mm. The ordinate of the aberration curve in FIG. 21 shows the incidence height h (F number), and the maximum thereof corresponds to 2.8. The abscissa of FIG. 19 shows the aberration (%), and the abscissas of FIG. 20 and FIG. 21 show the value of the aberration.

For the distortion aberration, the absolute value of the aberration is 4.1%, which is the maximum, at the position of image height 48% (image height 0.324 mm), and the absolute value of the aberration is within 4.1% in a range where the image height is 0.676 mm or less.

For the astigmatism aberration, the absolute value of the aberration is 0.21 mm, which is the maximum, at the position of the image height 45% (image height 0.304 mm), and the absolute value of the aberration is within 0.21 mm in a range where the image height is 0.676 mm or less.

For the chromatic/spherical aberration, the absolute value of the aberration curve 5-8 on the C-line is 0.174 mm, which is the maximum, at 85% of the incidence height h, and the absolute value of the aberration is within 0.0174 mm.

Therefore according to the imaging lens of the fifth embodiment, good images are acquired.

Sixth Embodiment

In the lens system of the sixth embodiment, the first lens $L_1$ and the third lens $L_3$ are formed of transparent high hardness silicone resin SMX-7852 (made by Fuji Polymer Industries Co., Ltd.) containing transparent adhesive, and the second lens $L_2$ is formed by optical glass BK 7 (made by Ohara Inc.).
(A) The refractive index $N_2$ of the first lens $L_1$ is $N_2$=1.51000.
(B) The refractive index $N_3$ of the second lens $L_2$ is $N_3$=1.51680.
(C) The refractive index $N_4$ of the third lens $L_3$ is $N_4$=1.51000.
(D) The Abbe number $v_2$ of the first lens $L_1$ is $v_2$=56.0.
(E) The Abbe number $v_3$ of the second lens $L_2$ is $v_3$=64.0.
(F) The Abbe number $v_4$ of the third lens $L_3$ is $v_4$=56.0.

Therefore $|N_3-N_2|=|N_3-N_4|=0.00680$, which satisfies the following Conditions (1) and (2). Also $|v_3-v_2|=|v_3-v_4|=8.0$, which satisfies the following Conditions (3) and (4).

Figure 22:
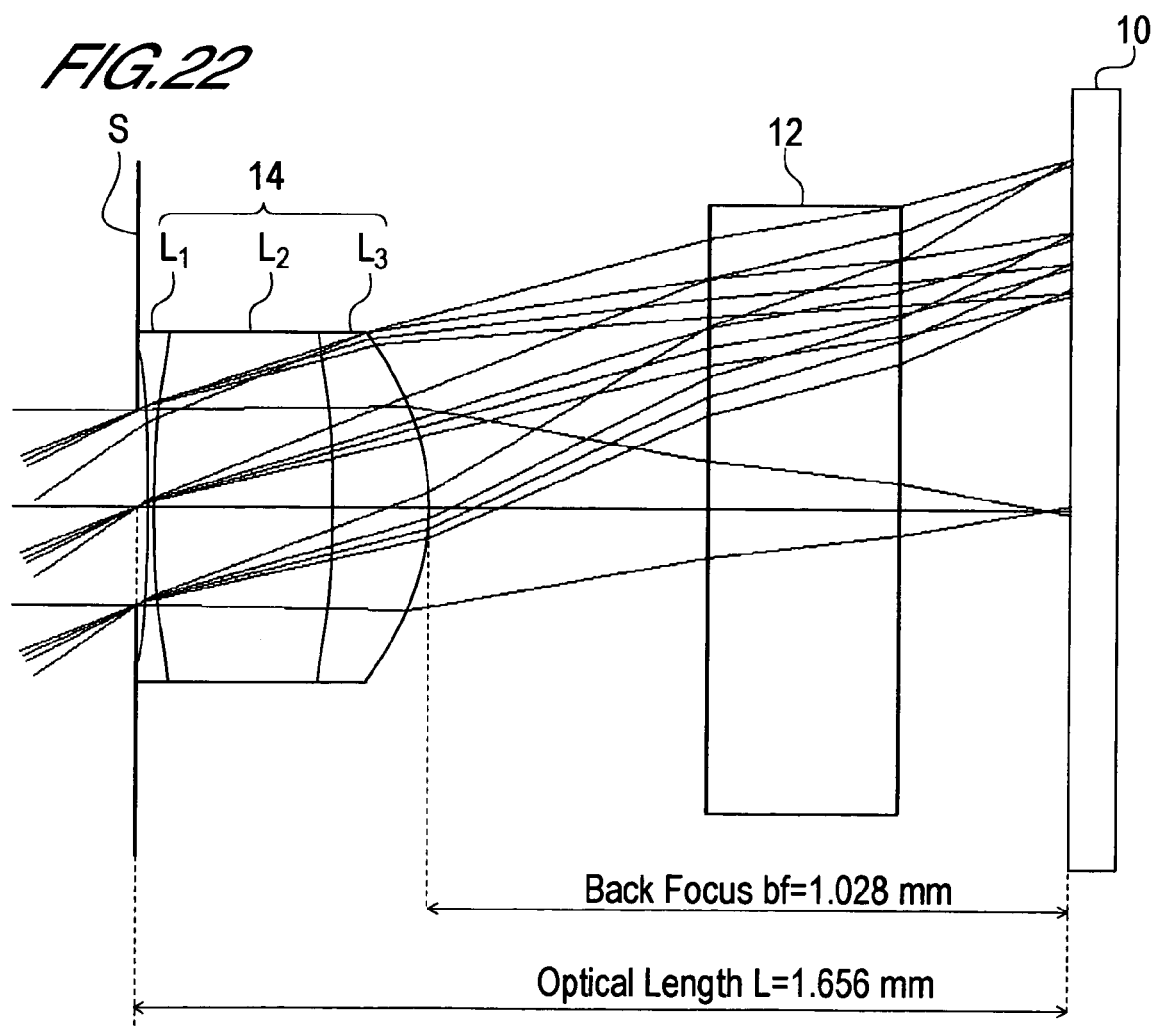
FIG. 22 is a cross-sectional view depicting an imaging lens according to a sixth embodiment.

FIG. 22 shows a cross-sectional view of the imaging lens of the sixth embodiment. As FIG. 22 shows, the aperture stop S is formed at a position of an intersection of the first surface (surface at the object side) of the first lens $L_1$ constituting the junction type compound lens 14 and the optical axis. The diaphragm surface is a plane, so $r_1=\infty$ is indicated in Table 6. The F number Fno is 2.8.

As Table 6 shows, $r_3$ is a positive value and $r_4$ is a negative value, so the second lens $L_2$ is a bi-convex glass lens. Since $r_2$ is a negative value and $r_5$ is also a negative value, the first lens $L_1$ is a lens where the object side face of this first lens $L_1$ is a concave surface facing the object side, and the third lens $L_3$ is a lens where the image side face of this third lens $L_3$ is a convex surface facing the image side. The junction type compound lens 14 has a positive refractive power.

As FIG. 22 shows, the optical length L with respect to the focal distance f=1.00 mm is sufficiently short, 1.656 mm, and the back focus bf is sufficiently long, 1.028 mm.

Figure 23:
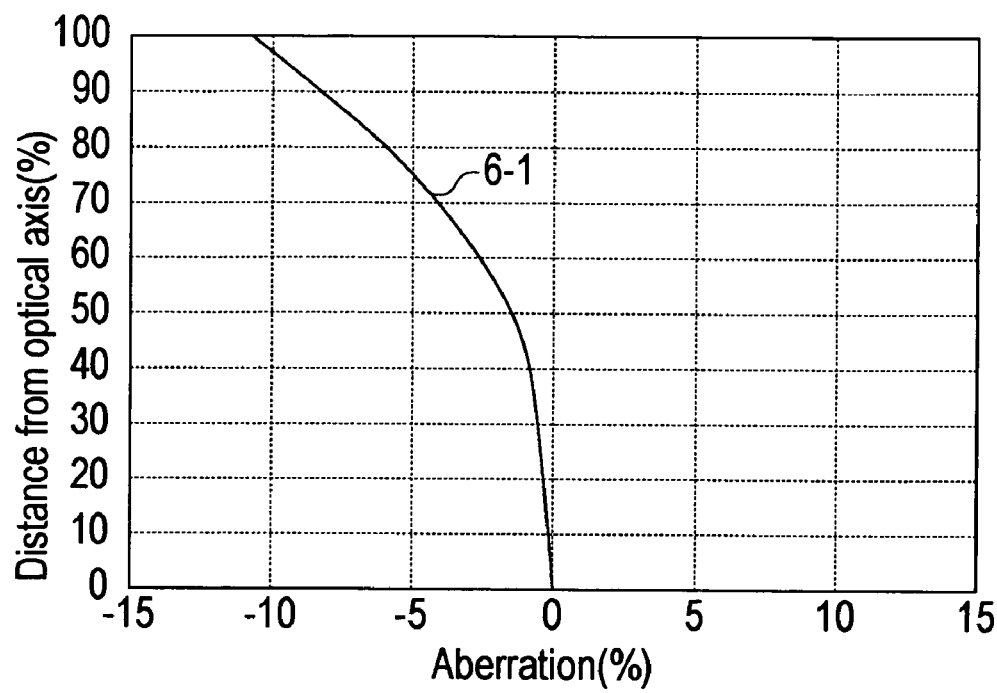
FIG. 23 is a diagram depicting the distortion aberration of the imaging lens of the sixth embodiment.
Figure 24:
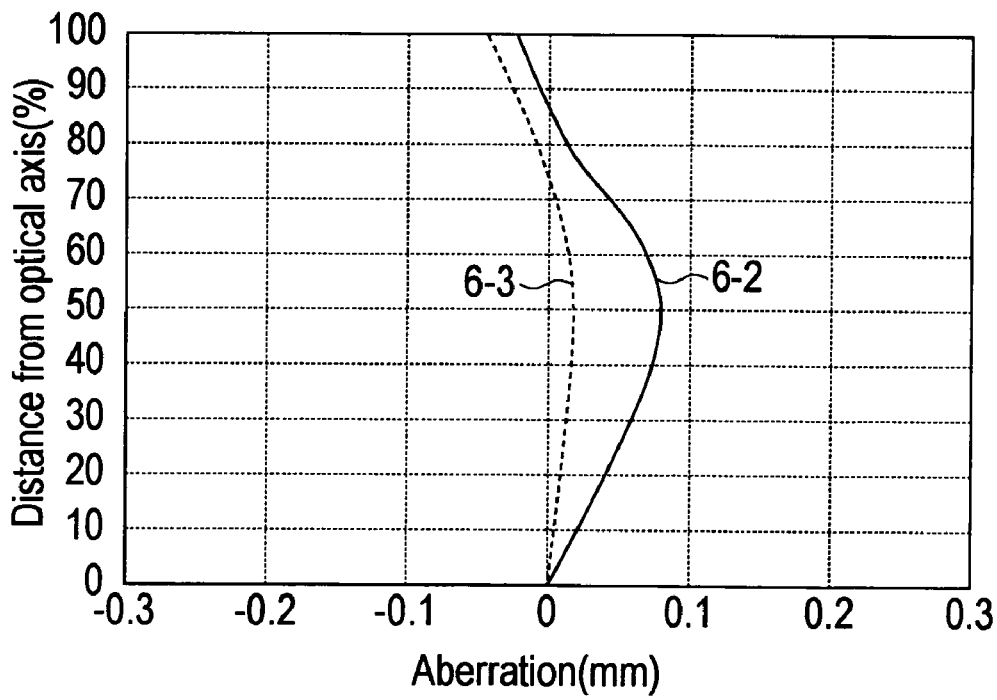
FIG. 24 is a diagram depicting the astigmatism aberration of the imaging lens of the sixth embodiment.
Figure 25:
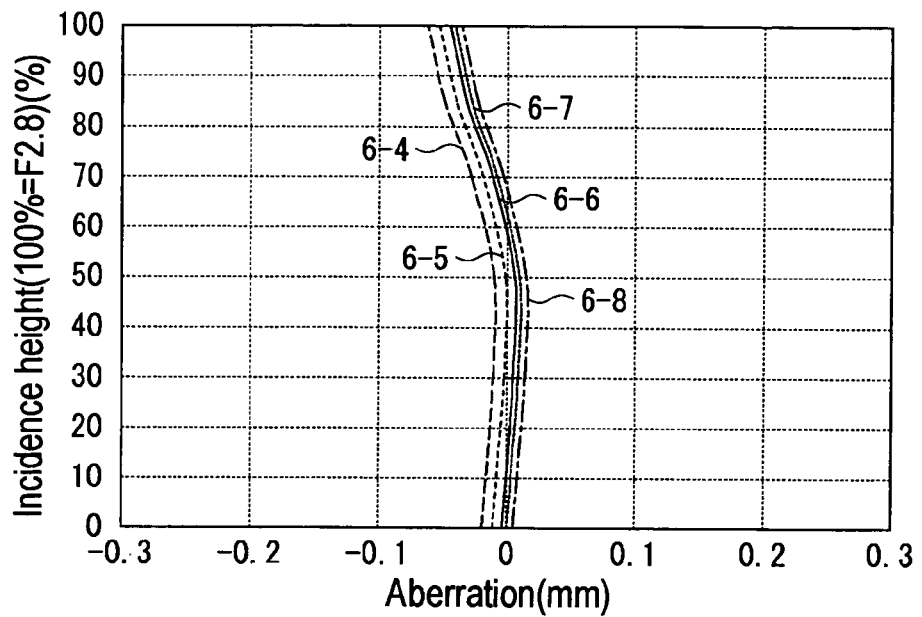
FIG. 25 is a diagram depicting the chromatic/spherical aberration of the imaging lens of the sixth embodiment.

FIG. 23 shows a graph of the distortion aberration curve 6-1, FIG. 24 shows a graph of the astigmatism aberration curve (aberration curve 6-2 on the meridional surface and aberration curve 6-3 on the sagittal surface), FIG. 25 shows a graph of a chromatic/spherical aberration curve (aberration curve 6-4 on g-line, aberration curve 6-5 on F-line, aberration curve 6-6 on e-line, aberration curve 6-7 on d-line and aberration curve 6-8 on C-line).

The ordinates of the aberration curves in FIG. 23 and FIG. 24 show the image height by a % of the distance from the optical axis. In FIG. 23 and FIG. 24, 100% corresponds to 0.630 mm. The ordinate of the aberration curve in FIG. 25 shows the incidence height h (F number), and the maximum thereof corresponds to 2.8. The abscissa of FIG. 23 shows the aberration (%), and the abscissas of FIG. 24 and FIG. 25 show the value of the aberration.

For the distortion aberration, the absolute value of the aberration is 10.7%, which is the maximum, at the position of image height 100% (image height 0.634 mm), and the absolute value of the aberration is within 10.7% in a range where the image height is 0.634 mm or less.

For the astigmatism aberration, the absolute value of the aberration is 0.076 mm, which is the maximum, at the position of the image height 50% (image height 0.317 mm), and the absolute value of the aberration is within 0.076 mm in a range where the image height is 0.634 mm or less.

For the chromatic/spherical aberration, the absolute value of the aberration curve 6-4 on the g-line is 0.0623 mm, which is the maximum, at 100% of the incidence height h, and the absolute value of the aberration is within 0.0623 mm.

Therefore according to the imaging lens of the sixth embodiment, good images are acquired.

Seventh Embodiment

In the lens system of the seventh embodiment, the first lens $L_1$ and the third lens $L_3$ are formed of transparent high hardness silicone resin SMX-7852 (made by Fuji Polymer Industries Co., Ltd.) containing transparent adhesive, and the second lens $L_2$ is formed by optical glass BK 7 (made by Ohara Inc.).
(A) The refractive index $N_2$ of the first lens $L_1$ is $N_2$=1.51000.
(B) The refractive index $N_3$ of the second lens $L_2$ is $N_3$=1.51680.
(C) The refractive index $N_4$ of the third lens $L_3$ is $N_4$=1.51000.
(D) The Abbe number $v_2$ of the first lens $L_1$ is $v_2$=56.0.
(E). The Abbe number $v_3$ of the second lens $L_2$ is $v_3$=64.0.
(F) The Abbe number $v_4$ of the third lens $L_3$ is $v_4$=56.0.

Therefore $|N_3-N_2|=|N_3-N_4|=0.00680$, which satisfies the following Conditions (1) and (2). Also $|v_3-v_2|=|v_3-v_4|=8.0$, which satisfies the following Conditions (3) and (4).

Figure 26:
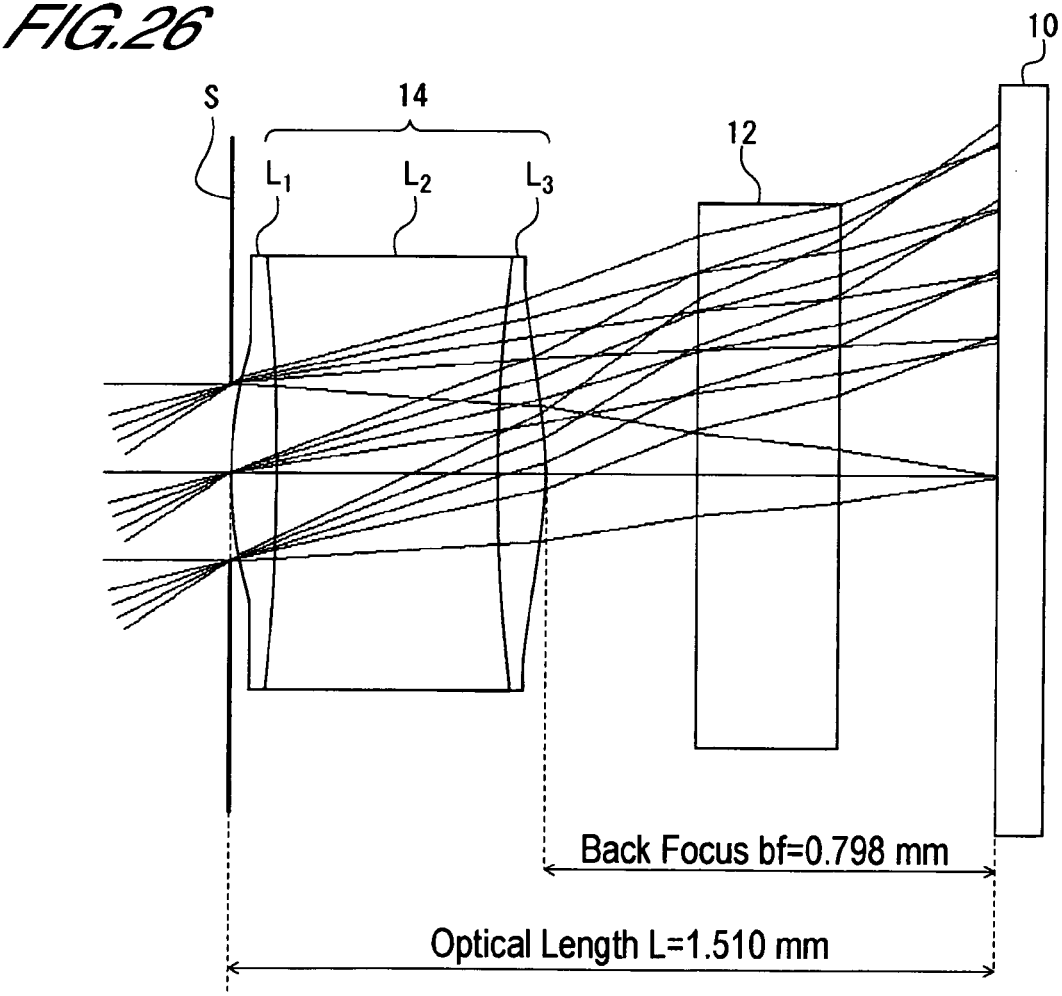
FIG. 26 is a cross-sectional view depicting an imaging lens according to a seventh embodiment.

FIG. 26 shows a cross-sectional view of the imaging lens of the seventh embodiment. As FIG. 26 shows, the aperture stop S is formed at a position of an intersection of the first surface (surface at the object side) of the first lens $L_1$ constituting the junction type compound lens 14 and the optical axis. The diaphragm surface is a plane, so $r_1=\infty$ is indicated in Table 7. The F number Fno is 2.8.

As Table 7 shows, $r_3$ is a negative value and $r_4$ is a positive value, so the second lens $L_2$ is a bi-concave glass lens. Since $r_2$ is a positive value and $r_5$ is a negative value, the first lens $L_1$ is a lens where the object side face of this first lens $L_1$ is a convex surface facing the object side, and the third lens $L_3$ is a lens where the image side face of this third lens $L_3$ is a convex surface facing the image side. The junction type compound lens 14 has a positive refractive power.

As FIG. 26 shows, the optical length L with respect to the focal distance f=1.00 mm is sufficiently short, 1.510 mm, and the back focus bf is sufficiently long, 0.798 mm.

Figure 27:
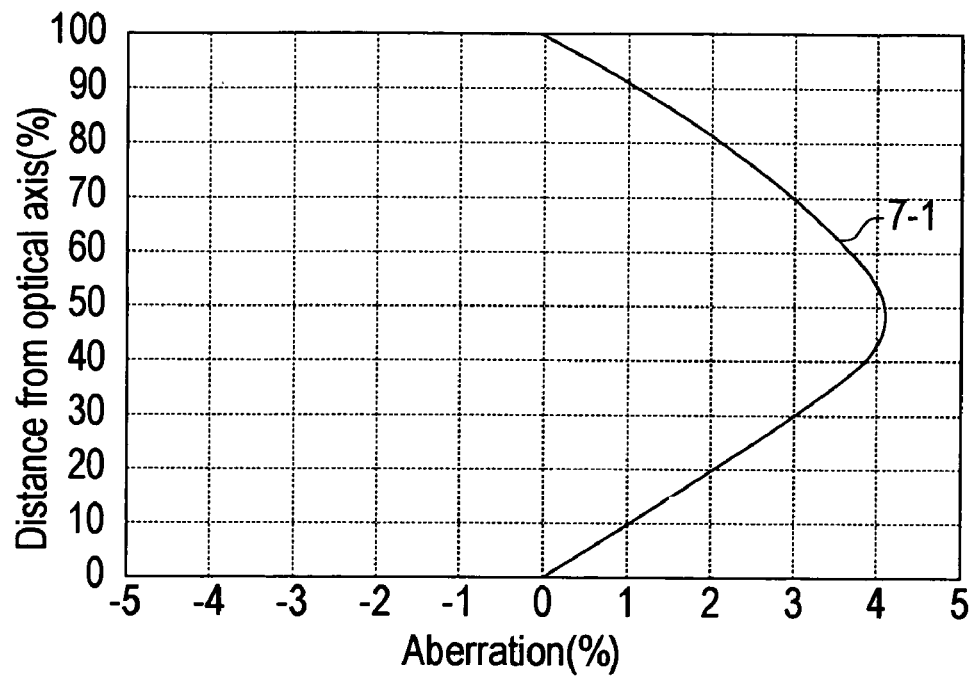
FIG. 27 is a diagram depicting the distortion aberration of the imaging lens of the seventh embodiment.
Figure 28:
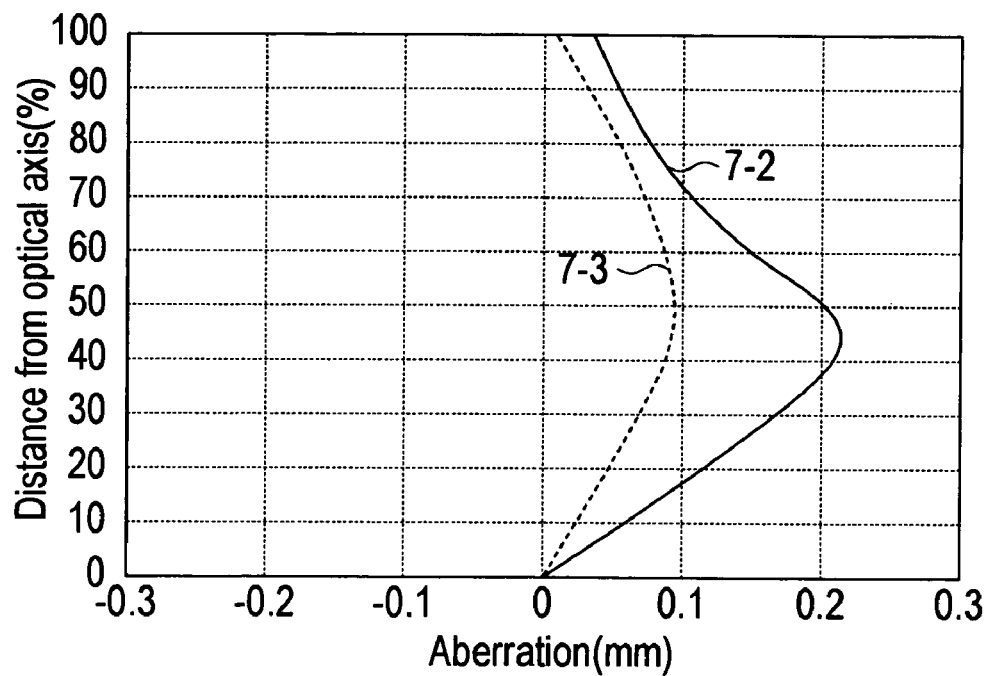
FIG. 28 is a diagram depicting the astigmatism aberration of the imaging lens of the seventh embodiment.
Figure 29:
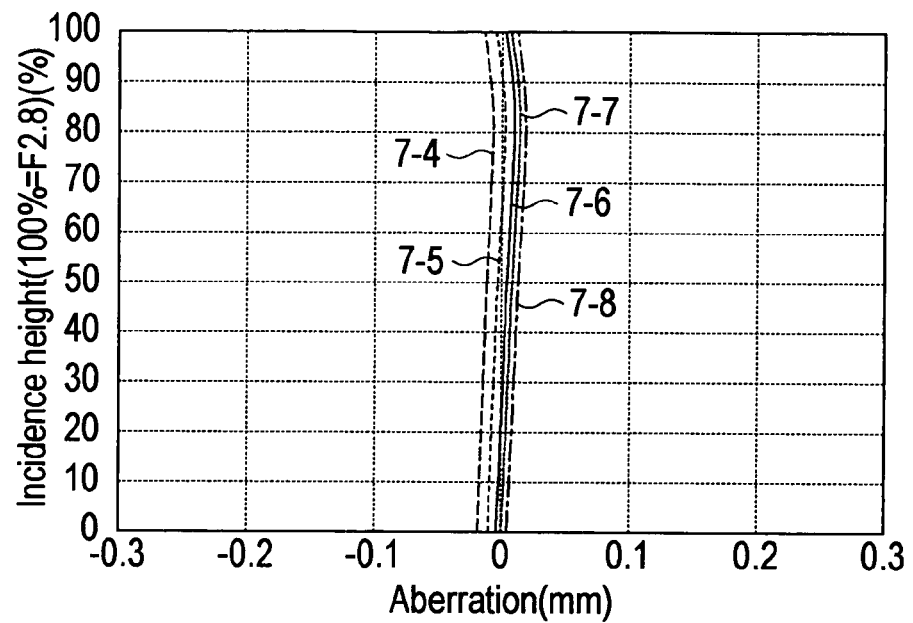
FIG. 29 is a diagram depicting the chromatic/spherical aberration of the imaging lens of the seventh embodiment.

FIG. 27 shows a graph of the distortion aberration curve 7-1, FIG. 28 shows a graph of the astigmatism aberration curve (aberration curve 7-2 on the meridional surface and aberration curve 7-3 on the sagittal surface), FIG. 29 shows a graph of a chromatic/spherical aberration curve (aberration curve 7-4 on g-line, aberration curve 7-5 on F-line, aberration curve 7-6 on e-line, aberration curve 7-7 on d-line and aberration curve 7-8 on C-line).

The ordinates of the aberration curves in FIG. 27 and FIG. 28 show the image height by a % of the distance from the optical axis. In FIG. 27 and FIG. 28, 100% corresponds to 0.676 mm. The ordinate of the aberration curve in FIG. 29 shows the incidence height h (F number), and the maximum thereof corresponds to 2.8. The abscissa of FIG. 27 shows the aberration (%), and the abscissas of FIG. 28 and FIG. 29 show the value of the aberration.

For the distortion aberration, the absolute value of the aberration is 4.1%, which is the maximum, at the position of image height 50% (image height 0.338 mm), and the absolute value of the aberration is within 4.1% in a range where the image height is 0.676 mm or less.

For the astigmatism aberration, the absolute value of the aberration is 0.212 mm, which is the maximum, at the position of the image height 45% (image height 0.304 mm), and the absolute value of the aberration is within 0.212 mm in a range where the image height is 0.676 mm or less.

For the chromatic/spherical aberration, the absolute value of the aberration curve 7-8 on the C-line is 0.0185 mm, which is the maximum, at 85% of the incidence height h, and the absolute value of the aberration is within 0.0185 mm.

Therefore according to the imaging lens of the seventh embodiment, good images are acquired.

Eighth Embodiment

In the lens system of the eighth embodiment, the first lens $L_1$ and the third lens $L_3$ are formed of transparent high hardness silicone resin SMX-7852 (made by Fuji Polymer Industries Co., Ltd.) containing transparent adhesive, and the second lens $L_2$ is formed by optical glass BK 7 (made by Ohara Inc.).

(A) The refractive index $N_2$ of the first lens $L_1$ is $N_2=1.51000$.
(B) The refractive index $N_3$ of the second lens $L_2$ is $N_3=1.51680$.
(C) The refractive index $N_4$ of the third lens $L_3$ is $N_4=1.51000$.
(D) The Abbe number $v_2$ of the first lens $L_1$ is $v_2=56.0$.
(E) The Abbe number $v_3$ of the second lens $L_2$ is $v_3=64.0$.
(F) The Abbe number $v_4$ of the third lens $L_3$ is $v_4=56.0$.

Therefore $|N_3-N_2|=|N_3-N_4|=0.00680$, which satisfies the following Conditions (1) and (2). Also $|v_3-v_2|=|v_3-v_4|=8.0$, which satisfies the following Conditions (3) and (4).

Figure 30:
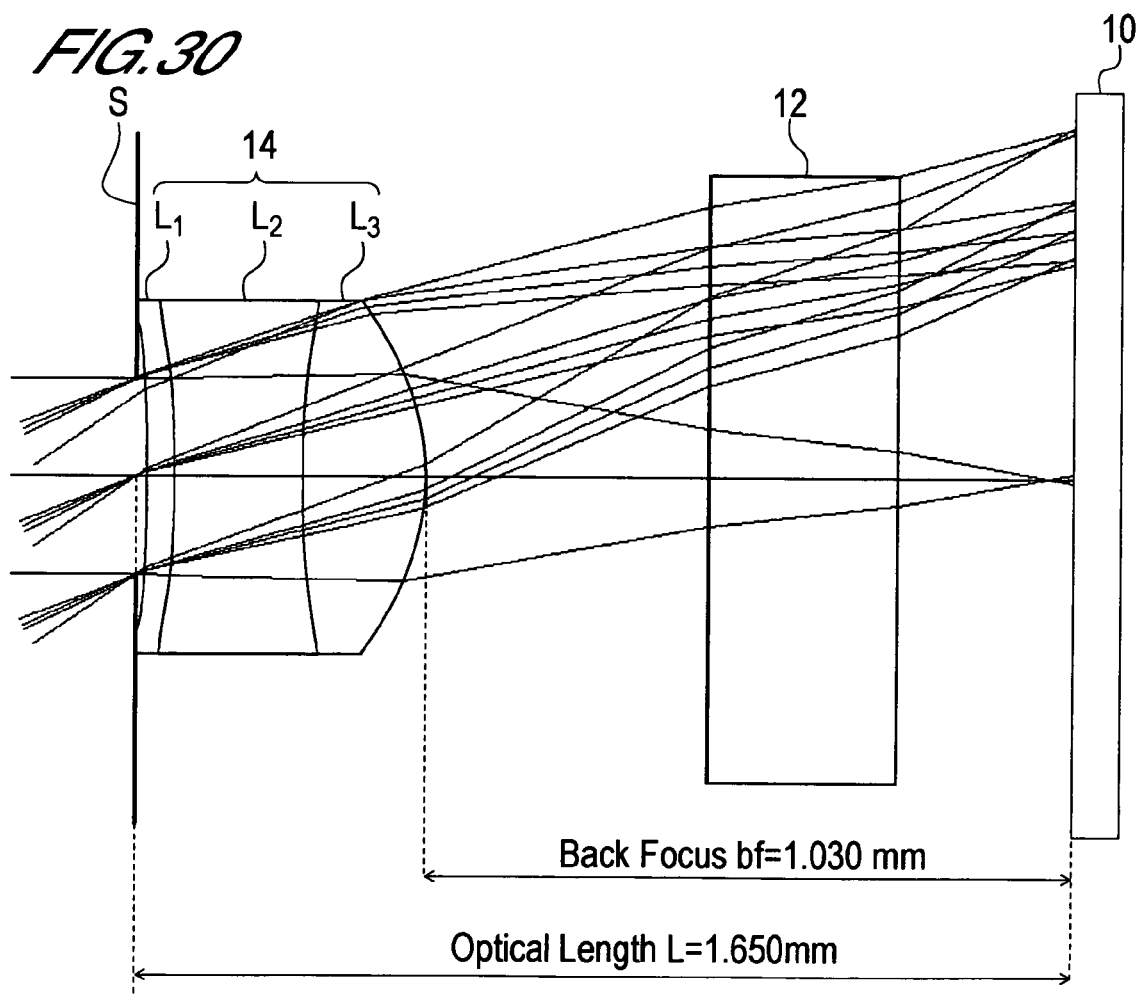
FIG. 30 is a cross-sectional view depicting an imaging lens according to an eighth embodiment.

FIG. 30 shows a cross-sectional view of the imaging lens of the eighth embodiment. As FIG. 30 shows, the aperture stop S is formed at a position of an intersection of the first surface (surface at the object side) of the first lens $L_1$ constituting the junction type compound lens 14 and the optical axis. The diaphragm surface is a plane, so $r_1=\infty$ is indicated in Table 8. The F number Fno is 2.8.

As Table 8 shows, $r_3$ is a negative value and $r_4$ is a positive value, so the second lens $L_2$ is a bi-concave glass lens. Since $r_2$ is a negative value and $r_5$ is also a negative value, the first lens $L_1$ is a lens where the object side face of this first lens $L_1$ is a convex surface facing the object side, and the third lens $L_3$ is a lens where the image side face of this third lens $L_3$ is a concave surface facing the image side. The junction type compound lens 14 has a positive refractive power.

As FIG. 30 shows, the optical length L with respect to the focal distance f=1.00 mm is sufficiently short, 1.650 mm, and the back focus bf is sufficiently long, 1.030 mm.

Figure 31:
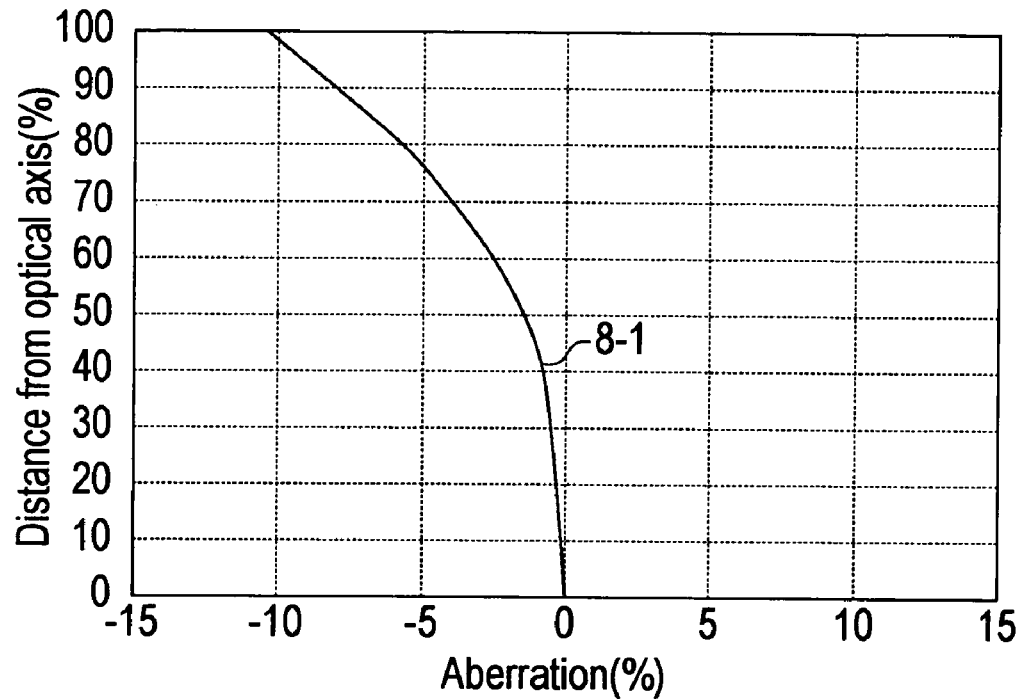
FIG. 31 is a diagram depicting the distortion aberration of the imaging lens of the eighth embodiment.
Figure 32:
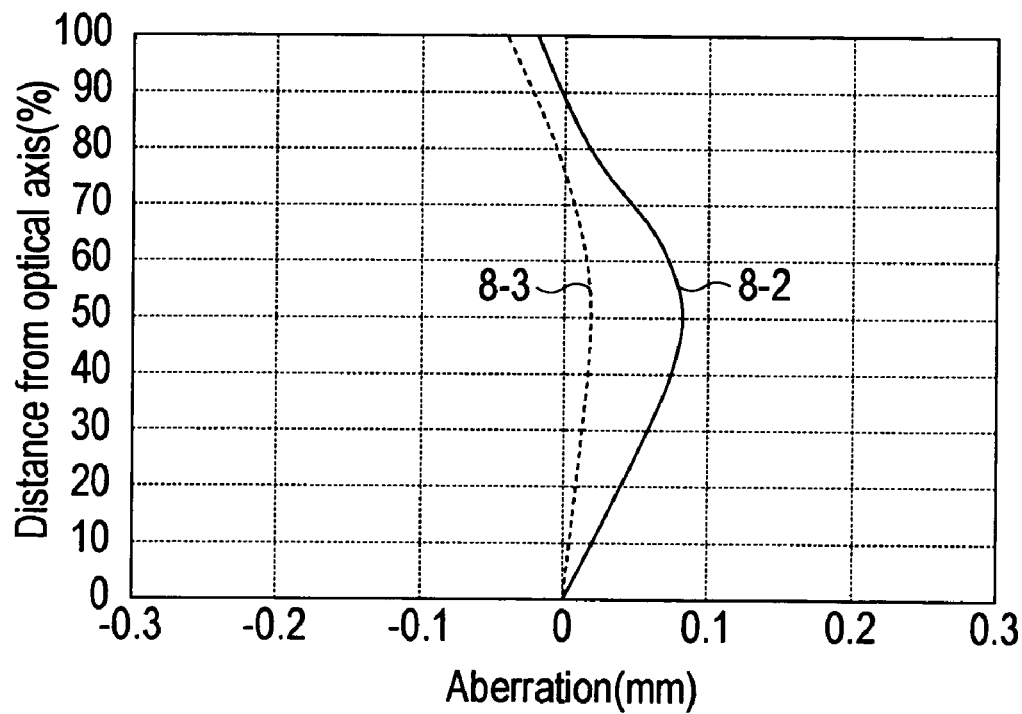
FIG. 32 is a diagram depicting the astigmatism aberration of the imaging lens of the eighth embodiment.
Figure 33:
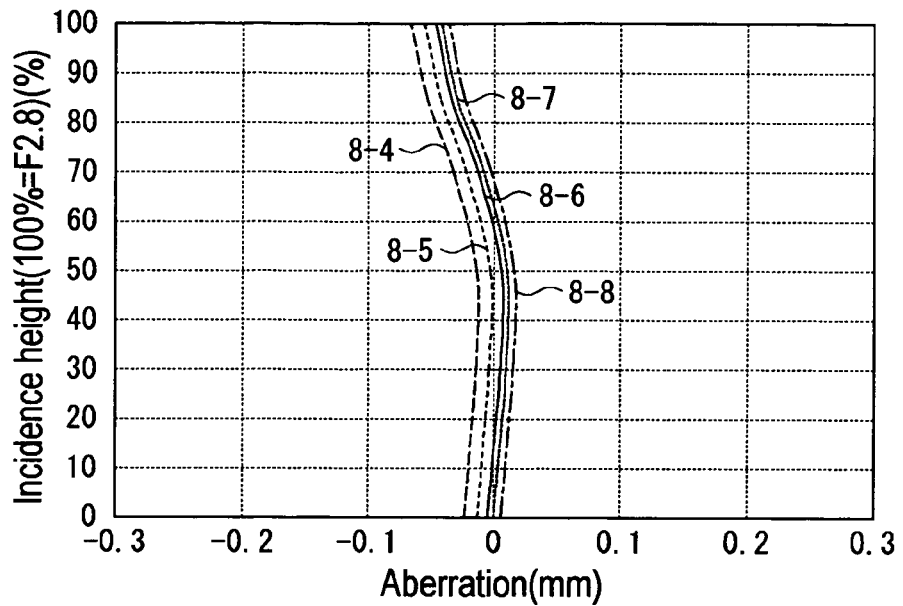
FIG. 33 is a diagram depicting the chromatic/spherical aberration of the imaging lens of the eighth embodiment.

FIG. 31 shows a graph of the distortion aberration curve 8-1, FIG. 32 shows a graph of the astigmatism aberration curve (aberration curve 8-2 on the meridional surface and aberration curve 8-3 on the sagittal surface), FIG. 33 shows a graph of a chromatic/spherical aberration curve (aberration curve 8-4 on g-line, aberration curve 8-5 on F-line, aberration curve 8-6 on e-line, aberration curve 8-7 on d-line and aberration curve 8-8 on C-line).

The ordinates of the aberration curves in FIG. 31 and FIG. 32 show the image height by a % of the distance from the optical axis. In FIG. 31 and FIG. 32, 100% corresponds to 0.627 mm. The ordinate of the aberration curve in FIG. 33 shows the incidence height h (F number), and the maximum thereof corresponds to 2.8. The abscissa of FIG. 31 shows the aberration (%), and the abscissas of FIG. 32 and FIG. 33 show the value of the aberration.

For the distortion aberration, the absolute value of the aberration is 10.4%, which is the maximum, at the position of image height 100% (image height 0.627 mm), and the absolute value of the aberration is within 10.4% in a range where the image height is 0.627 mm or less.

For the astigmatism aberration, the absolute value of the aberration is 0.082 mm, which is the maximum, at the position of the image height 50% (image height 0.314 mm), and the absolute value of the aberration is within 0.082 mm in a range where the image height is 0.627 mm or less.

For the chromatic/spherical aberration, the absolute value of the aberration curve 8-4 on the g-line is 0.0661 mm, which is the maximum, at 100% of the incidence height h, and the absolute value of the aberration is within 0.0661 mm.

Therefore according to the imaging lens of the eighth embodiment, good images are acquired.

Ninth Embodiment

In the lens system of the ninth embodiment, the first lens $L_1$ and the third lens $L_3$ are formed of a transparent high hardness silicone resin SR-7010 (Dow Corning Torey Co., Ltd.) containing transparent adhesive, and the second lens $L_2$ is formed by optical glass BK 7 (made by Ohara Inc.).

(A) The refractive index $N_2$ of the first lens $L_1$ is $N_2=1.53000$.
(B) The refractive index $N_3$ of the second lens $L_2$ is $N_3=1.51680$.
(C) The refractive index $N_4$ of the third lens $L_3$ is $N_4=1.53000$.
(D) The Abbe number $v_2$ of the first lens $L_1$ is $v_2=35.0$.
(E) The Abbe number $v_3$ of the second lens $L_2$ is $v_3=64.0$.
(F) The Abbe number $v_4$ of the third lens $L_3$ is $v_4=35.0$.

Therefore $|N_3-N_2|=|N_3-N_4|=0.0312$, which satisfies the following Conditions (1) and (2). Also $|v_3-v_2|=|v_3-v_4|=29.0$, which satisfies the following Conditions (3) and (4).

Figure 34:
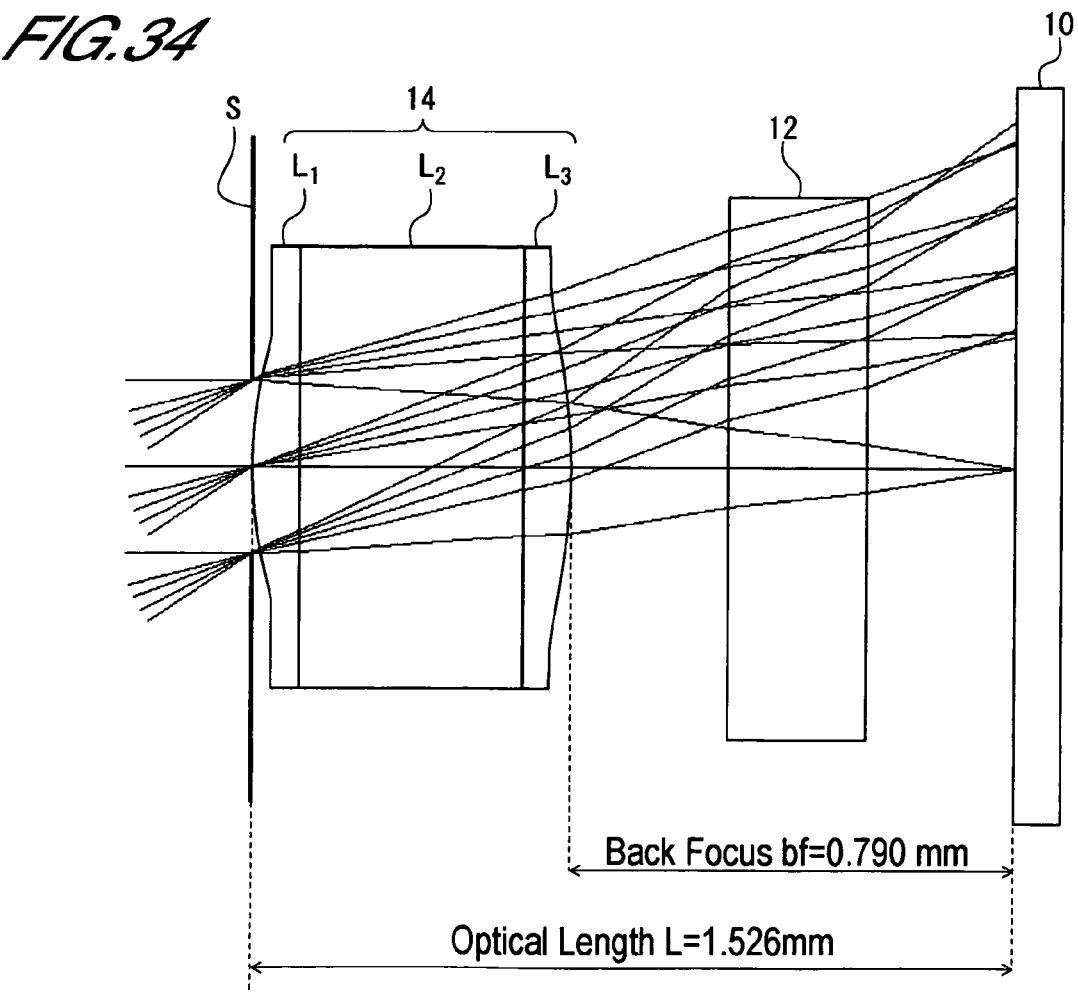
FIG. 34 is a cross-sectional view depicting an imaging lens according to a ninth embodiment.

FIG. 34 shows a cross-sectional view of the imaging lens of the ninth embodiment. As FIG. 34 shows, the aperture stop S is formed at a position of an intersection of the first surface (surface at the object side) of the first lens $L_1$ constituting the junction type compound lens 14 and the optical axis. The diaphragm surface is a plane, so $r_1=\infty$ is indicated in Table 9. The F number Fno is 2.8.

As Table 9 shows, $r_3=\infty$ and $r_4=\infty$, so the second lens $L_2$ is a plane parallel glass plate. Since $r_2$ is a positive value and $r_5$ is a negative value, the first lens $L_1$ is a plano-convex lens where the object side face of this first lens $L_1$ is a convex surface facing the object side, and the third lens $L_3$ is a plano-convex lens where the image side face of this third lens $L_3$ is a convex surface facing the image side. The junction type compound lens 14 has a positive refractive power.

As FIG. 34 shows, the optical length L with respect to the focal distance f=1.00 mm is sufficiently short, 1.526 mm, and the back focus bf is sufficiently long, 0.790 mm.

Figure 35:
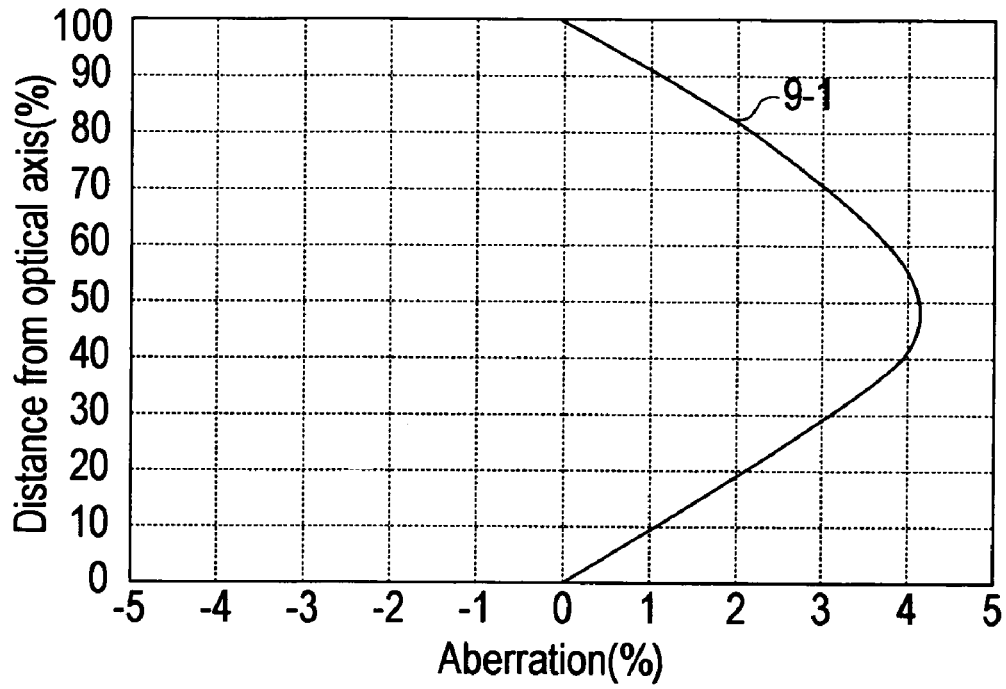
FIG. 35 is a diagram depicting the distortion aberration of the imaging lens of the ninth embodiment.
Figure 36:
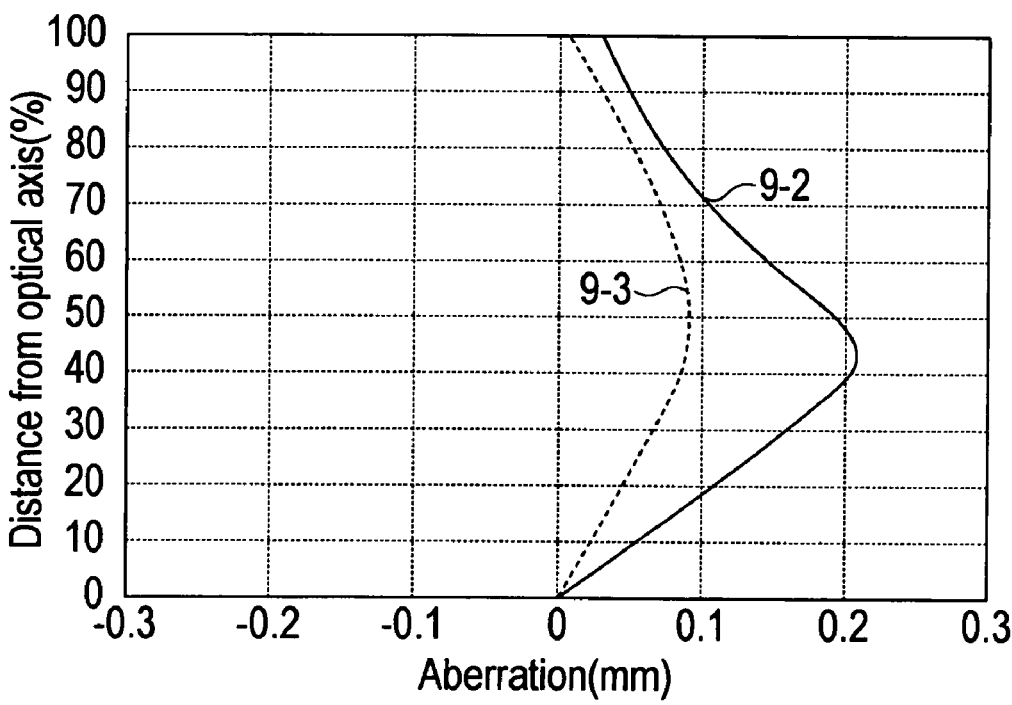
FIG. 36 is a diagram depicting the astigmatism aberration of the imaging lens of the ninth embodiment.
Figure 37:
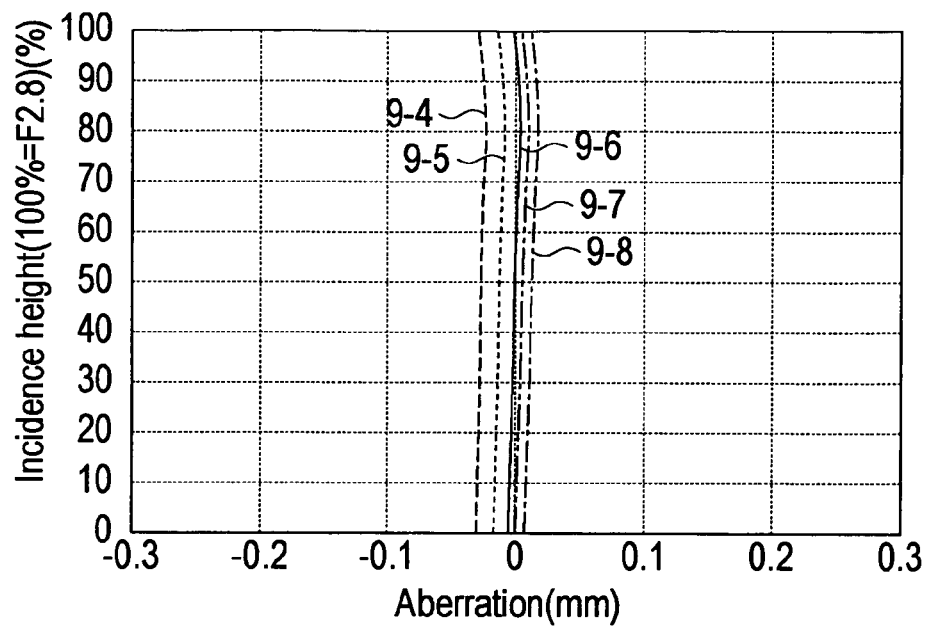
FIG. 37 is a diagram depicting the chromatic/spherical aberration of the imaging lens of the ninth embodiment.

FIG. 35 shows a graph of the distortion aberration curve 9-1, FIG. 36 shows a graph of the astigmatism aberration curve (aberration curve 9-2 on the meridional surface and aberration curve 9-3 on the sagittal surface), FIG. 37 shows a graph of a chromatic/spherical aberration curve (aberration curve 9-4 on g-line, aberration curve 9-5 on F-line, aberration curve 9-6 on e-line, aberration curve 9-7 on d-line and aberration curve 9-8 on C-line).

The ordinates of the aberration curves in FIG. 35 and FIG. 36 show the image height by a % of the distance from the optical axis. In FIG. 35 and FIG. 36, 100% corresponds to 0.676 mm. The ordinate of the aberration curve in FIG. 37 shows the incidence height h (F number), and the maximum thereof corresponds to 2.8. The abscissa of FIG. 35 shows the aberration (%), and the abscissas of FIG. 36 and FIG. 37 show the value of the aberration.

For the distortion aberration, the absolute value of the aberration is 4.1%, which is the maximum, at the position of image height 50% (image height 0.338 mm), and the absolute value of the aberration is within 4.1% in a range where the image height is 0.676 mm or less.

For the astigmatism aberration, the absolute value of the aberration is 0.206 mm, which is the maximum, at the position of the image height 45% (image height 0.304 mm), and the absolute value of the aberration is within 0.206 mm in a range where the image height is 0.676 mm or less.

For the chromatic/spherical aberration, the absolute value of the aberration curve 9-4 on the g-line is 0.0299 mm, which is the maximum, at 0% of the incidence height h (lens center), and the absolute value of the aberration is within 0.0299 mm.

Therefore according to the imaging lens of the ninth embodiment, good images are acquired.

Tenth Embodiment

In the lens system of the tenth embodiment, the first lens $L_1$ and the third lens $L_3$ are formed of a transparent high hardness silicone resin SR-7010 (Dow Corning Torey Co., Ltd.) containing transparent adhesive, and the second lens $L_2$ is formed by optical glass BK 7 (made by Ohara Inc.).
(A) The refractive index $N_2$ of the first lens $L_1$ is $N_2=1.53000$.
(B) The refractive index $N_3$ of the second lens $L_2$ is $N_3=1.51680$.
(C) The refractive index $N_4$ of the third lens $L_3$ is $N_4=1.53000$.
(D) The Abbe number $v_2$ of the first lens $L_1$ is $v_2=35.0$.
(E) The Abbe number $v_3$ of the second lens $L_2$ is $v_3=64.0$.
(F) The Abbe number $v_4$ of the third lens $L_3$ is $v_4=35.0$.

Therefore $|N_3-N_2|=|N_3-N_4|=0.0132$, which satisfies the following Conditions (1) and (2). Also $|v_3-v_2|=|v_3-v_4|=29.0$, which satisfies the following Conditions (3) and (4).

Figure 38:
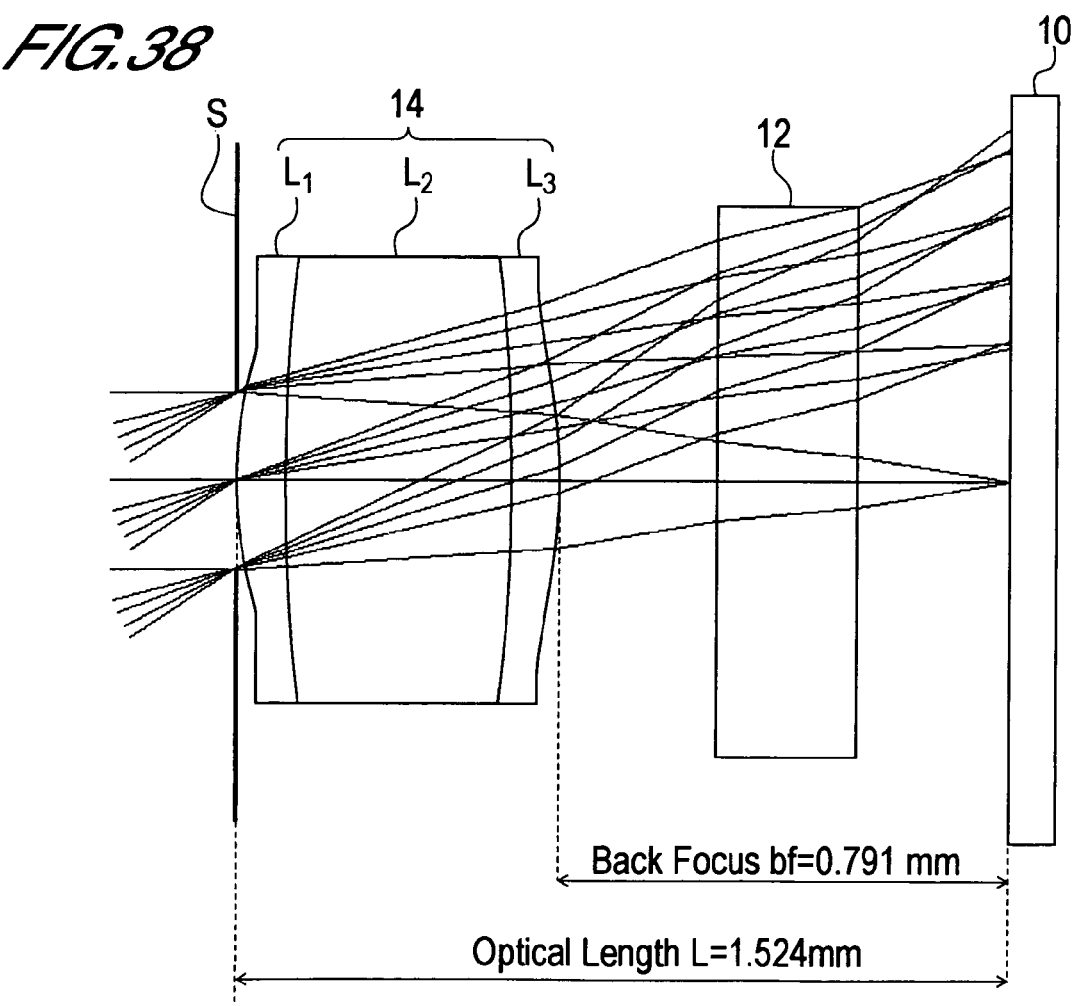
FIG. 38 is a cross-sectional view depicting an imaging lens according to a tenth embodiment.

FIG. 38 shows a cross-sectional view of the imaging lens of the tenth embodiment. As FIG. 38 shows, the aperture stop S is formed at a position of an intersection of the first surface (surface at the object side) of the first lens $L_1$ constituting the junction type compound lens 14 and the optical axis. The diaphragm surface is a plane, so $r_1=\infty$ is indicated in Table 10. The F number Fno is 2.8.

As Table 10 shows, $r_3$ is a positive value and $r_4$ is a negative value, so the second lens $L_2$ is a bi-convex glass lens. Since $r_2$ is a positive value and $r_5$ is a negative value, the first lens $L_1$ is a lens where the object side face of this first lens $L_1$ is a convex surface facing the object side, and the third lens $L_3$ is a lens where the image side face of this third lens $L_3$ is a convex surface facing the image side. The junction type compound lens 14 has a positive refractive power.

As FIG. 38 shows, the optical length L with respect to the focal distance f=1.00 mm is sufficiently short, 1.524 mm, and the back focus bf is sufficiently long, 0.791 mm.

Figure 39:
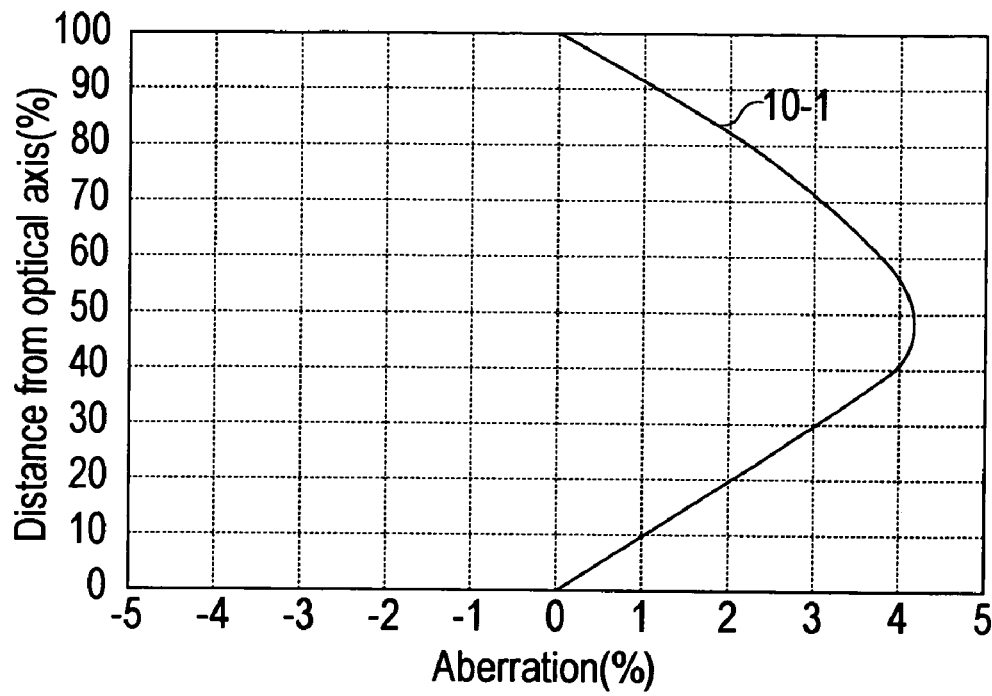
FIG. 39 is a diagram depicting the distortion aberration of the imaging lens of the tenth embodiment.
Figure 40:
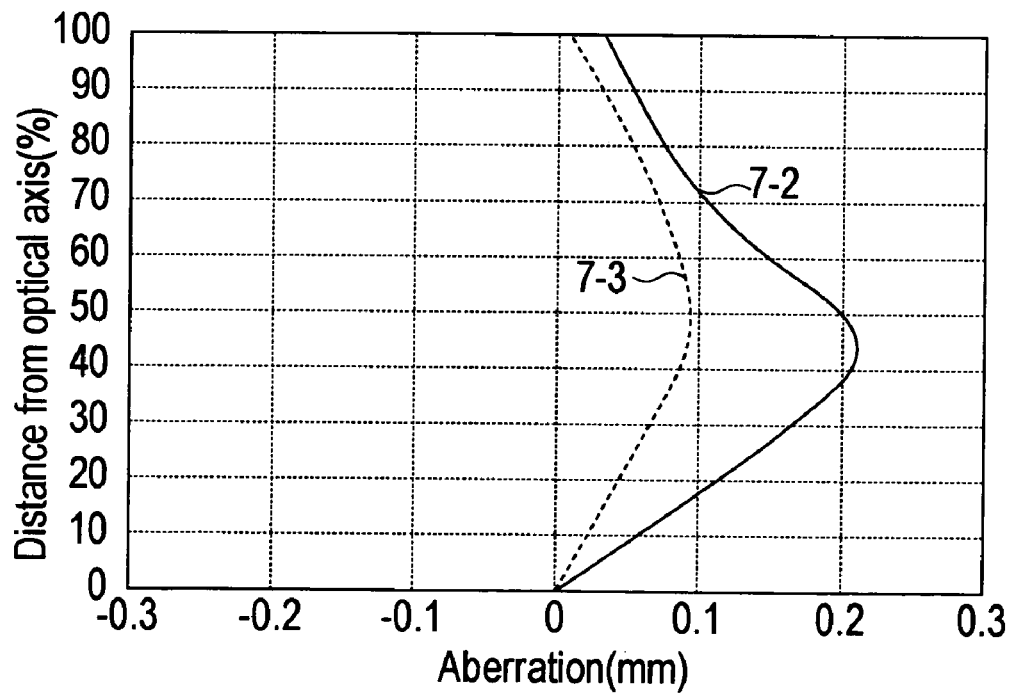
FIG. 40 is a diagram depicting the astigmatism aberration of the imaging lens of the tenth embodiment.
Figure 41:
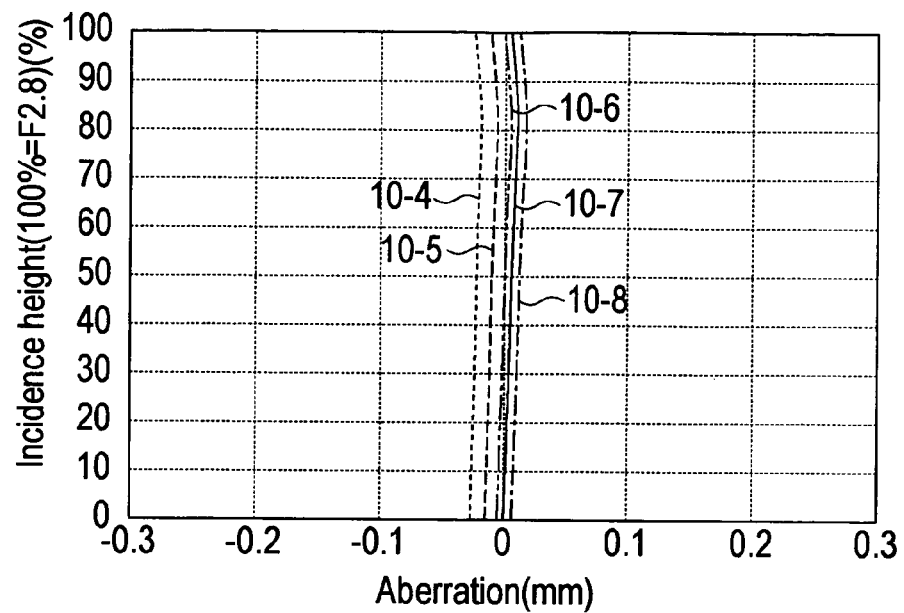
FIG. 41 is a diagram depicting the chromatic/spherical aberration of the imaging lens of the tenth embodiment.

FIG. 39 shows a graph of the distortion aberration curve 10-1, FIG. 40 shows a graph of the astigmatism aberration curve (aberration curve 10-2 on the meridional surface and aberration curve 10-3 on the sagittal surface), FIG. 41 shows a graph of a chromatic/spherical aberration curve (aberration curve 10-4 on g-line, aberration curve 10-5 on F-line, aberration curve 10-6 on e-line, aberration curve 10-7 on d-line and aberration curve 10-8 on C-line).

The ordinates of the aberration curves in FIG. 39 and FIG. 40 show the image height by a % of the distance from the optical axis. In FIG. 39 and FIG. 40, 100% corresponds to 0.676 mm. The ordinate of the aberration curve in FIG. 41 shows the incidence height h (F number), and the maximum thereof corresponds to 2.8. The abscissa of FIG. 39 shows the aberration (%), and the abscissas of FIG. 40 and FIG. 41 show the value of the aberration.

For the distortion aberration, the absolute value of the aberration is 4.1%, which is the maximum, at the position of image height 50% (image height 0.338 mm), and the absolute value of the aberration is within 4.1% in a range where the image height is 0.676 mm or less.

For the astigmatism aberration, the absolute value of the aberration is 0.212 mm, which is the maximum, at the position of the image height 45% (image height 0.304 mm), and the absolute value of the aberration is within 0.212 mm in a range where the image height is 0.676 mm or less.

For the chromatic/spherical aberration, the absolute value of the aberration curve 10-4 on the g-line is 0.0265 mm, which is the maximum, at 0% of the incidence height h, and the absolute value of the aberration is within 0.0265 mm.

Therefore according to the imaging lens of the tenth embodiment, good images are acquired.

Eleventh Embodiment

In the lens system of the eleventh embodiment, the first lens $L_1$ and the third lens $L_3$ are formed of a transparent high hardness silicone resin SR-7010 (Dow Corning Torey Co., Ltd.) containing transparent adhesive, and the second lens $L_2$ is formed by optical glass BK 7 (made by Ohara Inc.).
(A) The refractive index $N_2$ of the first lens $L_1$ is $N_2=1.53000$.
(B) The refractive index $N_3$ of the second lens $L_2$ is $N_3=1.51680$.
(C) The refractive index $N_4$ of the third lens $L_3$ is $N_4=1.53000$.
(D) The Abbe number $v_2$ of the first lens $L_1$ is $v_2=35.0$.
(E) The Abbe number $v_3$ of the second lens $L_2$ is $v_3=64.0$.
(F) The Abbe number $v_4$ of the third lens $L_3$ is $v_4=35.0$.

Therefore $|N_3-N_2|=|N_3-N_4|=0.0132$, which satisfies the following Conditions (1) and (-2). Also $|v_3-v_2|=|v_3-v_4|=29.0$, which satisfies the following Conditions (3) and (4).

Figure 42:
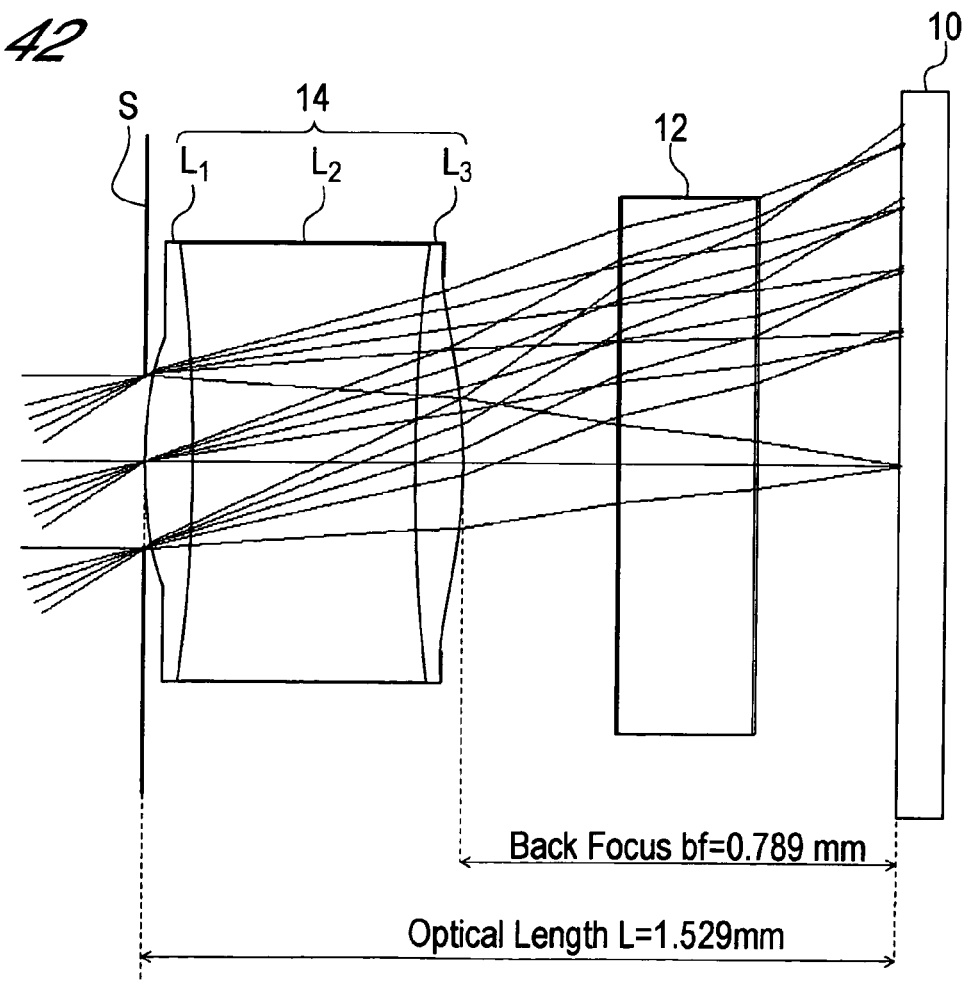
FIG. 42 is a cross-sectional view depicting an imaging lens according to an eleventh embodiment.

FIG. 42 shows a cross-sectional view of the imaging lens of the eleventh embodiment. As FIG. 42 shows, the aperture stop S is formed at a position of an intersection of the first surface (surface at the object side) of the first lens $L_1$ constituting the junction type compound lens 14 and the optical axis. The diaphragm surface is a plane, so $r_1=\infty$ is indicated in Table 11. The F number Fno is 2.8.

As Table 11 shows, $r_3$ is a negative value and $r_4$ is a positive value, so the second lens $L_2$ is a bi-concave glass lens. Since $r_2$ is a positive value and $r_5$ is a negative value, the first lens $L_1$ is a lens where the object side face of this first lens $L_1$ is a convex surface facing the object side, and the third lens $L_3$ is a lens where the image side face of this third lens $L_3$ is a convex surface facing the image side. The junction type compound lens 14 has a positive refractive power.

As FIG. 42 shows, the optical length L with respect to the focal distance f=1.00 mm is sufficiently short, 1.529 mm, and the back focus bf is sufficiently long, 0.789 mm.

Figure 43:
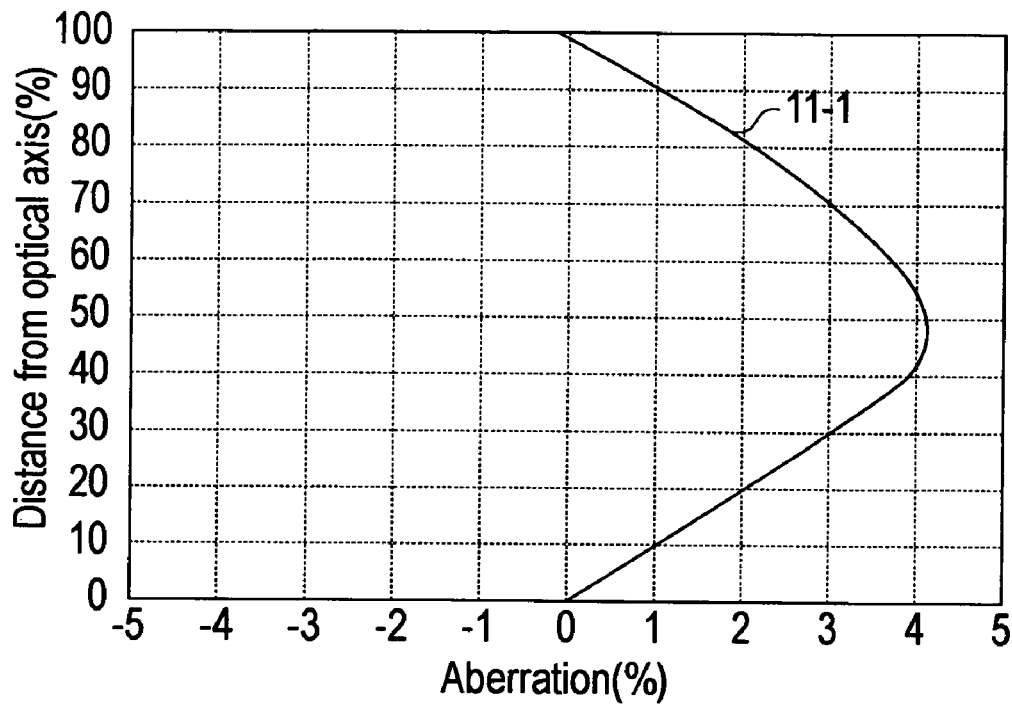
FIG. 43 is a diagram depicting the distortion aberration of the imaging lens of the eleventh embodiment.
Figure 44:
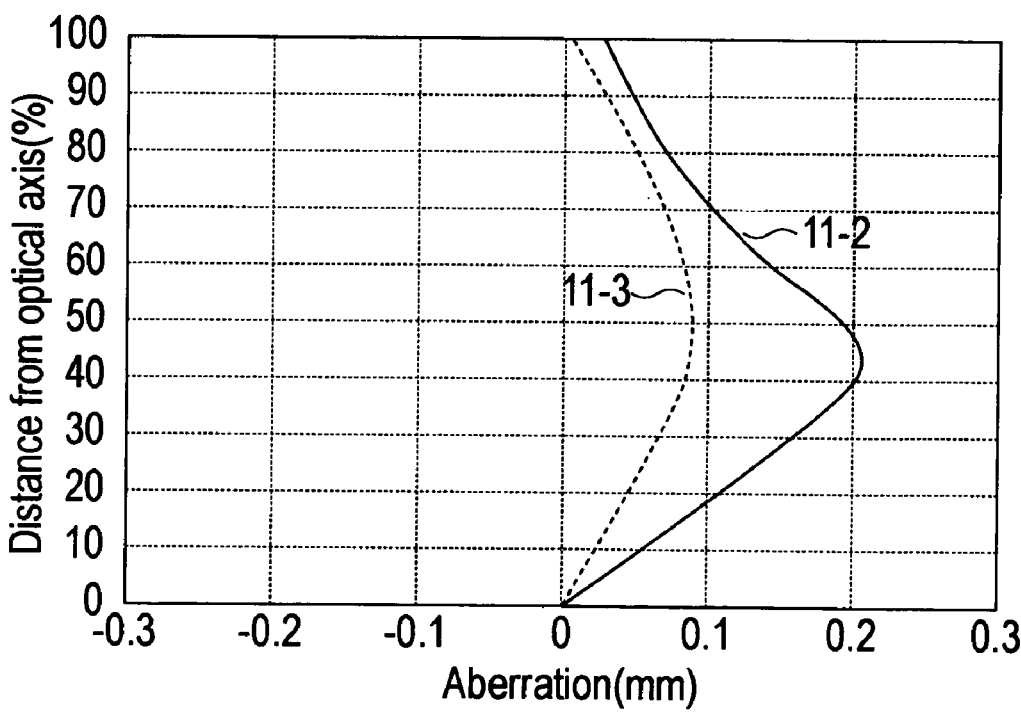
FIG. 44 is a diagram depicting the astigmatism aberration of the imaging lens of the eleventh embodiment.
Figure 45:
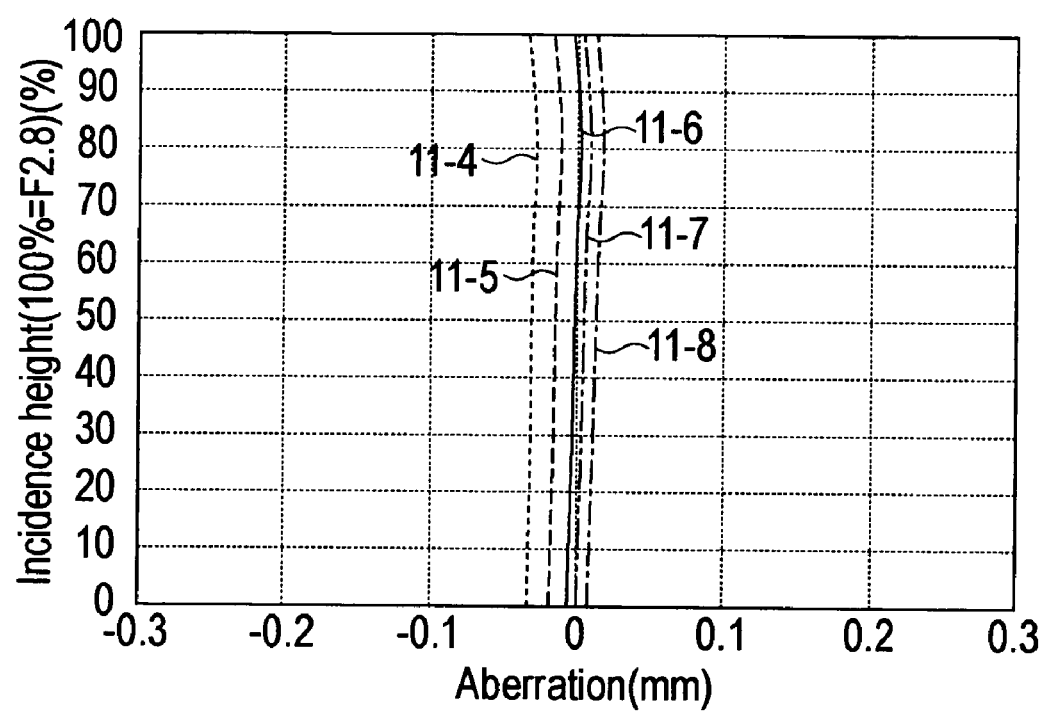
FIG. 45 is a diagram depicting the chromatic/spherical aberration of the imaging lens of the eleventh embodiment.

FIG. 43 shows a graph of the distortion aberration curve 11-1, FIG. 44 shows a graph of the astigmatism aberration curve (aberration curve 11-2 on the meridional surface and aberration curve 11-3 on the sagittal surface), FIG. 45 shows a graph of a chromatic/spherical aberration curve (aberration curve 11-4 on g-line, aberration curve 11-5 on F-line, aberration curve 11-6 on e-line, aberration curve 11-7 on d-line and aberration curve 11-8 on C-line).

The ordinates of the aberration curves in FIG. 43 and FIG. 44 show the image height by a % of the distance from the optical axis. In FIG. 43 and FIG. 44, 100% corresponds to 0.676 mm. The ordinate of the aberration curve in FIG. 45 shows the incidence height h (F number), and the maximum thereof corresponds to 2.8. The abscissa of FIG. 43 shows the aberration (%), and the abscissas of FIG. 44 and FIG. 45 show the value of the aberration.

For the distortion aberration, the absolute value of the aberration is 4.1%, which is the maximum, at the position of image height 50% (image height 0.676 mm), and the absolute value of the aberration is within 4.1% in a range where the image height is 0.676 mm or less.

For the astigmatism aberration, the absolute value of the aberration is 0.206 mm, which is the maximum, at the position of the image height 45% (image height 0.304 mm), and the absolute value of the aberration is within 0.206 mm in a range where the image height is 0.676 mm or less.

For the chromatic/spherical aberration, the absolute value of the aberration curve 11-4 on the C-line is 0.0336 mm, which is the maximum, at 100% of the incidence height h, and the absolute value of the aberration is within 0.0336 mm.

Therefore according to the imaging lens of the eleventh embodiment, good images are acquired.

As the description on the imaging lenses according to the first embodiment to the eleventh embodiment show, the problems to be solved by this invention are solved by designing each composing lens of the imaging lens so as to satisfy the above Expression (1) to (4). In other words, an imaging lens where various aberrations are well corrected, sufficient back focus is acquired, and the optical length maintained short, can be acquired.

As described above, the imaging lens of the present invention is suitable not only for a lens for a camera built into a portable telephone, personal computer or digital camera, but also for a lens for a camera built into a personal digital assistant (PDA), a lens for a camera built into a toy having an image recognition function, and a lens for a camera built into monitoring, inspection or crime prevention equipment.

<Manufacturing Method for Junction Type Compound Lens>

Figure 46A:
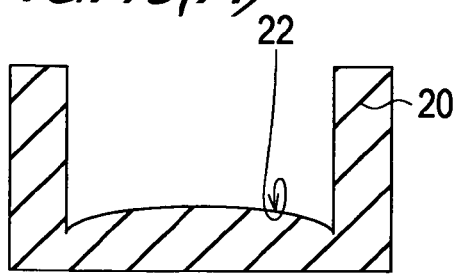
FIG. 46 are diagrams depicting the manufacturing steps of a junction type compound lens.

The manufacturing steps of a junction type compound lens will now be described with reference to FIG. 46(A) to FIG. 46 (G). FIG. 46(A) to FIG. 46 (G) are provided to explain the manufacturing steps of the junction type compound lens. FIG. 46(A) to FIG. 46(F) show cross-sections when a cylindrical die, used for forming the following first lens and third lens, is sectioned along a center line of a cylinder, including this center line. FIG. 46(B), FIG. 46(C), FIG. 46(E) and FIG. 46(F) include a silicone resin and optical glass, which are composing materials of the junction type compound lens. FIG. 46(G) shows a cross-section of a junction type compound lens formed by the manufacturing steps of the junction type compound lens described with reference to FIG. 46(A) to FIG. 46(F) sectioned along the optical axis of the junction type compound lens, including this optical axis.

FIG. 46(A) is a cross-sectional view of a die 20 for forming the second lens $L_2$ joining with the first lens $L_1$. The die 20 is a cylinder where the side wall of the inner face is cylindrical, and the bottom face 22 is a curved surface which is convex upward for forming an object side face $r_2$ of the first lens $L_1$. In other words, the shape of the bottom face 22 is a shape the same as the curved surface of the object side face $r_2$ of the first lens $L_1$.

Figure 46B:
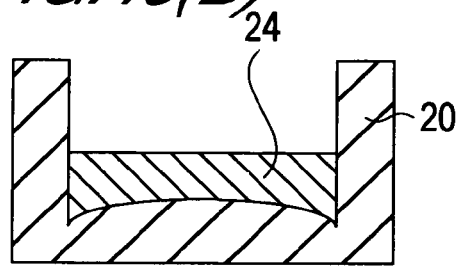

FIG. 46(B) shows a state where transparent high hardness silicone resin 24, which is in a liquid state before curing, is injected into the die 20. In the manufacturing steps of the junction type compound lens to be described below, a case of using a thermo-setting resin will be described as an example, but a UV curable resin can also be used.

Generally a thermo-setting resin is a plastic which is cured by high temperature during molding. The thermo-setting resin is cured by progressing a cross-linking reaction, where the side chains protruding from a chin type long polymer are bonded with the side chains of another polymer, by high temperature, and the polymers are three-dimensionally bonded and immobilized. Since the cross-linking reaction is an irreversible reaction, the thermo-setting resin once cured does not become soft, even if heated again.

It is preferable that a filler and adhesive are mixed in the thermo-setting resin used for this invention. This is to maintain the bonding strength between the first lens $L_1$ and the second lens $L_2$, and the bonding strength between the second lens $L_2$ and the third lens $L_3$ to a strength whereby the lenses do not separate during use as an imaging lens.

The UV curable resin is normally a resin comprised of monomers and oligomers (major component of resin, an intermediate material between polymer and monomer), an optical initiator and additive agent. If ultraviolet is irradiated onto this mixture, the optical initiator is converted from a monomer (diluent of resin, constituting a part of cured resin) in a liquid status into a polymer in a solid status by a photo-polymerization reaction. For a UN curable resin as well, it is preferable that a filler and adhesive are mixed in, just like the case of the thermo-setting resin.

Figure 46C:
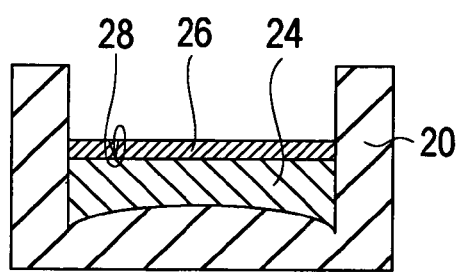

FIG. 46(C) shows a status when one surface of an optical glass 26 to be the second lens $L_2$ and a surface 28 of the transparent curable silicone resin 24 in a liquid state before curing are contacted. In this status, the temperature of the die 20 is increased to the curing temperature of the transparent high hardness silicone resin 24, so as to cure the transparent high hardness silicone resin 24. After the transparent high hardness silicone resin 24 is cured by heat, the die 20 is cooled down, and the compound lens in a status of the cured transparent high hardness silicone resin 24 being bonded with the optical glass 26 is removed. The compound lens in this status is a doubled lens where the first lens $L_1$ and the second lens $L_2$ are directly bonded.

In the above mentioned imaging lenses of the first embodiment to the eleventh embodiment, the inventor of the present invention confirmed that the first lens $L_1$ and the second lens $L_2$ can be formed such that the bonding strength thereof can be maintained to a strength which is sufficient for use as an imaging lens.

Figure 46D:
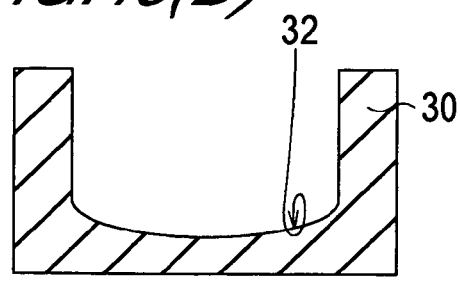

FIG. 46(D) is a cross-sectional view of a die 30 for further bonding the third lens $L_3$ to the above mentioned compound lens, where the first lens $L_1$ and the second lens $L_2$ are directly bonded. Just like the die 20, the die 30 is a cylinder where the side wall of the inner face is cylindrical, and the bottom face 32 is a curved surface which is convex downward for forming an image side face $r_5$ of the third lens $L_3$. In other words, the shape of the bottom face 32 is a shape the same as the curved surface of the object side face $r_5$ of the third lens $L_3$.

Figure 46E:
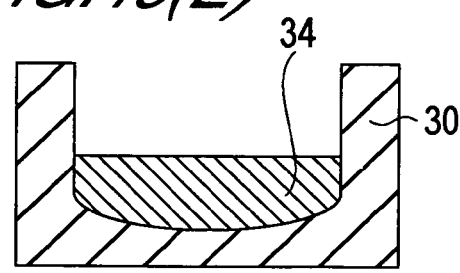

FIG. 46(E) shows a state where transparent high hardness silicone resin 34, which is in a liquid state before curing, is injected into the die 30. For the transparent high hardness silicone resin 34, a resin similar to the transparent high hardness silicone resin 24 or a different resin may be used. In any case, it is preferable to use a silicone resin selected as appropriate for the design of the junction type compound lens.

Figure 46F:
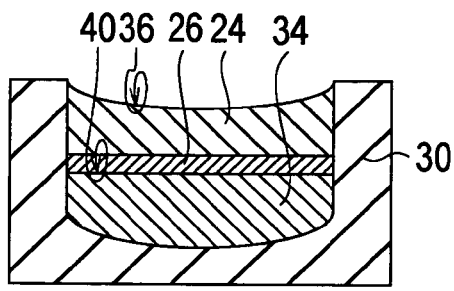
Figure 46G:
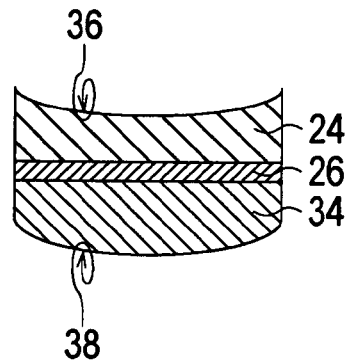

FIG. 46(F) shows a state where a surface of the second lens $L_2$, the opposite side of the side where the first lens $L_1$, of the compound lens where the first lens $L_1$ and the second lens $L_2$ are bonded, and a surface 40 of the transparent high hardness silicone resin 34 in a liquid state before curing, are contacted. The compound lens where the first lens $L_1$ and the second lens $L_2$ are bonded refers to a doubled junction type compound lens comprised of the transparent high hardness silicone resin 24 and the optical glass 26 (second lens $L_2$).

In the status shown in FIG. 46(F), the temperature of the die 30 is increased to the curing temperature of the transparent high hardness silicone resin 34, so as to cure the transparent high hardness silicone resin 34. At this time, the transparent high hardness silicone resin 24 has already been cured by heat, so the shape does not change even if the temperature of the transparent high hardness silicone resin 34 is increased to the curing temperature.

After the transparent high hardness silicone resin 34 is cured, the die 30 is cooled down, and the junction type compound lens (formed as a triple junction type compound lens $L_3$), in a state where the cured transparent high hardness silicone resin 34 (formed as the third lens $L_3$), is bonded with the above mentioned doubled junction type compound lens where the first lens $L_1$ and the second lens $L_2$ are bonded, is removed.

In the above mentioned imaging lenses of the first embodiment to the eleventh embodiment, the inventor of the present invention confirmed that the second lens $L_2$ and the third lens $L_3$ can be formed such that the bonding strength thereof can be maintained as a strength sufficient enough for use as an imaging lens.

FIG. 46(G) is a cross-sectional view of the junction type composite lens completed via the above manufacturing steps sectioned in a direction along the optical axis. The transparent high hardness silicone resin 24 is the first lens $L_1$, the optical glass 26 is the second lens $L_2$, and the transparent high hardness silicone resin 34 is the third lens $L_3$. In the junction type compound lens shown in FIG. 46(G), the object side face 36 of the first lens has a concave surface facing the object side, and the image side face 38 of the third lens has a convex surface facing the image side.

The manufacturing steps of the junction type compound lens described with reference to FIG. 46(A) to FIG. 46(G) are manufacturing steps using dies, assuming the case of manufacturing a junction type compound lens, wherein the second lens $L_2$ is a plane parallel glass plate, the first lens $L_1$ is a plano-concave lens where the object side face 36 of this first lens $L_1$ is a concave surface facing the object side, and the third lens $L_3$ is a plano-concave lens where the image side face 38 of this third lens $L_3$ is a convex surface facing the image side. However, a junction type compound lens, of which directions of convex/concave of the lens surfaces are different, can also be manufacturing by similar steps. The shape of the object side face 36 of the first lens $L_1$ is determined by the shape of the bottom face 22 of the die 20. The shape of the image side face 38 of the third lens $L_3$ is determined by the shape of the bottom face 32 of the die 30. In other words, the shape of the bottom faces of the die 20 and the die 30 are matched with the shape of the object side face 36 of the first lens $L_1$ and the shape of the image side face 38 of the third lens $L_3$ respectively.

In the manufacturing steps of the junction type compound lens described with respect to FIG. 46(A) to FIG. 46(G), the first lens and the third lens are formed by thermo-setting resin, so a temperature control device for increasing the temperature of the die 20 and the die 30, and controlling processing, is required. The configuration of the temperature control device is part of the design issues of the junction type compound lens manufacturing device, so the temperature control device is omitted in FIG. 46(A) to FIG. 46(G).

To form the first lens $L_1$ and the third lens $L_3$ of UV curable resin, the junction type compound lens manufacturing device is designed so the ultraviolet can be irradiated onto the UV curable resin from the above area of the die 20 and the die 30.

The invention claimed is:

1. An imaging lens of which a distortion aberration is corrected to be small enough that an absolute value of the distortion aberration is within 10.7%, comprising an aperture stop, and a junction type compound lens having a positive refractive power without containing a diffractive optical element, wherein said aperture stop and said junction type compound lens are arranged in this sequence from an object side to an image side, said junction type compound lens comprises a first lens, a second lens and a third lens arranged in this sequence from the object side to the image side, said first lens and said third lens are formed of a curable resin material, said second lens is formed of a glass material, said first lens and said second lens are directly bonded, and said second lens and said third lens are directly bonded, said second lens is a plane parallel glass plate, said first lens is a plano-convex lens where the object side face of said first lens is a convex surface facing the object side, said third lens is a plano-convex lens where the image side face of said third lens is a convex surface facing the image side, and the following conditions (1)-(4) are satisfied, $$0 \leq |N_3 - N_2| \leq 0.0968 \quad (1)$$

$$0 \leq |N_3 - N_4| \leq 0.0968 \quad (2)$$

$$0 \leq |\nu_3 - \nu_2| \leq 30.0 \quad (3)$$

$$0 \leq |\nu_3 - \nu_4| \leq 30.0 \quad (4)$$

where
$N_2$: refractive index of said first lens
$N_3$: refractive index of said second lens
$N_4$: refractive index of said third lens
$\nu_2$: Abbe number of said first lens
$\nu_3$: Abbe number of said second lens
$\nu_4$: Abbe number of said third lens.

2. The imaging lens according to claim 1, wherein the object side face of said first lens and the image side face of said third lens are aspherical.

3. The imaging lens according to claim 1, wherein said curable resin material is a transparent high hardness silicone resin containing a transparent adhesive.

* * * * *